United States Patent
Kamimura

(10) Patent No.: US 11,326,048 B2
(45) Date of Patent: May 10, 2022

(54) MEMBER, CONTAINER, CHEMICAL LIQUID STORAGE BODY, CHEMICAL LIQUID PURIFICATION DEVICE, AND MANUFACTURING TANK

(71) Applicant: FUJIFILM Corporation, Tokyo (JP)

(72) Inventor: Tetsuya Kamimura, Haibara-gun (JP)

(73) Assignee: FUJIFILM Corporation, Tokyo (JP)

(*) Notice: Subject to any disclaimer, the term of this patent is extended or adjusted under 35 U.S.C. 154(b) by 14 days.

(21) Appl. No.: 16/690,353

(22) Filed: Nov. 21, 2019

(65) Prior Publication Data

US 2020/0087501 A1 Mar. 19, 2020

Related U.S. Application Data

(63) Continuation of application No. PCT/JP2018/025287, filed on Jul. 4, 2018.

(30) Foreign Application Priority Data

Jul. 5, 2017 (JP) .............................. JP2017-131808
Jun. 28, 2018 (JP) .............................. JP2018-122726

(51) Int. Cl.
   *C08L 27/14* (2006.01)
   *B65D 85/00* (2006.01)
   (Continued)

(52) U.S. Cl.
   CPC ............ *C08L 27/14* (2013.01); *B65D 1/0207* (2013.01); *B65D 1/0215* (2013.01);
   (Continued)

(58) Field of Classification Search
   None
   See application file for complete search history.

(56) References Cited

U.S. PATENT DOCUMENTS 7,385,077 B1* 6/2008 Acosta ................ B01F 17/0035
                                                    106/287.24
2005/0020792 A1 1/2005 Aoyama et al.
(Continued)

FOREIGN PATENT DOCUMENTS

EP         1908785 A1 *  4/2008  .......... C08F 214/262
JP         10-329280 A   12/1998
(Continued)

OTHER PUBLICATIONS

Machine translation of JP 10329280 A1, retrieved Apr. 2021 (Year: 2021).*

(Continued)

*Primary Examiner* — Nicole M. Buie-Hatcher
(74) *Attorney, Agent, or Firm* — Sughrue Mion, PLLC

(57) ABSTRACT

A member contains a fluorine-containing polymer and a fluorine-containing surfactant, in which provided that a mass-based content of the fluorine-containing surfactant in at least a surface of a portion of the member is $M_1$, and a mass-based content of the surfactant in a position 10 nm below the surface in a thickness direction of the member is $M_2$, $M_1/M_2$ is 0.50 to 0.90, and an atom number ratio $X_1$ of the number of fluorine atoms contained in the surface to the number of carbon atoms contained in the surface is 0.50 to 3.0.

35 Claims, 6 Drawing Sheets

(51) Int. Cl.
*B65D 90/02* (2019.01)
*C08K 5/00* (2006.01)
*C08L 27/16* (2006.01)
*C08L 27/18* (2006.01)
*C09D 127/18* (2006.01)
*B65D 51/00* (2006.01)
*B65D 1/02* (2006.01)

(52) U.S. Cl.
CPC ........... *B65D 51/005* (2013.01); *B65D 85/70* (2013.01); *B65D 90/02* (2013.01); *C08K 5/0016* (2013.01); *C08L 27/16* (2013.01); *C08L 27/18* (2013.01); *C09D 127/18* (2013.01)

(56) References Cited

U.S. PATENT DOCUMENTS

| | | | |
|---|---|---|---|
| 2005/0147826 A1 | 7/2005 | Tomihashi et al. | |
| 2011/0294945 A1* | 12/2011 | Sawauchi | C08F 6/16 524/546 |
| 2012/0202906 A1* | 8/2012 | Higuchi | C08J 3/03 521/145 |
| 2015/0203703 A1* | 7/2015 | Momose | A47J 36/025 428/324 |
| 2015/0299342 A1* | 10/2015 | Nanba | C08F 2/001 524/805 |
| 2016/0185995 A1 | 6/2016 | Mugisawa | |
| 2017/0184973 A1* | 6/2017 | Yamanaka | G03F 7/168 |
| 2019/0064672 A1* | 2/2019 | Murayama | H01L 21/0271 |

FOREIGN PATENT DOCUMENTS

| | | | | | |
|---|---|---|---|---|---|
| JP | 11290215 | A | * | 10/1999 | |
| JP | 2000129246 | A | * | 5/2000 | |
| JP | 2007-238960 | A | | 9/2007 | |
| JP | 2010-235667 | A | | 10/2010 | |
| JP | 2015-182381 | A | | 10/2015 | |
| KR | 20020071944 | A | * | 9/2002 | ........ D06M 15/3562 |
| TW | 201540768 | A | | 11/2015 | |
| WO | 03/068499 | A1 | | 8/2003 | |
| WO | WO-2016052393 | A1 | * | 4/2016 | ............. C07C 69/14 |
| WO | WO-2017188296 | A1 | * | 11/2017 | ............... G03F 7/40 |

OTHER PUBLICATIONS

Machine translation of JP 11290215 A, retrieved Apr. 2021 (Year: 2021).*
Iwai "Ecotox Findings for Ammonium Perfluorohexanoate", Daikin Industries, date unknown (Year: 0).*
1H,1H,2H,2H-perfluorodecanol, AMAP Chemicals, 2021, https://chemicals.amap.no/chemicals/1h-1h-2h-2h-perfluorodecanol/ (Year: 2021).*
1H,1H,2H,2H-perfluorooctanol, AMAP Chemicals, 2021, https://chemicals.amap.no/chemicals/1h-1h-2h-2h-perfluorooctanol/ (Year: 2021).*
International Search Report dated Oct. 9, 2018, issued by the International Searching Authority in application No. PCT/JP2018/025287.
Written Opinion dated Oct. 9, 2018, issued by the International Searching Authority in application No. PCT/JP2018/025287.
International Preliminary Report on Patentability dated Jan. 7, 2020, issued by the International Bureau in application No. PCT/JP2018/025287.
Communication dated Sep. 1, 2020 from Japanese Patent Office in JP Application No. 2019-527736.
Office Action dated Apr. 9, 2021 in Korean Application No. 10-2019-7034967.
Communication dated Jul. 30, 2021 from the Taiwanese Patent Office in Application No. 107123036.

* cited by examiner

MEMBER, CONTAINER, CHEMICAL LIQUID STORAGE BODY, CHEMICAL LIQUID PURIFICATION DEVICE, AND MANUFACTURING TANK

CROSS-REFERENCE TO RELATED APPLICATIONS

This application is a Continuation of PCT International Application No. PCT/JP2018/025287, filed on Jul. 4, 2018, which claims priority under 35 U.S.C. § 119(a) to Japanese Patent Application No. 2017-131808, filed on Jul. 5, 2017 and Japanese Patent Application No. 2018-122726, filed on Jun. 28, 2018. Each of the above application(s) is hereby expressly incorporated by reference, in its entirety, into the present application.

BACKGROUND OF THE INVENTION

1. Field of the Invention

The present invention relates to a member, a container, a chemical liquid storage body, a chemical liquid purification device, and a manufacturing tank.

2. Description of the Related Art

At the time of manufacturing semiconductor devices, a chemical liquid containing a solvent is used.

In recent years, there has been a demand for a further reduction in impurities such as metal components contained in the solvent. In addition, the manufacturing of semiconductor devices at a node equal to or smaller than 10 nm is being examined, and accordingly, the aforementioned demand is increasing.

Generally, the chemical liquid is purified using a chemical liquid purification device comprising a manufacturing tank, a filter unit, a pipe line connecting these, and the like, and stored in a container.

WO2003/068499A describes "an ethylene/tetrafluoroethylene-based copolymer (ETFE) lining member constituted with a base material, a primer layer, and a surface layer laminated in this order, in which the base material is formed of a metal or ceramics, the primer layer is formed of ETFE (A) and a binder component, the surface layer is formed of ETFE (B), and a fluorine content rate in ETFE (B) is equal to or higher than a fluorine content rate in ETFE (A)".

SUMMARY OF THE INVENTION

The member described in WO2003/068499A exhibits excellent adhesiveness with respect to a base material. However, unfortunately, in a case where the member is exposed to a solvent, large amounts of impurities are eluted. According to the examination conducted by the inventors of the present invention, it has been revealed that in a case where the member described in WO2003/068499A is used in a liquid contact portion of a container and a chemical liquid is stored in the container, the defect inhibition performance of the chemical liquid deteriorates over time.

An object of the present invention is to provide a member which enables the obtained chemical liquid to maintain defect inhibition performance for a long period of time (hereinafter, described as "having the effects of the present invention" as well) in a case where the member is used in a liquid contact portion of a chemical liquid purification device and/or a container storing the chemical liquid and the like.

Another object of the present invention is to provide a container, a chemical liquid storage body, a chemical liquid purification device, and a manufacturing tank.

In order to achieve the aforementioned objects, the inventors of the present invention carried out an intensive examination. As a result, the inventors have found that the object can be achieved by the following constitution.

(1) A member containing a fluorine-containing polymer and a surfactant containing fluorine atoms, in which provided that, in at least a surface of a portion of the member, a mass-based content of the surfactant in the surface is $M_1$, and a mass-based content of the surfactant in a position 10 nm below the surface in a thickness direction of the member is $M_2$, $M_1/M_2$ is 0.50 to 0.90, and an atom number ratio $X_1$ of the number of fluorine atoms contained in the surface to the number of carbon atoms contained in the surface is 0.5 to 3.0.

(2) The member described in (1), in which a weight-average molecular weight of the fluorine-containing polymer is 40,000 to 600,000.

(3) The member described in (1) or (2), in which an octanol/water partition coefficient of the surfactant represented by Log Pow is equal to or smaller than 8.0.

(4) The member described in any one of (1) to (3), in which $M_2$ is 0.0010% to 5.0% by mass.

(5) The member described in any one of (1) to (4), in which the fluorine-containing polymer contains a perfluoroalkyl group on a terminal thereof.

(6) The member described in any one of (1) to (5), in which the surfactant is at least one kind of compound selected from the group consisting of a compound represented by Formula (1) that will be described later and a compound represented by Formula (2) that will be described later, and an octanol/water partition coefficient of the surfactant represented by Log Pow is equal to or smaller than 3.7.

(7) The member described in any one of (1) to (6) further containing a compound represented by Formula (3) that will be described later, in which a content of the compound represented by Formula (3) with respect to the total mass of the member is 0.01 mass ppt to 100 mass ppb.

$$CH_2=CX^a(CF_2)_nY^a \qquad \text{Formula (3)}$$

$X^a$ and $Y^a$ each independently represent a hydrogen atom or a fluorine atom, and n represents an integer of 1 to 8.

(8) The member described in (7), in which provided that a mass-based content of the compound represented by Formula (3) in the surface is $M_3$, and a mass-based content of the compound represented by Formula (3) in a position 10 nm below the surface in the thickness direction of the member $M_4$, $M_3/M_4$ is 0.50 to 1.50.

(9) The member described in (8), in which $M_1/M_3$ is 0.01 to 100.

(10) The member described in any one of (1) to (9) further containing a polymerization initiator, in which a content of the polymerization initiator with respect to the total mass of the member is 0.01 mass ppt to 200 mass ppb.

(11) The member described in any one of (1) to (10) further containing a chain transfer agent, in which a content of the chain transfer agent with respect to the total mass of the member is 0.01 mass ppt to 100 mass ppb.

(12) The member described in any one of (1) to (11), further containing a plasticizer, in which a content of the plasticizer with respect to the total mass of the member is 0.01 mass ppt to 100 mass ppb.

(13) The member described in any one of (1) to (12) used for at least one kind of purpose selected from the group consisting of manufacturing, storage, transport, and transfer of a chemical liquid for manufacturing semiconductors.

(14) The member described in any one of (1) to (13), in which the fluorine-containing polymer is at least one kind of compound selected from the group consisting of polytetrafluoroethylene, perfluoroalkoxyalkane, a tetrafluoroethylene.hexafluoropropylene copolymer, an ethylene.tetrafluoroethylene copolymer, an ethylene.chlorotrifluoroethylene copolymer, polychlorotrifluoroethylene, polyvinylidene fluoride, and polyvinyl fluoride.

(15) The member described in any one of (1) to (14) that satisfies a condition 1 which will be described later.

(16) The member described in any one of (1) to (15) that satisfies a condition 2 which will be described later.

(17) The member described in any one of (1) to (16) that satisfies a condition 3 which will be described later.

(18) The member described in any one of (1) to (17) that satisfies a condition 4 which will be described later.

(19) The member described in any one of (1) to (18), comprising a base material and a coating layer disposed on the base material, in which the coating layer contains a fluorine-containing polymer and a surfactant.

(20) The member described in any one of (1) to (19) that is used for at least one kind of purpose selected from the group consisting of manufacturing, storage, transport, and transfer of a chemical liquid, in which the chemical liquid contains at least one kind of organic solvent selected from the group consisting of propylene glycol monomethyl ether, propylene glycol monoethyl ether, propylene glycol monopropyl ether, propylene glycol monomethyl ether acetate, ethyl lactate, methyl methoxypropionate, cyclopentanone, cyclohexanone, γ-butyrolactone, diisoamyl ether, butyl acetate, isoamyl acetate, isopropanol, 4-methyl-2-pentanol, dimethyl sulfoxide, N-methyl-2-pyrrolidone, diethylene glycol, ethylene glycol, dipropylene glycol, propylene glycol, ethylene carbonate, propylene carbonate, sulfolane, cycloheptanone, and 2-heptanone.

(21) A container formed of the member described in any one of (1) to (20).

(22) A chemical liquid storage body having the container described in (21) and a chemical liquid stored in the container.

(23) The chemical liquid storage body described in (22), in which the chemical liquid contains an organic solvent, and the organic solvent is at least one kind of compound selected from the group consisting of propylene glycol monomethyl ether, propylene glycol monoethyl ether, propylene glycol monopropyl ether, propylene glycol monomethyl ether acetate, ethyl lactate, methyl methoxypropionate, cyclopentanone, cyclohexanone, γ-butyrolactone, diisoamyl ether, butyl acetate, isoamyl acetate, isopropanol, 4-methyl-2-pentanol, dimethyl sulfoxide, n-methyl-2-pyrrolidone, diethylene glycol, ethylene glycol, dipropylene glycol, propylene glycol, ethylene carbonate, propylene carbonate, sulfolane, cycloheptanone, and 2-heptanone.

(24) A chemical liquid purification device for obtaining a chemical liquid by purifying a substance to be purified, comprising a manufacturing tank that stores the substance to be purified, a filter unit that purifies the substance to be purified, and a pipe line that connects the manufacturing tank and the filter unit to each other, in which a liquid contact portion of at least one kind of unit selected from the group consisting of the manufacturing tank, the filter unit, and the pipe line is formed of the member described in any one of (1) to (20).

(25) A manufacturing tank formed of the member described in any one of (1) to (20).

(26) The chemical liquid storage body described in (22) further having a lid that covers the mouth of the container and an O-ring that is disposed between the container and the lid.

(27) The chemical liquid storage body described in (26) in which the O-ring contains a fluorine-containing polymer.

According to the present invention, it is possible to provide a member which enables the obtained chemical liquid to maintain defect inhibition performance for a long period of time in a case where the member is used in a liquid contact portion of a chemical liquid purification device and/or a container storing the chemical liquid and the like. Furthermore, according to the present invention, it is possible to provide a container, a chemical liquid storage body, a chemical liquid purification device, and a manufacturing tank.

DESCRIPTION OF THE PREFERRED EMBODIMENTS

Figure 1:
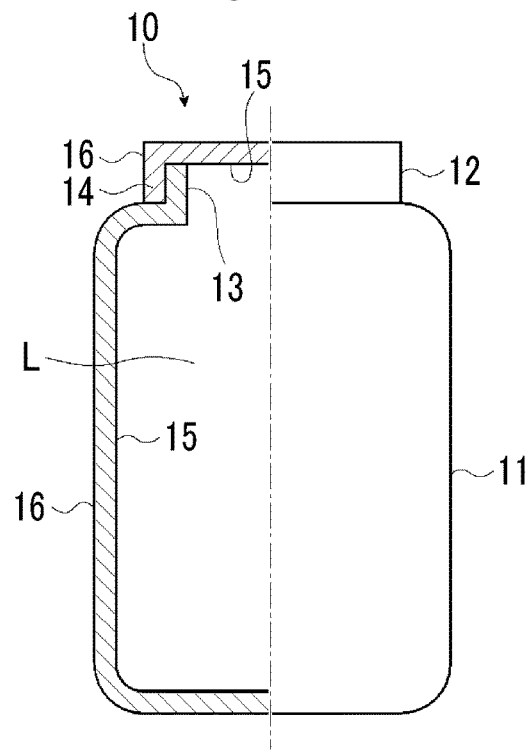
FIG. 1 is a schematic view of a container with a lid having a container according to an embodiment of the present invention and a lid.

Hereinafter, the present invention will be specifically described.

The following constituents will be described based on typical embodiments of the present invention in some cases, but the present invention is not limited to the embodiments.

In the present specification, a range of numerical values described using "to" means a range including the numerical values listed before and after "to" as a lower limit and an upper limit respectively.

In the present invention, "preparation" means not only the preparation of a specific material by means of synthesis or mixing but also the preparation of a predetermined substance by means of purchase and the like.

In the present specification, "ppm" means "parts-per-million $(10^{-6})$", "ppb" means "parts-per-billion $(10^{-9})$", "ppt" means "parts-per-trillion $(10^{-12})$", and "ppq" means "parts-per-quadrillion $(10^{-15})$".

In the present invention, 1 Å (angstrom) equals 0.1 nm.

In the present invention, regarding the description of a group (atomic group), in a case where whether the group is substituted or unsubstituted is not described, as long as the effects of the present invention are not impaired, the group includes a group which does not have a substituent and a group which has a substituent. For example, "hydrocarbon group" includes not only a hydrocarbon group which does not have a substituent (unsubstituted hydrocarbon group) but also a hydrocarbon group which has a substituent (substituted hydrocarbon group). The same is true for each compound.

Furthermore, in the present invention, "radiation" means, for example, far ultraviolet rays, extreme ultraviolet (EUV light; Extreme ultraviolet lithography), X-rays, electron beams, and the like. In addition, in the present invention, "light" means actinic rays or radiation. In the present invention, unless otherwise specified, "exposure" includes not only exposure, far ultraviolet rays, X-rays, and EUV light, and the like, but also lithography by particle beams such as Electron beams or ion beams.

[Member]

The member according to an embodiment of the present invention (hereinafter, simply referred to as "member" as well) is a member which contains a fluorine-containing polymer and surfactant containing fluorine atoms (hereinafter, referred to as "fluorine-containing surfactant" as well). Within a surface of at least a portion of the member, the following condition A is satisfied.

Condition A: Provided that a mass-based content of the fluorine-containing surfactant in the surface is $M_1$ (% by mass), and a mass-based content of the fluorine-containing surfactant in a position 10 nm below the surface in a thickness direction of the member is $M_2$ (% by mass), $M_1/M_2$ is 0.50 to 0.90, and an atom number ratio $X_1$ of the number of fluorine atoms contained in the surface to the number of carbon atoms contained in the surface is 0.50 to 3.0.

The member may adopt an aspect in which the member includes a base material and a coating layer disposed on the base material, and the coating layer contains a fluorine-containing polymer and a fluorine-containing surfactant. In this case, the surface of the member corresponds to the surface of the coating layer.

The thickness of the coating layer is not particularly limited, but is preferably equal to or greater than 0.01 μm in general, more preferably equal to or greater than 0.1 μm, and even more preferably equal to or greater than 5 μm. Furthermore, the thickness of the coating layer is preferably equal to or smaller than 50 μm.

The material constituting the base material may be appropriately selected according to the use, and may be an organic material or an inorganic material. As the organic material, a fluorine-containing polymer which will be described later is preferable (here, this polymer is different from the fluorine-containing polymer contained in the coating layer). As the inorganic material, glass and a metal (stainless steel, an anticorrosive nickel alloy, or the like) are preferable.

The shape of the base material is not particularly limited and can be appropriately selected according to the use.

Furthermore, the base material may be an anticorrosive material which will be described later.

In the present specification, the surface of the member means the interface between the member and another phase (typically, a gas and/or a liquid). The member is preferably used for being brought into contact with a liquid as will be described later. Within the surface of the member, the surface contacting the chemical liquid described above preferably satisfies the condition A described above.

In the member, at least a surface of a portion thereof may satisfy the condition A.

The portion that satisfies the condition A is more preferably a surface of a portion of the liquid contact portion, more preferably the entire surface of the liquid contact portion, and particularly preferably the entire surface of the member.

[Fluorine-Containing Polymer]

The member contains a fluorine-containing polymer. The fluorine-containing polymer is not particularly limited as long as it is a polymer containing fluorine atoms. As the fluorine-containing polymer, known fluorine-containing polymers can be used. The fluorine-containing polymer may have a unit represented by Formula (1) (hereinafter, referred to as "unit 1" as well) and a unit represented by Formula (2) (hereinafter, referred to as "unit 2" as well), but the fluorine-containing polymer is not particularly limited.

In Formula (1), $R_1$ to $R_4$ each independently represent a hydrogen atom, a fluorine atom, a chlorine atom, or a perfluoroalkyl group, $R_1$ to $R_4$ may be the same as or different from each other, and at least one of $R_1$, $R_2$, $R_3$, or $R_4$ represents a fluorine atom or a perfluoroalkyl group.

Particularly, in view of obtaining a member having further improved effects of the present invention, it is preferable that $R_1$ to $R_4$ each independently represent a fluorine atom or a perfluoroalkyl group.

Furthermore, in view of obtaining a member having much further improved effects of the present invention, it is preferable that the fluorine-containing polymer has a unit represented by Formula (1). In this case, the fluorine-containing polymer may have only one kind of unit represented by Formula (1) or two or more kinds of units represented by Formula (1). Examples of the fluorine-containing polymer having only one kind of unit represented by Formula (1) include polytetrafluoroethylene and the like. Examples of the fluorine-containing polymer having two or more kinds of units represented by Formula (1) include perfluoroalkoxyalkane, a tetrafluoroethylene.hexafluoropropylene copolymer, and the like.

The content (mol %) of the unit 1 and unit 2 in the fluorine-containing polymer is not particularly limited, and may be appropriately selected according to the use of the member.

As the fluorine-containing polymer, at least one kind of compound is preferable which is selected from the group consisting of polytetrafluoroethylene (PTFE), perfluoroalkoxyalkane (PFA), a tetrafluoroethylene.hexafluoropropylene copolymer (perfluoroethylene propene copolymer, FEP), an ethylene.tetrafluoroethylene copolymer (ethylene tetrafluoroethylene copolymer, ETFE), an ethylene.chlorotrifluoroethylene copolymer (ECTFE), polychlorotrifluoroethylene (PCTFE), polyvinylidene fluoride (PVDF), and polyvinyl fluoride (PVF). In view of obtaining a member having further improved effects of the present invention, a fully fluorinated fluorine-containing polymer is preferable, PTFE, PFA, or FEP is more preferable, and PFA having undergone terminal stabilization that will be described later or PTFE is even more preferable.

Generally, groups such as —CH$_2$OH and —COOH derived from a polymerizable group and/or a molecular weight adjuster remain on the terminal of a polymer chain of the fluorine-containing polymer in many cases. These groups are unstable and generate —COF by being thermally decomposed at the time of molding. Furthermore, the inventors of the present invention know that —COF undergoes hydrolysis and causes the elution of fluoride ions and the like into a chemical liquid.

The aforementioned fluorine-containing polymer is preferably a fluorine-containing polymer having a perfluoroalkyl group on the terminal thereof. In other words, it is preferable that the fluorine-containing polymer is a treated fluorine-containing polymer (having undergone terminal stabilization) in which the terminal of a polymer chain is substituted with a perfluoroalkyl group. The perfluoroalkyl group is not particularly limited but is preferably —CF$_2$—CF$_3$ or —CF$_3$.

As the method for substituting the terminal of a polymer chain, known methods can be used without particular limitation. For example, it is possible to adopt known methods described in JP1985-240713A (JP-S60-240713A), JP1987-104822A (JP-S62-104822A), JP1991-250008A (JP-H03-250008A), and the like.

The total content (number) of —CH$_2$OH, —COOH, and —COF in the treated fluorine-containing polymer per $10^6$ carbon atoms in the treated fluorine-containing polymer is preferably equal to or smaller than 50, and more preferably equal to or smaller than 30.

Conventionally, it is considered that the fluorine-containing polymer is stable, and accordingly, the terminal thereof does not need to be treated by being substituted with a perfluoroalkyl group. However, by the inventors of the present invention, for the first time, it has been revealed that the influence of the terminal described above becomes significant particularly in a case where the member described above is used for at least one kind of purpose selected from the group consisting of manufacturing, storage, transport, and transfer of a chemical liquid.

The weight-average molecular weight of the fluorine-containing polymer is not particularly limited, and may be 10,000 to 6,500,000 for example. In view of further improving the effects of the present invention, the weight-average molecular weight of the fluorine-containing polymer is preferably 40,000 to 600,000.

[Fluorine-Containing Surfactant]

The member (or coating layer) contains a fluorine-containing surfactant. As the fluorine-containing surfactant, known fluorine-containing surfactants can be used without particular limitation. In the present specification, a fluorine-containing surfactant means a nonionic, cationic, anionic, or amphoteric surfactant having a molecular weight of 100 to 1,500 that contains at least one fluorine atom.

As the fluorine-containing surfactant, a compound is preferable which contains at least one kind of group selected from the group consisting of a carboxy group or a salt thereof, a hydroxy group, and a sulfonic acid group or a salt thereof as a hydrophilic portion in a molecule thereof, and at least one kind of group selected from the group consisting of a linear or branched alkyl group and an aryl group as a hydrophobic portion in a molecule thereof.

Generally, the fluorine-containing polymer has excellent heat resistance. However, it is difficult to perform melting molding on the fluorine-containing polymer in many cases. In these cases, it is possible to adopt a method of dispersing the fluorine-containing polymer and the fluorine-containing surfactant in a solvent such as water and/or an organic solvent so as to obtain a dispersion liquid, and coating a base material with the dispersion liquid so as to forming a member having a coating layer containing the fluorine-containing polymer and the fluorine-containing surfactant. Alternatively, it is possible to adopt a method of applying shearing force to the aforementioned dispersion liquid so as to aggregate particles of the fluorine-containing polymer, drying the particles so as to obtain powder, and performing paste extrusion and molding by using the powder so as to form a member containing the fluorine-containing polymer and the fluorine-containing surfactant.

Examples of the fluorine-containing surfactant include compounds represented by Formulae (1) and (2).

A-CH$_2$—OH      Formula (1)

A-COO$^-$M$^+$      Formula (2)

In the formulae, M$^+$ represents a cation, A's in Formulae (1) and (2) are the same as each other. A represents a group represented by Formula (A1).

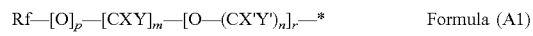

Rf—[O]$_p$—[CXY]$_m$—[O—(CX'Y')$_n$]$_r$—*    Formula (A1)

In the formula, * represents a binding position, Rf represents a fluorinated alkyl group which may have one or more oxygen atoms, p represents 1 or 0, m and n each independently represent an integer equal to or greater than 1, r represents 0 or an integer equal to or greater than 1, X, X', Y, and Y' each independently represent H, F, CF$_3$, or C$_2$F$_5$, a plurality of X's, X''s, Y's, and Y''s may be the same as or different from each other respectively, and X, X', Y, and Y' do not simultaneously represent H.

Alternatively, A represents a group represented by Formula (A2).

R—[CFX]$_t$—*      Formula (A2)

In the formula, * represents a binding position, X represents a hydrogen atom, a halogen atom, or an alkyl group, an alkenyl group, a cycloalkyl group, or an aryl group which may contain one or more fluorine atoms and may contain one or more oxygen atoms, R represents a hydrogen atom or an alkyl group, an alkenyl group, a cycloalkyl group, or an aryl group which may contain a halogen atom except for a fluorine atom and may contain one or more oxygen atoms, and t represents an integer equal to or greater than 1.

Rf is not particularly limited, and examples thereof include a perfluoroalkyl group, a perfluoroalkoxy group, a partially fluorinated alkyl group, a partially fluorinated alkoxy group which may be linear, cyclic, or branched, and the like. Each of these groups may contain an oxygen atom.

"Perfluoroalkyl group" and "perfluoroalkoxy group" refer to a group in which all the hydrogen atoms are substituted with fluorine atoms. "Partially fluorinated alkyl group" and "partially fluorinated alkoxy group" refer to a group in which some of the hydrogen atoms are substituted with fluorine atoms.

Rf may contain 1 to 14 carbon atoms. Rf is not particularly limited, and more specific examples thereof include F$_3$C—, F$_3$CO—, F$_3$CFHC—, F$_5$C$_2$—, F$_3$COF$_2$C—, F$_3$COF$_2$CO—, F$_7$C$_3$—, F$_9$C$_4$—, F$_{11}$C$_5$—, F$_2$HC—, and the like.

It is preferable that at least one of X or Y represents F, $CF_3$, or $C_2F_5$. It is more preferable that each of X and Y is selected from the group consisting of F, $CF_3$, and $C_2F_5$ (for example, both the X and Y represent F, alternatively, X represents F and Y represents $CF_3$).

X, X', Y, and Y' do not simultaneously represent H. In other words, at least one of X, X', Y, or Y' does not represent H.

It is preferable that one group or two or more groups among X, X', Y, and Y' represent H.

It is preferable that at least one of X or Y does not represent H. It is more preferable that both the X and Y do not represent H. It is even more preferable that X and Y are selected such that X and Y represent F.

For example, the fluorine-containing surfactant represented by Formula (1) and Formula (A1) may be a compound which does not contain a hydrogen atom except for the hydrogen atom in the *—$CH_2OH$ group or a compound which preferably contains two or less hydrogen atoms or one or less hydrogen atom in addition to the hydrogen atom in the —$CH_2OH$ group.

In Formula (A2), X represents a hydrogen atom, a halogen atom, an alkyl group, an alkenyl group, a cycloalkyl group, or an aryl group. The alkyl group, the alkenyl group, the cycloalkyl group, and the aryl group represented by X may contain one or more fluorine atoms and one or more oxygen atoms.

R represents a hydrogen atom or an alkyl group, an alkenyl group, a cycloalkyl group, or an aryl group which may contain a halogen atom except for a fluorine atom and contain one or more oxygen atoms. t represents an integer equal to or greater than 1.

In an embodiment of the Formula (A2), X may be an atom such as a hydrogen atom or a halogen atom (for example, a fluorine atom, a chlorine atom, or a bromine atom).

In another embodiment, X may be an alkyl group, a cycloalkyl group, an aryl group, and the like, and the number of carbon atoms contained in these groups is preferably about 1 to 20. These groups may contain a fluorine atom or may be fluorinated to a high degree (that is, at least 80%, 90%, 95%, or 100% of hydrogen atoms bonded to carbon atoms are substituted with fluorine atoms). These groups may contain one or more oxygen atoms (that is, ether bonds). Furthermore, these groups may be linear or branched or saturated or unsaturated. As long as these functional groups are not unnecessarily oxidized and do not become a steric hindrance of an oxidation reaction, these groups may be substituted with other functional groups (for example, amine, sulfide, ester, and the like).

R may be a hydrogen atom or a halogen atom except for a fluorine atom. In another embodiment, examples of R include an alkyl group, an aryl group, an alkoxy group, an oxyalkyl group, a polyoxyalkyl group, a polyoxyalkoxy group which may be linear, cyclic, or branched, and the like.

Specifically, examples of R include $H_3C—$, $H_5C_6—$, and the like.

Specific examples of the fluorine-containing surfactant represented by Formula (1) in which A is represented by Formula (A1) include: $CF_3CF_2—O—CF_2CF_2—OCF_2—CH_2OH$, $CHF_2(CF_2)_5—CH_2OH$, $CF_3(CF_2)_6—CH_2OH$, $CF_3(CF_2)_3(CH_2CF_2)_2CF_2CF_2CF_2—CH_2OH$, $CF_3(CF_2)_2CH_2(CF_2)_2—CH_2OH$, $CF_3(CF_2)_2—CH_2OH$, $CF_3—O—(CF_2)_3—OCF(CF_3)—CH_2OH$, $CF_3CF_2CH_2—O—CF_2CH_2—OCF_2—CH_2OH$, $CF_3—O—(CF_2)_3—OCHFCF_2—CH_2OH$, $CF_3—O—(CF_2)_3—OCF_2—CH_2OH$, $CF_3(CF_2)_2—O—CF(CF_3)CF_2)—OCF(CF_3)—CH_2OH$, $CF_3(CF_2)_2—O—CF_2CF_2—(OCF_2CF_2)_3—OCF(CF_3)—CH_2OH$, $CF_3CF_2—O—CF_2CF_2—(O—CF_2CF_2)_2—O—CF_2—CH_2OH$, $R_f—O—CHF—CH_2OH$, $R_f—O—CHFCF_2—CH_2OH$, $R_f—O—CF_2CHF—CH_2OH$, $R_f—O—CF_2CHFCF_2—CH_2OH$, $R_f—O—CF_2CF_2—CH_2OH$, $R_f—O—CF_2CF_2CF_2—CH_2OH$, $R_f—O—CHFCF_2—O—CF_2—CH_2OH$, $R_f—CHFCF_2—O—CF_2—CH_2OH$, $R_f—O—(CF_2)_n—CH_2OH$, $R_f—(CF_2)_{n1}—CH_2OH$, $R_f—O—CF_2—(O—CF_2)$ $O(CF_2)_{m1}—CH_2OH$, $R_f—O—CF_2CF_2—(O—CF_2CF_2)_{n1-1}—O—(CF_2)_{m1}—CH_2OH$, $R_f—O—CF(CF_3)CF_2—(O—CF(CF_3)CF_2)_{n1-1}—O—(CF_2)_{m1}—CH_2OH$, and $R_f—O—CF_2CF(CF_3)—(O—CF_2CF(CF_3))_{n1-1}—O—(CF_2)_{m1}—CH_2OH$ ($R_f$ represents a partially fluorinated alkyl group or a perfluoroalkyl group which may contain one or more oxygen atoms and is linear or branched, n1 represents 1 to 10, and m1 represents 1 to 10).

Examples of the fluorine-containing surfactant represented by Formula (1) in which A is represented by Formula (A2) include $C_6H_5—CHF—CH_2OH$, $CH_3—CHF—CH_2OH$, and the like.

The fluorine-containing surfactant represented by Formula (1) can be converted into the corresponding compound represented by Formula (2) (carboxylic acid or a salt thereof) by the oxidation of the —$CH_2OH$ to the —$COO^-M^+$ group.

$$A\text{-}COO^-M^+ \quad \text{Formula (2)}$$

In the formula, $M^+$ represents, for example, a hydrogen ion ($H^+$) or a cation such as a metal cation or an organic cation. Typical examples of the metal cation include $Na^+$ and $K^+$. Typical examples of the organic cation include ammonium ($NH_4^+$), alkyl ammonium, alkyl phosphonium, and the like. The group A in Formula (2) is not affected by oxidation. Therefore, A's in Formula (2) and Formula (1) have the same definition, and preferred embodiments thereof are also the same.

The term "carboxylic acid" in the description of Formula (2) includes a carboxylic acid and a carboxylate. Examples of the fluorinated carboxylic acid as the compound represented by Formula (2) include perfluorocarboxylic acid and partially fluorinated carboxylic acid. The perfluorocarboxylic acid is a carboxylic acid based on Formula (2) that does not contain a hydrogen atom except for the hydrogen atom in the —COOH group.

The partially fluorinated carboxylic acid is a carboxylic acid based on Formula (2) that contains at least one fluorine atom and one hydrogen atom in addition to the hydrogen atom in the —COOH group.

Specific examples of the fluorine-containing surfactant represented by Formula (2) in which A is represented by Formula (A1) include:
$CF_3CF_2—O—CF_2CF_2—O—CF_2—COOH$, $CHF_2(CF_2)_4—CF_2—COOH$, $CF_3(CF_2)_5—CF_2—COOH$, $CF_3—O(CF_2)_3—O—CF(CF_3)—COOH$, $CF_3CF_2CH_2—O—CF_2CH_2—O—CF_2—COOH$, $CF_3—O—(CF_2)_3—O—CHFCF_2—COOH$, $CF_3—O—(CF_2)_3—O—CF_2—COOH$, $CF_3(CF_2)_3(CH_2CF_2)_2CF_2CF_2—CF_2—COOH$, $CF_3(CF_2)_2CH_2CF_2—CF_2—COOH$, $CF_3CF_2—CF_2—COOH$, $CF_3(CF_2)_2—OCF(CF_3)CF_2—O—CF(CF_3)—COOH$, $CF_3(CF_2)_2—OCF_2CF_2—(OCF_2CF_2)_3—OCF(CF_3)—COOH$, $CF_3CF_2—O—CF_2CF_2—(O—CF_2CF_2)_2—O—CF_2—COOH$, salts of these (for example, ammonium perfluorooctanoate (structural formula: $CF_3(CF_2)_6COONH_4$), and the like), $R_f$—O—CHF—COO$^-$M$^+$, $R_f$—O—CHFCF$_2$—COO$^-$M$^+$, $R_f$—O—CF$_2$CHF—COO$^-$M+, $R_f$—O—CF$_2$CHFCF$_2$—COO$^-$M$^+$, $R_f$—O—CF$_2$CF$_2$—COO$^-$M$^+$, $R_f$—O—CF$_2$CF$_2$CF$_2$—COO$^-$M$^+$, $R_f$—O—CHFCF$_2$—O—CF$_2$—COO$^-$M$^+$, $R_f$—CHFCF$_2$—O—CF$_2$—COO$^-$M$^+$, $R_f$—O—(CF$_2$)$_{n1}$—COO$^-$M$^+$, $R_f$—(CF$_2$)$_{n1}$—COO$^-$M$^+$, $R_f$—O—CF$_2$—(O—CF$_2$)$_{n1-1}$—O—(CF$_2$)$_m$—COO$^-$M$^+$, $R_f$—O—CF$_2$CF$_2$—(O—CF$_2$CF$_2$)$_{n1-1}$O—(CF$_2$)$_m$—COO$^-$M$^+$, $R_f$—O—CF(CF$_3$)CF$_2$—(O—CF(CF$_3$)CF$_2$)$_{n1-1}$—O—(CF$_2$)$_m$—COO$^-$M$^+$, and $R_f$—O—CF$_2$CF(CF$_3$)—(O—CF$_2$CF(CF$_3$))$_{n1-1}$—O—(CF$_2$)$_m$—COO$^-$M$^+$ (here, $R_f$ represents a partially fluorinated alkyl group or a perfluoroalkyl group which may contain one or more oxygen atoms and is linear or branched, n1 represents 1 to 10, m1 represents 1 to 10, and M$^+$ represents H$^+$ or a cation having the definition described above).

Examples of the fluorine-containing surfactant represented by Formula (2) in which A is represented by (A2) include CH$_3$—CHF—COOH, C$_6$H$_5$CHFCOOH, and the like.

As the fluorine-containing surfactant, it is possible to use the compounds described in paragraph "0045" in JP2015-045030A, paragraphs "0029" to "0031" in JP2016-065259A, paragraphs "0030" to "0033" in JP2016-164273A, US2007/0015864B, US2007/0015865B, US2007/0015866B, US2007/0276103B, US2007/0117914B, US2007/0142541B, US2008/0015319B, U.S. Pat. Nos. 3,250,808, 3,271,341, JP2003-119204A, WO2005/042593A, WO2008/060461A, WO2007/046377A, WO2007/119526A, WO2007/046482A, and WO2007/046345A, and the like.

The octanol/water partition coefficient of the fluorine-containing surfactant represented by Log Pow is preferably equal to or smaller than 8.0, more preferably equal to or smaller than 7.0, even more preferably equal to or smaller than 4.9, particularly preferably equal to or smaller than 3.7, and most preferably equal to or smaller than 3.4. In the present specification, the octanol/water partition coefficient (Log Pow) is a partition coefficient between 1-octanol and water and represented by LogP [in the formula, P represents content of fluorine-containing surfactant in octanol/content of fluorine-containing surfactant in water in a case where phase separation occurs in a mixture of octanol/water (1:1) containing the fluorine-containing surfactant].

In order to determine the octanol/water partition coefficient represented by Log Pow, high performance liquid chromatography (HPLC) is performed on a standard substance (heptanoic acid, octanoic acid, nonanoic acid, and decanoic acid) having a known octanol/water partition coefficient under the conditions of column: TOSOH ODS-120T column ($\phi$ 4.6 mm×250 mm), eluent: acetonitrile/0.6% by mass aqueous HClO$_4$=1/1 (vol/vol %), flow rate: 1.0 ml/min, sample amount: 300 μL, column temperature: 40° C., and detection light: UV 210 nm, creating a calibration curve by plotting the elution time and the known octanol/water partition coefficient, and calculating Log Pow from the HPLC elution time of a sample liquid based on the calibration curve.

As the fluorine-containing surfactant having Log Pow equal to or smaller than 3.7, at least one kind of fluorine-containing surfactant is preferable which is selected from the group consisting of $CF_3$—$(CF_2)_4$—COO$^-$X$^+$  General Formula:

(in the formula, X$^+$ represents a hydrogen ion, NH$_4^+$, or an alkali metal ion), $CF_3CF_2CF_2$—O—$CF(CF_3)$—COO$^-$X$^+$  General Formula:

(in the formula, X$^+$ represents a hydrogen ion, NH$_4^+$, or an alkali metal ion), $CF_3$—O—$CF(-CF_3)CF_2$—O—$CF(-CF_3)$—COO$^-$X$^+$  General Formula:

(in the formula, X$^+$ represents a hydrogen ion, NH$_4^+$, or an alkali metal ion), and $CF_3CF_2$—O—$CF_2CF_2$—O—$CF_2$—COO$^-$X$^+$  General Formula:

(in the formula, X$^+$ represents a hydrogen ion, NH$_4^+$, or an alkali metal ion).

Examples of the fluorine-containing surfactant having Log Pow equal to or smaller than 3.7 also include General Formula: $CF_3$—O—$CF_2CF_2$—O—$CF_2CF_2$—COO$^-$X$^+$ (in the formula, X$^+$ represents a hydrogen ion, NH$_4^+$, or an alkali metal ion), General Formula: $CF_3$—O—$CF_2CF_2CF_2$—O—CHFCF$_2$—COO$^-$X$^+$ (in the formula, X$^+$ represents a hydrogen ion, NH$_4^+$, or an alkali metal ion), and the like.

In a case where the fluorine-containing surfactant is a salt, examples of counter ions forming the salt include an alkali metal ion, NH$_4^+$, and the like. Examples of the alkali metal ion include Na$^+$, K$^+$, and the like.

Specific examples of the fluorine-containing surfactant having Log Pow equal to or smaller than 3.7 include $CF_3$—O—$CF(CF_3)CF_2$—O—$CF(CF_3)$—COOH, $CF_3$—O—$CF(CF_3)CF_2$—OCF(CF$_3$)—COO$^-$NH$_4^+$, $CF_3CF_2$—O—$CF_2CF_2$—O—$CF_2$—COOH, $CF_3CF_2$—O—$CF_2CF_2$—O—$CF_2$—COO$^-$NH$_4^+$, $CF_3$—O—$CF_2CF_2CF_2$—O—CHFCF$_2$—COOH, $CF_3$—O—$CF_2CF_2CF_2$—O—CHFCF$_2$—COO$^-$NH$_4^+$, $CF_3$—$(CF_2)_4$—COOH, $CF_3$—$(CF_2)_4$—COO$^-$NH$_4^+$, $CF_3CF_2CF_2$—O—$CF(CF_3)$—COO$^-$NH$_4^+$, $CF_3CF_2CF_2$—O—$CF(CF_3)$—COOH, and the like.

Although the fluorine-containing surfactant is useful for molding a member containing a fluorine-containing polymer, according to the examination performed by the inventors of the present invention, it has been revealed that depending on how the content of the fluorine-containing surfactant is distributed in the member, sometimes the defect inhibition performance of A chemical liquid deteriorates over time.

The member may contain components in addition to the fluorine-containing polymer and the fluorine-containing surfactant described above.

For example, in view of further improving the effects of the present invention, the member may further contain a compound represented by Formula (3) (hereinafter, described as "compound 3" as well). The compound 3 is a raw material used for synthesizing the fluorine-containing polymer.

$CH_2$=$CX^a(CF_2)_nY^a$  Formula (3)

In Formula (3), $X^a$ and $Y^a$ each independently represent a hydrogen atom or a fluorine atom, and n represents an integer of 1 to 8.

The content of the compound 3 is not particularly limited, but is preferably 0.0001% to 0.05% by mass with respect to the total mass of the member.

In view of further improving the effects of the present invention, the member may further contain a polymerization initiator.

The type of the polymerization initiator is not particularly limited, and examples thereof include an azo-based compound such as azobisisobutyronitrile; a peroxycarbonate-based compound such as diisopropyl peroxycarbonate; a peroxyester-based compound such as tert-butyl peroxypivalate, tert-butyl peroxyisobutyrate, and tert-butyl peroxyacetate; a non-fluorine-based diacyl peroxide-based compound such as isobutyryl peroxide, octanoyl peroxide, benzoyl peroxide, and lauroyl peroxide; a fluorine-containing diacyl peroxide-based compound such as $(Z(CF_2)_pCOO)_2$ (wherein Z represents a hydrogen atom, a fluorine atom, or a chlorine atom, and p represents an integer of 1 to 10); an inorganic peroxide such as potassium persulfate, sodium persulfate, and ammonium persulfate.

The content of the polymerization initiator is not particularly limited, but is preferably 0.01 mass ppt to 100 mass ppb with respect to the total mass of the member.

In view of further improving the effects of the present invention, the member may further contain a chain transfer agent.

The type of the chain transfer agent is not particularly limited, and examples thereof include an alcohol such as ethanol; chlorofluorohydrocarbon such as 1,3-dichloro-1,1,2,2,3-pentafluoropropane and 1,1-dichloro-1-fluoroethane; and hydrocarbon such as pentane, hexane, and cyclohexane.

The content of the chain transfer agent is not particularly limited, but is preferably 0.01 mass ppt to 100 mass ppb with respect to the total mass of the member.

In view of further improving the effects of the present invention, the member may further contain a plasticizer. The fluorine-containing surfactant described above is not included in the plasticizer.

The type of plasticizer is not particularly limited, and examples thereof include a phthalic acid ester-based compound.

The content of the plasticizer is not particularly limited, but is preferably 0.01 mass ppt to 100 mass ppb with respect to the total mass of the member.

[$M_1$ and $M_2$]

Provided that a mass-based content of the fluorine-containing surfactant in at least a surface of a portion (preferably the entirety) of the member (in a case where the member has a coating layer, at least a surface of a portion (preferably the entirety) of the coating layer) according to the embodiment of the present invention is $M_1$, and a mass-based content of the fluorine-containing surfactant in a position 10 nm below the surface in a thickness direction of the member is $M_2$, $M_1/M_2$ is 0.50 to 0.90.

Provided that $M_1/M_2$ is equal to or higher than 0.50, the fluorine-containing surfactant is inhibited from being liberated into a chemical liquid in a case where the member contacts the chemical liquid, and consequently, the defect inhibition performance of the chemical liquid is maintained. Provided that $M_1/M_2$ is equal to or lower than 0.90, the surface has a shape exhibiting interface characteristics that make it easy for the surface to retain organic impurities and/or metal impurities. Accordingly, the organic impurities and/or the metal impurities are inhibited from being liberated into a chemical liquid in a case where the member contacts the chemical liquid, and consequently, the defect inhibition performance of the chemical liquid is maintained.

The relationship described above is preferably satisfied in at least a surface of a portion of the member, more preferably satisfied in a surface of portion of the liquid contact portion, even more preferably satisfied within the entire surface of the liquid contact portion, and particularly preferably satisfied within the entire surface of the member.

In the present specification, $M_1/M_2$ represents a numerical value measured using time-of-flight secondary ion mass spectrometer (TOF-SIMS) (manufactured by IONTOF GmbH, trade name: "TOF-SIMS5"). The measurement conditions for TOF-SIMS are as below.

Primary ion: $Bi_3^{2+}$
Primary ion accelerating voltage: 25 kV
Measurement area: 150 μm
Angle measurement temperature: equal to or lower than $-100°$ C.

For performing analysis in the thickness direction, a method is used in which a sample is irradiated with Ar gas cluster ion beams (Ar-GCIB) for etching and with $Bi^{3+}$ as a primary ion source, and the obtained secondary ions are analyzed using a time-of-flight mass spectrometer so as to obtain a spectrum.

In a case where etching is performed using Ar-GCIB, the molecular structure is not destroyed in the thickness direction from the surface. Accordingly, regarding the state of interfacial bonding, accurate information can be obtained. Because the value obtained by the measurement is expressed using atom/cm$^2$, the number of moles is calculated from the numerical value and multiplied by the number of atoms (number of molecules) so as to convert the value into mass.

Ar-GCIB injection pressure: 3 MPa
Measurement surface: 150 μm×150 μm
Measurement mode: high-resolution mass spectrometry $M_1$ is not particularly limited, but is preferably equal to or greater than 0.0001% by mass, more preferably equal to or greater than 0.0006% by mass, even more preferably equal to or greater than 0.002% by mass, and particularly preferably equal to or greater than 0.04% by mass. Furthermore, $M_1$ is preferably equal to or smaller than 10% by mass, more preferably equal to or smaller than 8.0% by mass, even more preferably equal to or smaller than 1.5% by mass, particularly preferably equal to or smaller than 1.0% by mass, and most preferably equal to or smaller than 0.1% by mass.

In a case where $M_1$ is equal to or greater than 0.0006% by mass, the formation of a member (for example, a container or the like) sufficiently proceeds, and a tougher member is obtained. Such a member makes it more difficult for impurities to be eluted into a chemical liquid, and the obtained chemical liquid has further improved defect inhibition performance.

In a case where $M_1$ is equal to or smaller than 1.5% by mass, the fluorine-containing surfactant is further inhibited from being eluted as impurities into the chemical liquid.

$M_2$ is not particularly limited, but is preferably equal to or greater than 0.0005% by mass, more preferably equal to or greater than 0.0010% by mass, even more preferably equal to or greater than 0.005% by mass, and particularly preferably equal to or greater than 0.05% by mass. Furthermore, $M_2$ is preferably equal to or smaller than 20% by mass, more preferably equal to or smaller than 10% by mass, even more preferably equal to or smaller than 5.0% by mass, particularly preferably equal to or smaller than 1.8% by mass, and most preferably equal to or smaller than 0.21% by mass. In view of obtaining a chemical liquid storage body having further improved effects of the present invention, $M_2$ is preferably 0.0010% to 5.0% by mass.

In a case where $M_2$ is equal to or greater than 0.0010% by mass, the formation of a member (for example, a container or the like) sufficiently proceeds, and a tougher member is obtained. Such a member makes it more difficult for impurities to be eluted into the chemical liquid, and the obtained chemical liquid has further improved defect inhibition performance.

In a case where $M_2$ is equal to or smaller than 1.2% by mass, the fluorine-containing surfactant is further inhibited from being eluted as impurities into the chemical liquid.

Provided that a mass-based content of the compound 3 in at least a surface of a portion (preferably the entirety) of the member (in a case where the member has a coating layer, at least a surface of a portion (preferably the entirety) of the coating layer) according to the embodiment of the present invention is $M_3$, and a mass-based content of the compound 3 in a position 10 nm below the surface in a thickness direction of the member is $M_4$, $M_3/M_4$ is not particularly limited. However, in view of further improving the effects of the present invention, $M_3/M_4$ is preferably 0.50 to 1.50.

$M_3/M_4$ can be calculated, for example, by the same method as that used for calculating $M_1/M_2$.

$M_3$ is not particularly limited, but is preferably equal to or greater than 0.0001% by mass, more preferably equal to or greater than 0.0006% by mass, and even more preferably equal to or greater than 0.002% by mass. Furthermore, $M_3$ is preferably equal to or smaller than 10% by mass, more preferably equal to or smaller than 1% by mass, and even more preferably equal to or smaller than 0.1% by mass.

$M_4$ is not particularly limited, but is preferably equal to or greater than 0.0005% by mass, and more preferably equal to or greater than 0.0010% by mass. Furthermore, $M_3$ is preferably equal to or smaller than 10% by mass, more preferably equal to or smaller than 1% by mass, and particularly preferably equal to or smaller than 0.1% by mass.

In the member according to the embodiment of the present invention, $M_1/M_3$ is not particularly limited. However, in view of further improving the effects of the present invention, $M_1/M_3$ is preferably 0.01 to 100.

[$X_1$]

In the member according to the embodiment of the present invention, an atom number ratio $X_1$ of the number of fluorine atoms contained in at least a surface of a portion (preferably the entirety) of the member to the number of carbon atoms contained in the same surface is 0.5 to 3.0. $X_1$ is affected by the type and amount of the fluorine-containing polymer and the fluorine-containing surfactant contained in the member and the distribution of thermally decomposed products of the fluorine-containing polymer and thermally decomposed products of the fluorine-containing surfactant in the member.

In a case where $X_1$ is equal to or higher than 0.5, the chemical resistance on a base material is improved. Therefore, the elution of impurities into the chemical liquid is reduced, and consequently, the defect inhibition performance of the chemical liquid is maintained. In a case where $X_1$ is equal to or lower than 3.0, an excess of fluorine atoms is not on the surface. Therefore, free fluorine atoms or fluorine atoms that are nearly free are not on the surface, the elution of these elements and ions is reduced, and consequently, the defect inhibition performance of the chemical liquid is maintained.

In view of obtaining a member having further improved effects of the present invention, $X_1$ is preferably equal to or higher than 0.8, more preferably equal to or higher than 1.0, even more preferably equal to or higher than 1.5, particularly preferably equal to or higher than 1.8, and most preferably higher than 1.8. Furthermore, $X_1$ is preferably equal to or lower than 2.5, more preferably equal to or lower than 2.0, and even more preferably lower than 2.0.

The relationship described above is preferably satisfied in at least a surface of a portion of the member, more preferably satisfied in a surface of portion of the liquid contact portion, even more preferably satisfied within the entire surface of the liquid contact portion, and particularly preferably satisfied within the entire surface of the member.

In the present specification, $X_1$ means a numerical value determined by calculating the content (atm %) of fluorine atoms measured by X-ray photoelectron spectroscopy with respect to the content (atm %) of carbon atoms measured by the same technique.

Furthermore, the surface of the member means the interface between the member and another phase.

[Condition 1]

It is preferable that the member satisfies a condition 1 in the following test (hereinafter, referred to as "specific test" as well) because then the member has further improved effects of the present invention.

Specific test: under the condition that a mass ratio of a mass (g) of the member to a mass (g) of a test solvent containing isopropanol at a proportion equal to or higher than 99.99% by mass (mass (g) of member/mass (g) of test solvent) is 0.1 in a case where a liquid temperature of the test solvent is set to be 25° C., the member is immersed in the test solvent with a liquid temperature of 25° C. for 48 hours.

Condition 1: in a case where the test solvent having been used for immersion contains one kind of organic impurities, an increase in the content of one kind of the organic impurities before and after the immersion is equal to or smaller than 1,000 mass ppb, and in a case where the test solvent having been used for immersion contains two or more kinds of organic impurities, an increase in the total content of two or more kinds of the organic impurities before and after the immersion is equal to or smaller than 1,000 mass ppb.

The lower limit of the increase before and after the immersion is not particularly limited, and depends on a quantitative lower limit. Generally, the lower limit of the increase before and after the immersion is preferably equal to or greater than 0.01 mass ppt. In a case where the test solvent contains two or more kinds of organic impurities, the total content thereof is preferably within the above range.

In the present specification, the organic impurities specified in the condition 1 means an organic compound other than isopropanol contained in the test solvent. The content of the organic impurities are measured using a gas chromatography mass spectrometer (trade name "GCMS-QP2020", manufactured by Shimadzu Corporation). The measurement conditions are as described in Examples. Although there is no particular limitation, in a case where the organic impurities are a high-molecular-weight compound, the techniques such as pyrolyzer-quadrupole time-of-flight/mass spectrometry (Py-QTOF/MS), pyrolyzer-ion trapping mass spectrometry (Py-IT/MS), pyrolyzer magnetic sector field mass spectrometry (Py-Sector/MS), pyrolyzer Fourier transform ion cyclotron resonance mass spectrometry (Py-FTICR-MS), pyrolyzer quadrupole mass spectrometry (Py-Q/MS), and pyrolyzer ion trap mass time-of-flight mass spectrometry (Py-IT-TOF/MS) may be used for identifying the structure or quantifying the concentration from the decomposition product. For example, for Py-QTOF/MS, a device manufactured by Shimadzu Corporation or the like can be used.

As the test solvent, a solvent is used which contains isopropanol at a proportion equal to or higher than 99.99% by mass. This solvent is commercially available as high-purity isopropanol for manufacturing semiconductors.

The specific test is performed according to the following procedure. The member and the test solvent are stored in a container for test, the entirety of the member is immersed in the test solvent and kept as it is for 48 hours in a state where the test solvent is kept at a liquid temperature of 25° C. and inhibited from being concentrated. In a case where the liquid temperature of the test solvent is set to be 25° C., the mass ratio of the mass (g) of the member to the mass (g) of the test solvent is 0.1 (10%). For example, 10 g of the member is immersed in 100 g (25° C.) of the test solvent.

The container for test used in the specific test is used after being washed in advance with the test solvent used as a washing solution. As the container for test, it is preferable to use a container from which organic impurities are not eluted. In a case where organic impurities are likely to be eluted from the container for test, a blank test is performed by the following method, and the amount of organic impurities eluted from the container for test is subtracted from the result.

(Blank Test)

A test solvent having the same mass as the test solvent used in the specific test is stored in a container for test and kept as it is for 48 hours in a state where the test solvent is kept at a liquid temperature of 25° C. and inhibited from being concentrated. At this time, an increase in organic impurities in the test solvent before and after the elapse of 48 hours is adopted as the amount of organic impurities eluted from the container for test.

[Condition 2]

It is preferable that the member satisfies a condition 2 in the specific test because then the member has further improved effects of the present invention.

Condition 2: in a case where the test solvent having been used for immersion contains one kind of metal ions, an increase in the content of one kind of the metal ions before and after the immersion is equal to or smaller than 10 mass ppb, and in a case where the test solvent having been used for immersion contains two or more kinds of metal ions, an increase in the total content of two or more kinds of the metal ions before and after the immersion is equal to or smaller than 10 mass ppb.

The lower limit of the increase before and after the immersion is not particularly limited, and depends on a quantitative lower limit. Generally, the lower limit of the increase before and after the immersion is preferably equal to or greater than 0.01 mass ppt. In a case where the test solvent contains two or more kinds of metal ions, the total content thereof is preferably within the above range.

In the present specification, the content of metal ions means the content of metal ions measured by Single Nano Particle Inductively Coupled Plasma Mass Spectrometry (SP-ICP-MS).

The device used in SP-ICP-MS is the same as the device used in general inductively coupled mass spectrometry (ICP-MS) (hereinafter, simply referred to as "ICP-MS" as well). The only difference between SP-ICP-MS and ICP-MS is how to analyze data. With SP-ICP-MS, data can be analyzed using commercial software.

With ICP-MS, the content of metal components as a measurement target is measured regardless of the way the metal components are present. Accordingly, the total mass of the metal particles and metal ions as a measurement target is quantified as the content of metal components.

With SP-ICP-MS, the content of metal particles is measured. Accordingly, by subtracting the content of metal particles from the content of metal components in a sample, the content of metal ions in the sample can be calculated.

Examples of the device for SP-ICP-MS include Agilent 8800 triple quadrupole inductively coupled plasma mass spectrometry (ICP-MS, for semiconductor analysis, option #200) manufactured by Agilent Technologies, Inc. This device can measure the content of metal ions by the method described in Examples. Examples of the device other than the above include NexION350S manufactured by PerkinElmer Inc., Agilent 8900 manufactured by Agilent Technologies, Inc., and the like.

Specifically, the increase in metal ions before and after the immersion is calculated by the following method.

The test solvent (25° C.) having been used for immersion is collected, and a metal ion content $MI_2$ is measured. At this time, in a case where the test solvent having been used for immersion contains two or more kinds of metal ions, $MI_2$ means the total content thereof.

By using a preliminarily measured content $MI_1$ of metal ions contained in the test solvent which is not yet used for immersion (in a case where the test solvent which is not yet used for immersion contains two or more kinds of metal ions, $MI_1$ means the total content thereof), the increase in metal ions before and after the immersion is calculated by $MI_2-MI_1$.

The method of the specific test is the same as described above.

In a case where the increase in the content of metal ions before and after the immersion is equal to or smaller than 10 mass ppb, a member having further improved effects of the present invention is obtained. In view of obtaining a member having much further improved effects of the present invention, the increase in the content of metal ions before and after the immersion is more preferably 0.01 mass ppt to 1 mass ppm.

[Condition 3]

It is preferable that the member satisfies a condition 3 in the specific test because then the member has further improved effects of the present invention.

Condition 3: in a case where the test solvent having been used for immersion contains one kind of metal particles, an increase in the content of one kind of the metal particles before and after the immersion is equal to or smaller than 10 mass ppb, and in a case where the test solvent having been used for immersion contains two or more kinds of metal particles, an increase in the total content of two or more kinds of the metal particles before and after the immersion is equal to or smaller than 10 mass ppb.

The lower limit of the increase before and after the immersion is not particularly limited, and depends on a quantitative lower limit. Generally, the lower limit of the increase before and after the immersion is preferably equal to or greater than 0.001 mass ppt. In a case where the test solvent contains two or more kinds of metal particles, the total content thereof is preferably within the above range.

The method for measuring the content of metal particles, the method for calculating the increase before and after the immersion, and the method of the specific test are as described above.

In a case where the increase in the content of metal particles before and after the immersion is equal to or smaller than 10 mass ppb, a member having further improved effects of the present invention is obtained. In view of obtaining a member having much further improved effects of the present invention, the increase in the content of metal particles before and after the immersion is more preferably 0.01 mass ppt to 1 mass ppm.

[Condition 4]

It is preferable that the member satisfies a condition 4 in the specific test because then the member has further improved effects of the present invention.

Condition 4: in a case where the test solvent having been used for immersion contains one kind of fluoride ions, an increase in the content of one kind of the fluoride ions before and after the immersion is equal to or smaller than 10 mass ppb, and in a case where the test solvent having been used for immersion contains two or more kinds of fluoride ions, an increase in the total content of two or more kinds of the fluoride ions before and after the immersion is equal to or smaller than 10 mass ppm.

The lower limit of the increase before and after the immersion is not particularly limited, and depends on a quantitative lower limit. Generally, the lower limit of the increase before and after the immersion is preferably equal to or greater than 0.001 mass ppt. In a case where the test solvent contains two or more kinds of fluoride ions, the total content thereof is preferably within the above range.

The content of fluoride ions in the test solvent before and after the immersion is measured by ion chromatography. The ion chromatography is performed under the following conditions by using the following device.

Used device: HIC-SP suppressor ion chromatograph manufactured by Shimadzu Corporation Used column: ion exchange resin (inner diameter: 4.0 mm, length: 25 cm)

Mobile phase: sodium hydrogen carbonate solution (1.7 mmol/L)-sodium carbonate solution (1.8 mmol/L)

Flow rate: 1.5 mL/min

Amount of sample injected: 25 μL

Column temperature: 40° C.

Suppressor: electrodialysis type

Detector: electric conductivity detector (30° C.)

The method for calculating the increase before and after the immersion and the method of the specific test are as described above.

In a case where the increase in the content of fluoride ions before and after the immersion is equal to or smaller than 10 mass ppb, a member having further improved effects of the present invention is obtained. In view of obtaining a member having much further improved effects of the present invention, the increase in the content of fluoride ions before and after the immersion is more preferably 0.01 mass ppt to 0.5 mass ppm.

[Preferred Mechanical Characteristics of Member]

The mechanical characteristics of the member are not particularly limited. Regarding hardness, the hardness of the member measured using type D durometer based on JIS K6253 is preferably equal to or higher than D55, and more preferably equal to or higher than 58. The upper limit thereof is not particularly limited, but is preferably equal to or lower than 65 in general.

The tensile strength of the member is not particularly limited, but is preferably equal to or higher than 25 MPa, and more preferably equal to or higher than 28 MPa. The upper limit thereof is not particularly limited, but is preferably equal to or lower than 40 MPa in general.

The coefficient of linear thermal expansion of the member is not particularly limited, but is preferably equal to or smaller than $10 \times 10^{-5}$ (1/K), and more preferably equal to or smaller than $10 \times 10^{-6}$ (1/K). The lower limit thereof is not particularly limited, but is preferably equal to or greater than $10 \times 10^{-8}$ (1/K) in general.

[Use of Member]

It is preferable that the member is used for manufacturing (including purification), storage, transport, or transfer of a chemical liquid containing an organic solvent. The member has characteristics described so far. Therefore, for example, in a case where the member is used in a container used for storing or transporting the chemical liquid, impurities (organic impurities, metal ions, metal particles, fluoride ions, and the like) are hardly eluted into the stored chemical liquid, and consequently, the defect inhibition performance of the chemical liquid is easily maintained.

Furthermore, in a case where the member is used in a liquid contact portion of a device (including a pipe line transferring the chemical liquid) for manufacturing the chemical liquid, even though the device is used for a long period of time, the amounts of impurities flowing out of the member hardly increases. Accordingly, a chemical liquid having excellent defect inhibition performance can be manufactured for a long period of time.

[Container]

The container according to an embodiment of the present invention is a container formed of the member described above. FIG. 1 is a schematic view of a container with a lid that has the container according to the embodiment of the present invention and a lid.

The container 10 with a lid has a hollow container 11 and a lid 12. By a male screw not shown in the drawing that is provided on the outside of a mouth 13 of the container 11 and a female screw not shown in the drawing that is provided on the inside of a lateral portion 14 of the lid 12, the container 11 and the lid 12 can be fitted with each other. By the container 11 and the lid 12 fitted with each other, a cavity L is formed in the interior of the container 10 with a lid, and a chemical liquid (for example, a chemical liquid containing an organic solvent and particularly preferably a chemical liquid for manufacturing semiconductors) can be stored in the cavity L.

Although an O-ring is not shown in FIG. 1, the container with a lid may further comprise an O-ring. That is, an O-ring may be disposed to fill up the void between the container and the lid. In other words, the lid may be engaged with the container through an O-ring.

The type of the O-ring is not particularly limited, but it is preferable that the O-ring contains a fluorine-containing polymer. More specifically, the liquid contact portion of the O-ring is preferably constituted with a fluorine-containing polymer. For example, the O-ring may be constituted with a fluorine-containing polymer. Alternatively, the O-ring may be an O-ring with a coating layer including an O-ring body, which is formed of a resin (for example, a silicone resin) other than a fluorine-containing polymer, and a coating layer which contains a fluorine-containing polymer and is disposed to cover the O-ring body.

The type of the fluorine-containing polymer is as described above.

The liquid contact portion of the container 10 with a lid is formed of the member described above. That is, an inner wall surface 15 as the liquid contact portion of the container 10 with a lid is a member which contains a fluorine-containing polymer and a fluorine-containing surfactant and has specific characteristics. Although the inner wall surface 15 of the container 10 with a lid is formed of the member described above, the container according to the embodiment of the present invention is not limited thereto, and at least a portion of the liquid contact portion may be formed of the member described above.

In a case where a chemical liquid is stored in the interior of the container, in the liquid contact portion thereof (a surface contacting the stored substance; the liquid contact portion means a portion which is likely to contact the stored substance even though the portion does not actually contact the stored substance; the liquid contact portion is preferably the entire surface of the container), $M_1/M_2$ is preferably 0.50 to 0.90, and $X_1$ is preferably 0.5 to 3.0. In a case where the container has these characteristics, even though the chemical liquid is stored and preserved in the container, the defect inhibition performance of the chemical liquid does not deteriorate over time.

In other words, the container according to the embodiment of the present invention is preferably a container (hereinafter, referred to as "specific container 1" as well) containing a fluorine-containing polymer and a surfactant containing fluorine atoms, in which provided that a mass-based content of the surfactant in at least a surface (inner wall surface) of a portion of the container is $M_1$, and a mass-based content of the surfactant in a position 10 nm below the surface in a thickness direction is $M_2$, $M_1/M_2$ is 0.50 to 0.90, and an atom number ratio $X_1$ of the number of fluorine atoms contained in the aforementioned surface to the number of carbon atoms contained in the aforementioned surface is 0.5 to 3.0.

As described above, the specific container 1 may contain the compound 3, a polymerization initiator, a chain transfer agent, or a plasticizer. The content of each of the components is as described above. In a case where the content of each of the components is read, the total mass of the member is replaced with the total mass of the container. Specifically, in a case where the specific container 1 contains the compound 3, the content of the compound 3 is not particularly limited but is preferably 0.0001% to 0.05% by mass with respect to the total mass of the container. In a case where the specific container 1 contains a polymerization initiator, the content of the polymerization initiator is not particularly limited but is preferably 0.01 mass ppt to 100 mass ppb with respect to the total mass of the container. In a case where the specific container 1 contains a chain transfer agent, the content of the chain transfer agent is not particularly limited but is preferably 0.01 mass ppt to 100 mass ppb with respect to the total mass of the container. In a case where the specific container 1 contains a plasticizer, the content of the plasticizer is not particularly limited but is preferably 0.01 mass ppt to 100 mass ppb with respect to the total mass of the container.

In a case where a chemical liquid is stored in the interior of the specific container 1, in the liquid contact portion thereof (a surface contacting the stored substance; the liquid contact portion means a portion which is likely to contact the stored substance even though the portion does not actually contact the stored substance; the liquid contact portion is preferably the entire surface of the container), $M_1/M_2$ is preferably 0.50 to 0.90, and $X_1$ is preferably 0.5 to 3.0.

In the liquid contact portion (preferably the entire surface) of the specific container 1, it is preferable that $M_3$, $M_4$, $M_3/M_4$, and $M_1/M_3$ described above are within the range described above.

For the specific container 1, the specific test described above is performed as below.

Specific test 1: under the condition that a mass ratio of a mass (g) of the container to a mass (g) of a test solvent containing isopropanol at a proportion equal to or higher than 99.99% by mass (mass (g) of member/mass (g) of test solvent) is 0.1 in a case where a liquid temperature of the test solvent is set to be 25° C., the container is immersed in the test solvent with a liquid temperature of 25° C. for 48 hours.

In the container 10 with a lid, $M_1/M_2$ and $X_1$ in the inner wall surface 15 satisfy a predetermined range. It is preferable that in an outer wall surface 16, $M_1/M_2$ and $X_1$ also satisfy a predetermined range.

Figure 2:
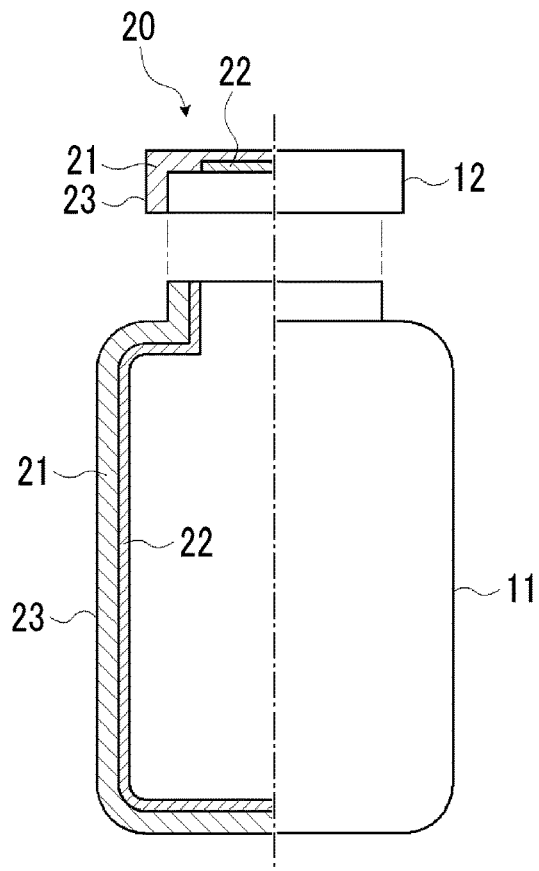
FIG. 2 is a schematic view showing a modification example of the container with a lid having a container according to an embodiment of the present invention and a lid.

FIG. 2 shows a modification example of a container with a lid having the container according to the embodiment of the present invention and a lid. A container 20 with a lid has the container 11 and the lid 12. By fitting the container 20 with a lid and the lid 12 with each other, the cavity L can be formed in the interior of the container. FIG. 2 shows a state where the lid 12 is not yet fitted with the container 11. In a case where the lid 12 is fitted with the container 11, the liquid contact portion of the container 11 and the liquid contact portion of the lid 12 are connected to each other, and accordingly, a liquid contact portion surrounding the cavity is formed.

In the container 20 with a lid, each of the container 11 and the lid 12 has a base material 21 and a coating layer 22 formed on the base material 21. The base material 21 and the coating layer 22 form the member described above.

The liquid contact portion of the container 20 with a lid has the coating layer 22. Therefore, impurities are hardly eluted into a chemical liquid stored in the cavity. Consequently, even though the chemical liquid is stored and preserved in the container, the defect inhibition performance of the chemical liquid does not deteriorate over time.

In a case where a chemical liquid is stored in the interior of the container 20 with a lid, in the liquid contact portion thereof (a surface contacting the stored substance; the liquid contact portion means a portion which is likely to contact the stored substance even though the portion does not actually contact the stored substance; the liquid contact portion is preferably the entire surface of the coating layer), $M_1/M_2$ is preferably 0.50 to 0.90, and $X_1$ is preferably 0.5 to 3.0.

In other words, the aforementioned container is preferably a container (hereinafter, referred to as "specific container 2" as well) having a container body and a coating layer formed on the container body, in which the coating layer contains a fluorine-containing polymer and a surfactant containing fluorine atoms, provided that a mass-based content of the surfactant in at least a surface of a portion of the container (coating layer) is $M_1$, and a mass-based content of the surfactant in a position 10 nm below the surface in a thickness direction is $M_2$, $M_1/M_2$ is 0.50 to 0.90, and an atom number ratio $X_1$ of the number of fluorine atoms contained in the aforementioned surface to the number of carbon atoms contained in the aforementioned surface is 0.5 to 3.0.

In this case, as described above, the coating layer may contain the compound 3, a polymerization initiator, a chain transfer agent, or a plasticizer. The content of each of the components is as described above. In a case where the content of each of the components is read, the total mass of the member is replaced with the total mass of the coating layer. Specifically, in a case where the coating layer contains the compound 3, the content of the compound 3 is not particularly limited but is preferably 0.0001% to 0.05% by mass with respect to the total mass of the coating layer. In a case where the coating layer contains a polymerization initiator, the content of the polymerization initiator is not particularly limited but is preferably 0.01 mass ppt to 100 mass ppb with respect to the total mass of the coating layer. In a case where the coating layer contains a chain transfer agent, the content of the chain transfer agent is not particularly limited but is preferably 0.01 mass ppt to 100 mass ppb with respect to the total mass of the coating layer. In a case where the coating layer contains a plasticizer, the content of the plasticizer is not particularly limited but is preferably 0.01 mass ppt to 100 mass ppb with respect to the total mass of the coating layer.

In a case where a chemical liquid is stored in the interior of the specific container 2, in the liquid contact portion thereof (a surface contacting the stored substance; the liquid contact portion means a portion which is likely to contact the stored substance even though the portion does not actually contact the stored substance; the liquid contact portion is preferably the entire surface of the coating layer), $M_1/M_2$ is preferably 0.50 to 0.90, and $X_1$ is preferably 0.5 to 3.0.

In the liquid contact portion of the coating layer (preferably the surface of the coating layer) of the specific container 2, it is preferable that $M_3$, $M_4$, $M_3/M_4$, and $M_1/M_3$ described above are within the range described above.

For the specific container 2, the specific test described above is performed as below.

Specific test 2: under the condition that a mass ratio of a mass (g) of the coating layer to a mass (g) of a test solvent containing isopropanol at a proportion equal to or higher than 99.99% by mass (mass (g) of coating layer/mass (g) of test solvent) is 0.1 in a case where a liquid temperature of the test solvent is set to be 25° C., the container is immersed in the test solvent with a liquid temperature of 25° C. for 48 hours.

The container 20 with a lid has the coating layer 22, which contains a fluorine-containing polymer and a fluorine-containing surfactant, in the liquid contact portion thereof. However, the container according to the embodiment of the present invention is not limited thereto, and may further have the coating layer on the side of an outer surface 23 of the container 11 and the lid 12.

The method for manufacturing the container according to the embodiment of the present invention is not particularly limited, and examples thereof include a method of forming a container formed of a base material by a known method and forming a coating layer on the container by using a composition containing a fluorine-containing polymer and a fluorine-containing surfactant.

The aspect of the base material (container body) is as described above. As the material of the base material (container body), the following anticorrosive material is preferable.

[Anticorrosive Material]

The anticorrosive material is at least one kind of material selected from the group consisting of a fluorine-containing polymer and an electropolished metallic material.

≤Electropolished Metallic Material (Metallic Material Having Undergone Electropolishing)>

As a metallic material used for manufacturing the aforementioned electropolished metallic material, a metallic material is preferable which contains at least one kind of metal selected from the group consisting of chromium and nickel and in which the total content of chromium and nickel with respect to the total mass of the metallic material is greater than 25% by mass. Examples thereof include stainless steel, a nickel-chromium alloy, and the like.

The total content of chromium and nickel in the metallic material with respect to the total mass of the metallic material is preferably equal to or greater than 25% by mass, and more preferably equal to or greater than 30% by mass.

The upper limit of the total content of chromium and nickel in the metallic material is not particularly limited, but is preferably equal to or smaller than 90% by mass in general.

As the stainless steel, known stainless steel can be used without particular limitation. Among these, an alloy with a nickel content equal to or higher than 8% by mass is preferable, and austenite-based stainless steel with a nickel content equal to or higher than 8% by mass is more preferable. Examples of the austenite-based stainless steel include Steel Use Stainless (SUS) 304 (Ni content: 8% by mass, Cr content: 18% by mass), SUS304L (Ni content: 9% by mass, Cr content: 18% by mass), SUS316 (Ni content: 10% by mass, Cr content: 16% by mass), SUS316L (Ni content: 12% by mass, Cr content: 16% by mass), and the like.

The Ni content and the Cr content in the above parenthesis is a content with respect to the total mass of the metallic material.

As the nickel-chromium alloy, known nickel-chromium alloys can be used without particular limitation. Among these, a nickel-chromium alloy is preferable in which the nickel content is 40% to 75% by mass and the chromium content is 1% to 30% by mass with respect to the total mass of the metallic material.

Examples of the nickel-chromium alloy include HASTELLOY (trade name, the same is true for the following description), MONEL (trade name, the same is true for the following description), INCONEL (trade name, the same is true for the following description), and the like. More specifically, examples thereof include HASTELLOY C-276 (Ni content: 63% by mass, Cr content: 16% by mass), HASTELLOY C (Ni content: 60% by mass, Cr content: 17% by mass), HASTELLOY C-22 (Ni content: 61% by mass, Cr content: 22% by mass), and the like.

Furthermore, if necessary, the nickel-chromium alloy may further contain boron, silicon, tungsten, molybdenum, copper, cobalt, and the like in addition to the aforementioned alloy.

As the method for electropolishing the metallic material, known methods can be used without particular limitation. For example, it is possible to use the methods described in paragraphs "0011" to "0014" in JP2015-227501A, paragraphs "0036" to "0042" in JP2008-264929A, and the like.

Presumably, in a case where the metallic material is electropolished, the chromium content in a passive layer on the surface thereof may become higher than the chromium content in the parent phase. Therefore, from the inner wall coated with the electropolished metallic material or the base material formed of the electropolished metallic material, metal components are not easily flow into the chemical liquid.

The metallic material may have undergone buffing. As the buffing method, known methods can be used without particular limitation. The size of abrasive grains used for finishing the buffing is not particularly limited, but is preferably equal to or smaller than #400 because such grains make it easy to further reduce the surface asperity of the metallic material.

The buffing is preferably performed before the electropolishing.

In a case where the base material is formed of the metallic material having undergone electropolishing, and the metallic material having undergone electropolishing contains chromium and iron, a content mass ratio (Cr/Fe) of the content of Cr atoms to the content of Fe atoms in the surface of the base material is not particularly limited, but is preferably equal to or higher than 0.60, more preferably equal to or higher than 0.80, even more preferably equal to or higher than 1.0, particularly preferably equal to or higher than 1.5, and most preferably higher than 1.5. Furthermore, Cr/Fe is preferably equal to or lower than 3.5, more preferably equal to or lower than 3.2, even more preferably equal to or lower than 3.0, and particularly preferably lower than 2.5.

In the present specification, Cr/Fe of the surface described above means Cr/Fe measured by the following method.

Measurement method: X-ray photoelectron spectroscopy combined with Ar ion etching <Measurement Conditions>

X-ray source: Al-Kα

X-ray beam size: ϕ 200 μm

Signal pickup angle: 45°

<Ion Etching Conditions>

Ion species: Ar

Voltage: 2 kV

Area: 2×2 mm

Speed: 6.3 nm/min (expressed in terms of $SiO_2$)

<Calculation Method>

Measurement data is obtained at an interval of 0.5 nm to a depth of 5 nm from the outermost surface, Cr/Fe is calculated for each data, and the arithmetic mean thereof is calculated.

<Fluorine-Containing Polymer>

As the fluorine-containing polymer, the fluorine-containing polymer described above can be used without particular limitation.

Examples of the method for adjusting $M_1/M_2$ and $X_1$ to be within a predetermined range include a method of adjusting the temperature of the member at the time of molding and/or a method, which is described above, of substituting the terminal of a molecular chain of the fluorine-containing polymer with a perfluoroalkyl group. According to these methods, the dispersity of the fluorine-containing surfactant can be adjusted, and $X_1$ can be adjusted.

Typical examples of the method for forming the member include a method of coating a base material with a composition for forming a coating layer containing a fluorine-containing polymer and a fluorine-containing surfactant so as to form a coating film, and heating the coating film so as to form a coating layer on the base material.

As long as the composition for forming a coating layer contains a fluorine-containing polymer and fluorine-containing surfactant, components other than the polymer and the surfactant are not particularly limited. The composition may contain water and/or an organic solvent. Furthermore, the composition for forming a coating layer may be in the form of powder. In a case where the composition for forming a coating layer is in the form of powder, it is preferable to form a coating film by electrostatically coating a base material with the composition for forming a coating layer.

At this time, the heating temperature for the coating film is not particularly limited. In view of obtaining a member having further improved effects of the present invention, the heating temperature is preferably equal to or higher than 100° C., and more preferably equal to or higher than 150° C. The upper limit thereof is not particularly limited, but is preferably equal to or lower than 380° C. By precisely controlling the temperature at the time of heating, $M_1/M_2$ and $X_1$ can be adjusted to be within a predetermined range.

The method for forming the member is not limited to the method described above. For example, the member is formed by a method of temporarily molding the composition by a powder molding method such as ram extrusion molding, paste extrusion molding, or isostatic molding, keep heating the obtained temporarily molded substance, and then firing the substance. At this time, by precisely controlling the temperature in each step, $M_1/M_2$ and $X_1$ can be adjusted to be within a predetermined range.

[Chemical Liquid Storage Body]

The chemical liquid storage body according to an embodiment of the present invention has the container described above and a chemical liquid stored in the container. In the chemical liquid storage body according to the embodiment of the present invention, the liquid contact portion of the container is formed of the member. Therefore, in a case where the chemical liquid storage body is used, even though the chemical liquid is stored for a long period of time, the defect inhibition performance of the stored chemical liquid hardly deteriorates.

[Chemical Liquid]

As the aforementioned chemical liquid, a chemical liquid is preferable in which the amounts of metal impurities and organic impurities are reduced. The chemical liquid is not particularly limited, and examples thereof include high-purity chemical liquids such as an abrasive, a liquid containing a resist composition, a prewet solution, a developer, a rinsing solution, a peeling solution, and the like used for manufacturing semiconductors, and high-purity chemical liquids such as polyimide, a developer such as a resist for sensor and a resist for lens, a rinsing solution, and the like used for purposes other than the manufacturing of semiconductors. As one of the preferred aspects, the chemical liquid contains an organic solvent.

The content of the organic solvent in the chemical liquid is not particularly limited, but is preferably 97.0% to 99.999% by mass and more preferably 99.90% to 99.99% by mass with respect to the total mass of the chemical liquid in general. One kind of organic solvent may be used singly, or two or more kinds of solvents may be used in combination. In a case where two or more kinds of organic solvents are used in combination, the total content thereof is preferably within the above range.

In the present specification, an organic solvent means one liquid organic compound which is contained in the chemical liquid in an amount greater than 10,000 mass ppm with respect to the total mass of the chemical liquid. That is, in the present specification, a liquid organic compound contained in the chemical liquid in an amount greater than 10,000 mass ppm with respect to the total mass of the chemical liquid corresponds to an organic solvent.

In the present specification, "liquid" means that the compound stays in liquid form at 25° C. under atmospheric pressure.

<Organic Solvent>

The type of the organic solvent is not particularly limited, and known organic solvents can be used. Examples of the organic solvent include alkylene glycol monoalkyl ether carboxylate, alkylene glycol monoalkyl ether, a lactic acid alkyl ester, alkoxyalkyl propionate, cyclic lactone (preferably having 4 to 10 carbon atoms), a monoketone compound which may have a ring (preferably having 4 to 10 carbon atoms), alkylene carbonate, alkoxyalkyl acetate, alkyl pyruvate, and the like.

Furthermore, as the organic solvent, those described in JP2016-057614A, JP2014-219664A, JP2016-138219A, and JP2015-135379A may be used.

As the organic solvent, at least one kind of organic solvent is preferable which is selected from the group consisting of propylene glycol monomethyl ether, propylene glycol monoethyl ether, propylene glycol monopropyl ether, propylene glycol monomethyl ether acetate, ethyl lactate, methyl methoxypropionate, cyclopentanone, cyclohexanone, γ-butyrolactone, diisoamyl ether, butyl acetate, isoamyl acetate, isopropanol, and 4-methyl-2-pentanol, dimethyl sulfoxide, n-methyl-2-pyrrolidone, diethylene glycol, ethylene glycol, dipropylene glycol, propylene glycol, ethylene carbonate, propylene carbonate, sulfolane, cycloheptanone, and 2-heptanone.

<Other Components>

The chemical liquid may contain other components in addition to the organic solvent.

Examples of those other components include metal impurities, organic impurities, a fluorine-containing surfactant, water, and the like.

(Metal Impurities)

The chemical liquid may contain metal impurities (metal particles and metal ions). The definition of the metal ions and the method for measuring the metal ions are as described above.

Metal Particles

The content of metal particles in the chemical liquid is not particularly limited. Generally, the content of metal particles with respect to the total mass of the chemical liquid is preferably equal to or smaller than 100 mass ppt, more preferably equal to or smaller than 50 mass ppt, and even more preferably equal to or smaller than 30 mass ppt. The lower limit thereof is not particularly limited, but is preferably equal to or greater than 1 mass ppt in general. The chemical liquid may contain one kind of metal particles or two or more kinds of metal particles. In a case where the chemical liquid contains two or more kinds of metal particles, the total content thereof is preferably within the above range.

Metal Ions

The content of metal ions in the chemical liquid is not particularly limited. Generally, the content of metal ions with respect to the total mass of the chemical liquid is preferably equal to or smaller than 100 mass ppt, more preferably equal to or smaller than 50 mass ppt, and even more preferably equal to or smaller than 30 mass ppt. The lower limit thereof is not particularly limited, but is preferably equal to or greater than 1 mass ppt in general. The chemical liquid may contain one kind of metal ions or two or more kinds of metal ions. In a case where the chemical liquid contains two or more kinds of metal ions, the total content thereof is preferably within the above range.

(Organic Impurities)

The chemical liquid may contain organic impurities.

The organic impurities mean an organic compound which is different from the organic solvent contained in the chemical liquid and is contained in the chemical liquid in an amount equal to or smaller than 10,000 mass ppm with respect to the total mass of the chemical liquid. That is, in the present specification, an organic compound which is contained in the chemical liquid in an amount equal to or smaller than 10,000 mass ppm with respect to the total mass of the chemical liquid corresponds to organic impurities but does not correspond to the organic solvent.

The content of organic impurities in the chemical liquid is not particularly limited. In view of obtaining a chemical liquid having further improved effects of the present invention, the content of the organic impurities with respect to the total mass of the chemical liquid is preferably equal to or smaller than 10 mass ppb, more preferably equal to or smaller than 3 mass ppb, and even more preferably equal to or smaller than 1 mass ppb. The lower limit thereof is not particularly limited. It is preferable that the chemical liquid does not contain organic impurities.

In a case where the chemical liquid contains organic impurities, the organic impurities function as ligands for a metal and form a complex with the metal. This type of complex is highly hydrophobic and easily remains on the surface of a semiconductor substrate treated with the chemical liquid. As a result, the complex easily forms a defect.

(Fluoride Ions)

The chemical liquid may contain fluoride ions. The definition of the fluoride ions and the method for measuring the fluoride ions are as described above.

The content of fluoride ions in the chemical liquid is not particularly limited. In view of obtaining a chemical liquid having further improved effects of the present invention, the content of fluoride ions with respect to the total mass of the chemical liquid is preferably equal to or smaller than 1 mass ppm, more preferably equal to or smaller than 0.8 mass ppm, and even more preferably equal to or smaller than 0.5 mass ppm. The lower limit is not particularly limited. It is preferable that the chemical liquid does not contain fluoride ions.

[Use of Chemical Liquid]

The chemical liquid according to the above embodiment is preferably used for manufacturing semiconductors. Specifically, in a semiconductor device manufacturing process including a lithography step, an etching step, an ion implantation step, a peeling step, and the like, the chemical liquid is used for treating an organic substance after each step is finished or before the next step is started. Specifically, the chemical liquid is suitably used as a prewet solution, a developer, a rinsing solution, a peeling solution, and the like. For example, the chemical liquid can also be used for rinsing of edge line of semiconductor base materials before and after the coating with resist.

Furthermore, the chemical liquid can also be used as a diluent of a resin contained in a resist solution (which will be described later). In addition, the chemical liquid may be diluted with another organic solvent and/or water, and the like.

The chemical liquid can also be suitably used for other uses in addition to the manufacturing of semiconductors. The chemical liquid can be used as a developer for polyimide, a resist for lens, and a resist for lens, a rinsing solution, and the like.

In addition, the chemical liquid can also be used as a solvent for medical uses or for washing. Particularly, the chemical liquid can be suitably used for washing containers, piping, base materials (for example, a wafer and glass), and the like.

Particularly, the chemical liquid according to the above embodiment is more preferably used for pre-wetting. That is, it is preferable that the chemical liquid according to the above embodiment is used as a prewet solution.

[Purification Device]

The purification device according to an embodiment of the present invention is a chemical liquid purification device of purifying an organic solvent-containing substance to be purified so as to obtain a chemical liquid containing an organic solvent. The chemical liquid purification device comprises a manufacturing tank that stores the substance to be purified, a filter unit that purifies the substance to be purified, and a pipe line that connects the manufacturing tank and the filter unit to each other, in which a liquid contact portion of at least one unit selected from the group consisting of the manufacturing tank, the filter unit, and the pipe line is formed of the member described above.

Figure 3:
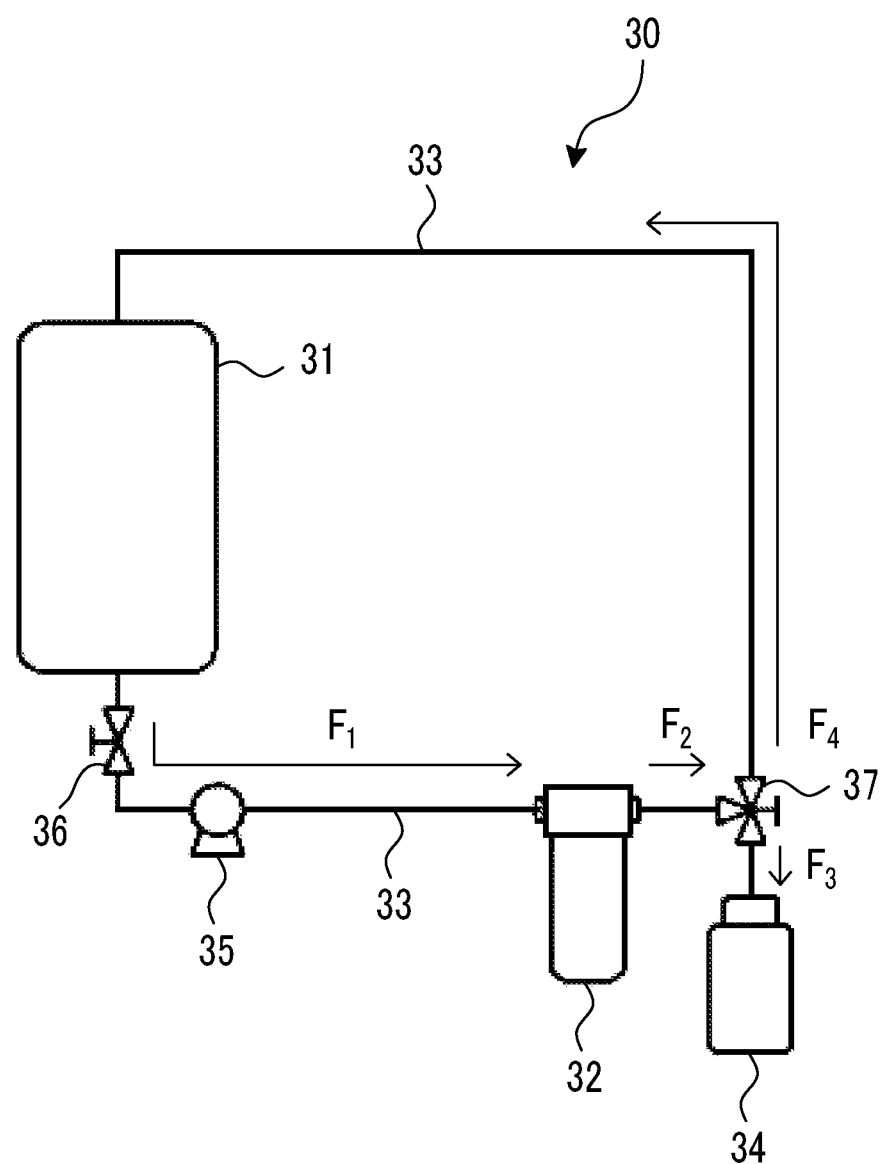
FIG. 3 is a schematic view of a chemical liquid purification device according to an embodiment of the present invention.

FIG. 3 is a schematic view showing the chemical liquid purification device according to an embodiment of the present invention. A chemical liquid purification device 30 comprises a manufacturing tank 31, a filter unit 32, and a filling device 34 (hereinafter, each of these will be referred to as "unit" as well). These units are connected to each other through a pipe line 33. The pipe line 33 comprises a pump 35 and valves 36 and 37. By operating or opening and closing the pump and the valves, a substance to be purified or a chemical liquid in the purification device 30 can be transferred between the units through the pipe line 33.

The filter unit 32 comprises a filter housing and a filter stored in the filter housing. As the filter, a depth filter, a screen filter, and the like known as filters for chemical liquid purification can be used without particular limitation. The filter may be a pleated filter. The suitable aspect of materials of the filter will be described later.

The chemical liquid purification device 30 shown in FIG. 3 comprises one filter unit 32. However, the chemical liquid purification device according to the embodiment of the present invention is not limited thereto, and may comprise a plurality of filter units. The filter units may be arranged in series or parallel with the pipe line or arranged in series and parallel with the pipe line.

The filling device 34 has a function of filling up a container with a chemical liquid. The aspect of the filling device 34 is not particularly limited, and a known filling device can be used as the filling device 34.

In the chemical liquid manufacturing device according to the embodiment of the present invention, a liquid contact portion of at least one kind of unit selected from the group consisting of the manufacturing tank, the filter unit, and the pipe line connecting these to each other is formed of the member described above. Particularly, it is preferable that the liquid contact portions of all of the manufacturing tank, the filter unit, and the pipe line connecting these to each other are formed of the member described above, because then a chemical liquid having excellent defect inhibition performance for a long period of time can be purified. The aspect of the member is as described above.

In other words, in the chemical liquid purification device, the manufacturing tank may be a manufacturing tank which contains a fluorine-containing polymer and a surfactant containing fluorine atoms, in which provided that a mass-based content of the surfactant in at least a surface of a portion of the manufacturing tank (preferably the surface of the liquid contact portion of the manufacturing tank) is $M_1$, and a mass-based content of the surfactant in a position 10 nm below the surface in a thickness direction is $M_2$, $M_1/M_2$ is 0.50 to 0.90, and an atom number ratio $X_1$ of the number of fluorine atoms contained in the surface to the number of carbon atoms contained in the surface is 0.5 to 3.0.

The manufacturing tank may be a manufacturing tank which has a tank body and a coating layer formed on the tank body, in which the coating layer contains a fluorine-containing polymer and a surfactant containing fluorine atoms, provided that a mass-based content of the surfactant in at least a surface of a portion of the manufacturing tank (coating layer) (preferably the surface of the liquid contact portion of the manufacturing tank) is $M_1$, and a mass-based content of the surfactant in a position 10 nm below the surface in a thickness direction is $M_2$, $M_1/M_2$ is 0.50 to 0.90, and an atom number ratio $X_1$ of the number of fluorine atoms contained in the surface to the number of carbon atoms contained in the surface is 0.5 to 3.0.

Examples of the material constituting the tank body include the materials exemplified above regarding the base material described above.

In the chemical liquid manufacturing device, the filter unit may be a filter unit which contains fluorine-containing polymer and a surfactant containing fluorine atoms, in which provided that a mass-based content of the surfactant in at least a surface of a portion of the filter unit (preferably the surface of the liquid contact portion of the filter unit) is $M_1$, and a mass-based content of the surfactant in a position 10 nm below the aforementioned surface in a thickness direction is $M_2$, $M_1/M_2$ is 0.50 to 0.90, and an atom number ratio $X_1$ of the number of fluorine atoms contained in the surface to the number of carbon atoms contained in the surface is 0.5 to 3.0.

In the chemical liquid manufacturing device, the pipe line may be a pipe line which contains a fluorine-containing polymer and a surfactant containing fluorine atoms, in which provided that a mass-based content of the surfactant in at least a surface of a portion of the pipe line (preferably the surface of the liquid contact portion of the pipe line) is $M_1$, and a mass-based content of the surfactant in a position 10 nm below the surface in a thickness direction is $M_2$, $M_1/M_2$ is 0.50 to 0.90, and an atom number ratio $X_1$ of the number of fluorine atoms contained in the surface to the number of carbon atoms contained in the surface is 0.5 to 3.0.

The pipe line may be a pipe line which has a pipe body and a coating layer formed on the pipe body, in which the coating layer contains a fluorine-containing polymer and a surfactant containing fluorine atoms, provided that a mass-based content of the surfactant in at least a surface of a portion of the pipe line (coating layer) (preferably the surface of the liquid contact portion of the pipe line) is $M_1$, and a mass-based content of the surfactant in a position 10 nm below the surface in a thickness direction is $M_2$, $M_1/M_2$ is 0.50 to 0.90, and an atom number ratio $X_1$ of the number of fluorine atoms contained in the surface to the number of carbon atoms contained in the surface is 0.5 to 3.0.

Examples of the material constituting the pipe body include the materials exemplified above regarding the base material described above.

In the present specification, the liquid contact portion of the filter unit does not contain a filter medium that the filter comprises.

The liquid contact portion of the filter unit will be described using FIG. 4 to FIG. 6.

Figure 4:
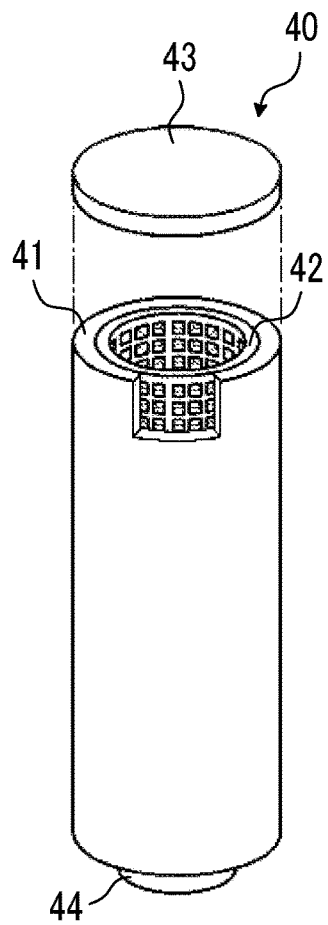
FIG. 4 is a partially exploded perspective view of a typical filter that a filter unit comprises.

FIG. 4 is a partially exploded perspective view of a typical filter that the filter unit comprises. The filter 40 has a cylindrical filter medium 41 and a cylindrical core 42 that supports the filter medium 41 and is disposed on the inside of the cylindrical filter medium. The cylindrical core 42 is in the form of mesh through which a liquid can easily pass. The filter medium 41 and the core 42 form concentric circles. On top of the filter medium 41 and the core 42 that are in the form of a cylinder, a cap 43 is disposed to prevent a liquid from entering the filter from the top. Furthermore, on bottom of the filter medium 41 and the core 42, a liquid outlet 44 is disposed to enable a liquid to be taken out of the inside of the core 42.

A liquid (substance to be purified) flowing in the filter 40 is blocked by the cap 43. Therefore, the liquid passes through the filter medium 41 and the core 42, flows into the inside of the core 42, and flows out of the filter 40 from the liquid outlet 44.

The filter 40 has the core 42 disposed on the inside of the filter medium 41. However, the filter is not limited to this aspect, and may have a protector on the outside of the filter medium 41 (the protector has the same shape as the core 42, but the radius of the protector is different from that of the core 42).

Figure 5:
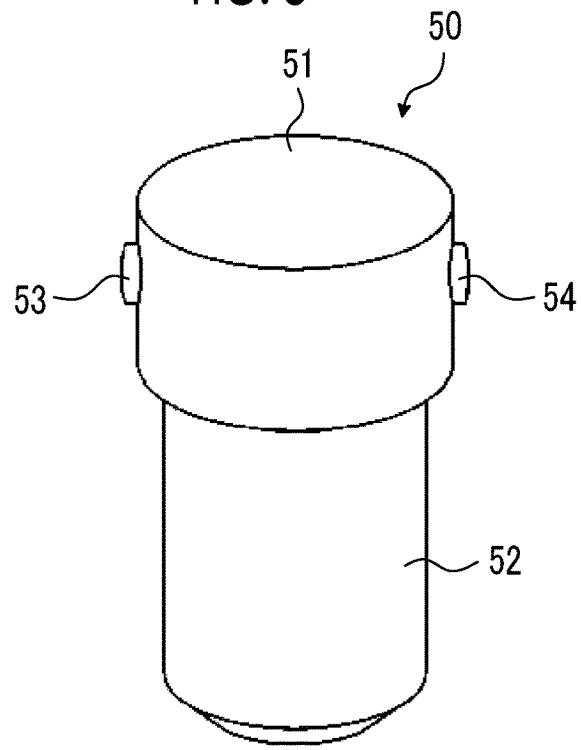
FIG. 5 is a perspective view of a housing that the filter unit comprises.

FIG. 5 is a perspective view of a housing 50 that the filter unit comprises. FIG. 6 is a partial cross-sectional view of the housing. The housing 50 is constituted with a lid 51 and a body 52, and the lid 51 and the body 52 can be fitted with each other. In a case where the lid 51 and the body 52 are fitted with each other, the cavity L is formed in the interior of the housing. The filter 40 can be stored in the cavity L.

The housing 50 has a liquid inlet 53 and a liquid outlet 54. The liquid outlet 44 of the filter 40 and the liquid outlet 54 of the housing are connected to each other by an internal pipe line 55 provided in the interior of the lid 51. The flow of a substance to be purified is indicated by $F_1$. The substance to be purified having flowed into the housing from the liquid inlet 53 flows into the interior of the body 52 through the internal pipe line 56 provided in the interior of the lid 51, passes through the outer surface of the filter 40, the filter medium, and the core, and flows into the inside of the core. In this process, the substance to be purified is purified.

The purified liquid having flowed into the inside of the core passes through the internal pipe line 55 from the liquid outlet of the filter 40, and is taken out of the housing 50 from the liquid outlet 54 (the flow is indicated by $F_2$ in FIG. 3).

Figure 6:
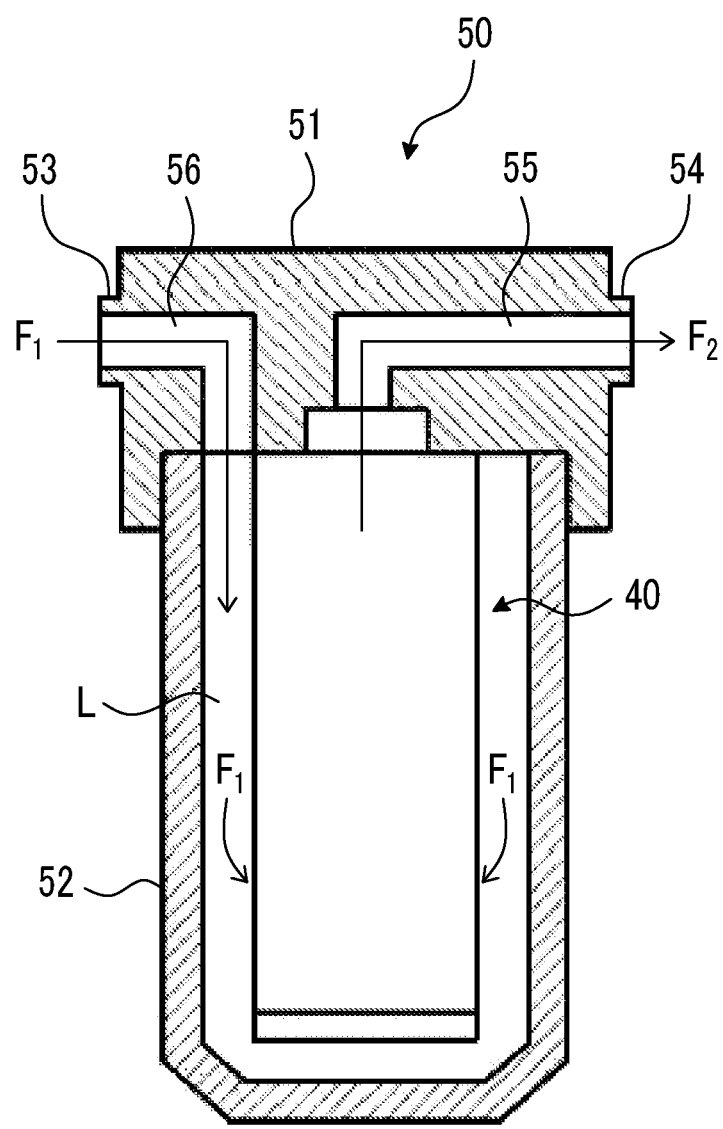
FIG. 6 is a partial cross-sectional view of the housing that the filter unit comprises.

In FIG. 5 and FIG. 6, the liquid inlet 53 and the liquid outlet 54 are disposed on the lid 51 of the housing 50. However, the housing that the filter unit according to the embodiment of the present invention comprises is not limited thereto. The liquid inlet 53 and the liquid outlet 54 can be disposed at any position in the housing 50. At this time, the liquid inlet 53 may be disposed such that the substance to be purified flows into the filter 40 from the outside of the filter 40, and the liquid outlet 54 may be disposed such that the purified substance to be purified is taken out of the core of the filter 40.

In a typical filter unit, "liquid contact portion of the filter unit" is a portion other than the filter medium 41, and means a site contacting a substance to be purified. Specifically, the inner wall surface of the housing 50, the cap 43, the core 42, the liquid outlet 44, and the like are the liquid contact portion.

The aspect of the member is as described above.

The filter unit may be a filter unit which has a housing and a filter disposed in the housing, in which the housing has a housing body and a coating layer formed on the housing body, the coating layer contains a fluorine-containing polymer and a surfactant containing fluorine atoms, provided that a mass-based content of the surfactant in at least a surface of a portion of the housing (coating layer) (preferably the surface of the liquid contact portion of the housing) is $M_1$, and a mass-based content of the surfactant in a position 10 nm below the surface in a thickness direction is $M_2$, $M_1/M_2$ is 0.50 to 0.90, and an atom number ratio $X_1$ of the number of fluorine atoms contained in the surface to the number of carbon atoms contained in the surface is 0.5 to 3.0.

[Chemical Liquid Purification Method]

Hereinafter, a method for purifying a chemical liquid containing an organic solvent by using the chemical liquid purification device 30 according to the embodiment of the present invention will be described. The method for purifying a chemical liquid by using the purification device is not particularly limited. It is preferable that the method includes a step of filtering a substance to be purified by using a filter that a filter unit comprises (purification step).

<Purification Step>

First, the substance to be purified containing an organic solvent is stored in a manufacturing tank 31.

The shape and the volume of the manufacturing tank are not particularly limited, and can be appropriately changed according to the amount and/or the type of the chemical liquid to be manufactured.

The manufacturing tank may further comprise a stirring blade and the like for stirring the stored substance to be purified and the like. In this case, it is preferable that the liquid contact portion of the stirring blade and the like is formed of the member described above.

In a case where a valve 36 is opened, by a pump 35, the substance to be purified stored in the manufacturing tank 31 moves through a pipe line 33 along the direction of $F_1$ and is introduced into a filter unit 32. The substance to be purified introduced into the filter unit 32 is purified by passing through the filter medium 41 that the filter 40 comprises. Hereinafter, suitable aspects of the filter that the filter unit comprises will be described.

Filter

As the filter medium the filter comprises, known filter media can be used without particular limitation. The filter may be in the form of any of a depth filter and a screen filter. Furthermore, the filter may be a pleated filter.

As the material of the filter medium, at least one kind of material is preferable which is selected from the group consisting of nylon, polyethylene (including high-density polyethylene and high-molecular-weight polyethylene), polypropylene (including high-density polypropylene and high-molecular-weight polypropylene), polyfluorocarbon (for example, polytetrafluoroethylene; PTFE and the like), cellulose, diatomite, polystyrene, and glass.

In a case where the purification device comprises two or more filter units, the filter medium of the filter that each of the filter units comprises is preferably formed of a hydrophobic material and a hydrophilic material. In the present specification, "hydrophobic material" means that a water contact angle of the surface of the filter medium is equal to or greater than 45° at 25° C., and "hydrophilic material" means that a water contact angle of the surface of the filter medium is less than 45° at 25° C.

In a case where two or more filter units are used, it is preferable that a filter through which the substance to be purified finally passes comprises a filter constituted with a filter medium formed of a hydrophilic material (hereinafter, referred to as "hydrophilic filter" as well). The hydrophilic filter has strong interaction with impurities contained in the substance to be purified, particularly, metal components, and the metal components are more easily adsorbed onto the hydrophilic filter. Accordingly, the content of metal particles and metal ions in the purified substance to be purified can be easily controlled within a desired range.

In a case where two filter units are used, although there is no particular limitation, a differential pressure before and after the passing of the substance to be purified through the filter units (hereinafter, referred to as "filtration differential pressure" as well) is preferably equal to or lower than 250 kPa, and more preferably equal to or lower than 200 kPa. The lower limit thereof is not particularly limited, but is preferably equal to or greater than 50 kPa. In a case where the filtration differential pressure is equal to or lower than 250 kPa, it is possible to prevent an excessively high pressure is applied to the filters, and accordingly, the eluate could be reduced.

The relationship between pore sizes of the filter media is not particularly limited, but it is preferable that the filter media have different pore sizes. It is preferable that the pore size of a filter medium (hereinafter, referred to as "second filter medium" as well) that a filter (hereinafter, referred to as "second filter" as well), through which a substance to be purified passes after passing through a first filter, comprises is the same as or smaller than the pore size of a filter medium (hereinafter, referred to as "first filter medium" as well) that a filter (hereinafter, referred to as "first filter" as well), through which the substance to be purified firstly passes, comprises. In the present specification, as the pore size of a filter medium, the nominal values form filter manufacturers can be referred to. A commercial filter can be selected from various filters provided from, for example, Pall Corporation Japan, Advantec Toyo Kaisha, Ltd., Nihon Entegris KK (former MICRONICS JAPAN CO., LTD.), KITZ MICRO FILTER CORPORATION, or the like. In addition, it is possible to use "P-NYLON FILTER (pore size: 0.02 µm, critical surface tension: 77 mN/m)" made of polyamide; (manufactured by Pall Corporation Japan), "PE.CLEAN FILTER (pore size: 0.02 µm)" made of high-density polyethylene; (manufactured by Pall Corporation Japan), and "PE-CLEAN FILTER (pore size: 0.01 µm)" made of high-density polyethylene; (manufactured by Pall Corporation Japan).

In a case where a filter medium having a pore size smaller than that of the first filter medium is used as the second filter medium, a ratio between the pore size of the second filter medium and the pore size of the first filter medium (pore size of second filter medium/pore size of first filter medium) is preferably 0.01 to 0.99, more preferably 0.1 to 0.9, and even more preferably 0.2 to 0.9. In a case where the pore size of the second filter medium is within the above range, fine foreign substances mixed into the chemical liquid containing an organic solvent are more reliably removed.

From the viewpoint of inhibiting the increase of metal particles and metal ions in the chemical liquid during the storage of the purified chemical liquid, provided that an interaction radius in the Hansen solubility parameter space derived from the material of the filter medium is R0, and that a radius of a sphere in the Hansen space derived from the organic solvent contained in the chemical liquid is Ra, it is preferable that the chemical liquid and the material of the filter medium are combined such that the chemical liquid and the filter medium have a relationship satisfying a relational expression of (Ra/R0)≤1, and the chemical liquid is purified by the material of the filter medium satisfying the relational expression. (Ra/R0) is preferably equal to or smaller than 0.98, and more preferably equal to or smaller than 0.95. The lower limit of (Ra/R0) is preferably equal to or greater than 0.5, more preferably equal to or greater than 0.6, and even more preferably 0.7. In a case where Ra/R0 is within the above range, the increase in the content of the metal particles and metal ions in the chemical liquid during long-term storage is inhibited, although the mechanism is unclear.

The combination of the filter medium and the organic solvent is not particularly limited, and examples thereof include those described in US2016/0089622.

The filtering pressure affects the filtering accuracy. Therefore, it is preferable that the pulsation of pressure at the time of filtering is as low as possible.

The filtering speed is not particularly limited. However, in view of obtaining a chemical liquid having further improved effects of the present invention, the filtering speed is preferably equal to or higher than 1.0 L/min/m$^2$, more preferably equal to or higher than 0.75 L/min/m$^2$, and even more preferably equal to or higher than 0.6 L/min/m$^2$.

For the filter, an endurable differential pressure for assuring the filter performance (assuring that the filter will not be broken) is set. In a case where the endurable differential pressure is high, by increasing the filtering pressure, the filtering speed can be increased. That is, it is preferable that the upper limit of the filtering speed is generally equal to or lower than 10.0 L/min/m$^2$ although the upper limit usually depends on the endurable differential pressure of the filter. Meanwhile, in a case where the filtering pressure is reduced, it is possible to efficiently reduce the amount of particle-like foreign substances or impurities dissolved in the chemical liquid, and to adjust the pressure according to the purpose.

In order that further improved effects of the present invention are exhibited, the filtering pressure is preferably 0.001 to 1.0 MPa, more preferably 0.003 to 0.5 MPa, and even more preferably 0.005 to 0.3 MPa. Particularly, in a case where a filter medium having a small pore size is used, by increasing the filtering pressure, it is possible to efficiently reduce the amount of particle-like foreign substances or impurities dissolved in the chemical liquid. In a case where a filter medium having a pore size smaller than 20 nm is used, the filtering pressure is particularly preferably 0.005 to 0.3 MPa.

The smaller the pore size of the filter medium, the lower the filtering speed. However, for example, in a case where a plurality of filters of the same type are connected to each other in parallel, the filtering area is enlarged, and the filtering pressure is reduced. Therefore, in this way, the reduction in the filtering speed can be ensured.

It is more preferable that the purification step has the following steps. In the purification step, each of the following steps may be performed once or plural times. Furthermore, the order of the following steps is not particularly limited.

1. Particle removing step
2. Metal ion removing step
3. Organic impurity removing step Hereinafter, each of the steps will be described.

(Particle Removing Step)

It is preferable that the purification step has a particle removing step. The particle removing step is a step of removing the particles in the chemical liquid containing an organic solvent.

Although there is no particular limitation, the particle removing filter is in the form of a filter comprising a filter medium having a pore size equal to or smaller than 20 nm for example.

The pore size of the filter medium is preferably 1 to 15 nm, and more preferably 1 to 12 nm. In a case where the pore size is equal to or smaller than 15 nm, finer particles can be removed. In a case where the pore size is equal to or greater than 1 nm, filtering efficiency is improved.

Examples of the material of the filter medium that the particle removing filter can comprise include nylon such as 6-nylon and 6,6-nylon, polyethylene, polypropylene, polystyrene, polyimide, polyamide imide, polyfluorocarbon, and the like.

Either or both of polyimide and polyamide imide may have at least one group selected from the group consisting of a carboxy group, a salt-type carboxy group, and a —NH— bond. In view of solvent resistance, polfluorocarbon, polyimide and/or polyamide imide are excellent. Furthermore, from the viewpoint of adsorbing metal ions, nylon such as 6-nylon and 6,6-nylon are particularly preferable.

In a case where the purification step has the particle removing step, a plurality of particle removing filters may be used. In a case where the plurality of particle removing filters are used, it is more preferable that one of the filters is a filter comprising a filter medium having a pore size equal to or greater than 50 nm (for example, a microfiltration membrane for removing fine particles having a pore size equal to or greater than 50 nm). In a case where fine particles such as colloidized impurities are present in the chemical liquid containing an organic solvent, by filtering the chemical liquid containing an organic solvent by using a filter comprising a filter medium having a pore size equal to or greater than 50 nm (for example, a microfiltration membrane for removing fine particles having a pore size equal to or greater than 50 nm) before filtering the chemical liquid containing an organic solvent by using a filter comprising a filter medium having a pore size equal to or smaller than 20 nm (for example, a microfiltration membrane having a pore size equal to or smaller than 20 nm), the filtering efficiency of the filter comprising a filter medium having a pore size equal to or smaller than 20 nm (for example, a microfiltration membrane having a pore size equal to or smaller than 20 nm) is improved, and the particle removing performance is further improved.

(Metal Ion Removing Step)

The purification step may have a metal ion removing step. As the metal ion removing step, a step of passing the chemical liquid containing an organic solvent through a metal ion adsorption filter is preferable.

The metal ion adsorption filter is not particularly limited, and examples thereof include known metal ion adsorption filters.

The metal ion adsorption filter is preferably a filter which can perform ion exchange. Herein, examples of the metal ions to be adsorbed include ions containing the specific metals and ions containing metal other than the specific metals. From the viewpoint of improving the metal ion adsorption performance, it is preferable that the filter medium the metal ion adsorption filter comprises contains an acid group on the surface thereof. Examples of the acid group include a sulfonic acid group, a carboxy group, and the like.

Examples of the material of the filter medium that the metal ion adsorption filter comprises include cellulose, diatomite, nylon, polyethylene, polypropylene, polystyrene, polyfluorocarbon, and the like. From the viewpoint of the metal ion adsorption efficiency, nylon is particularly preferable.

(Organic Impurity Removing Step)

The purification step may have an organic impurity removing step. As the organic impurity removing step, a step of passing chemical liquid containing an organic solvent through an organic impurity adsorption filter is preferable.

The organic impurity adsorption filter is not particularly limited, and examples thereof include known organic impurity adsorption filters.

In view of improving the organic impurity adsorption performance, it is preferable that the filter medium the organic impurity adsorption filter comprises has the skeleton of an organic substance, which can interact with the organic impurities, on the surface thereof (in other words, it is preferable that the surface of the organic impurity adsorption filter is modified with the skeleton of an organic substance which can interact with the organic impurities). Examples of the skeleton of an organic substance which can interact with the organic impurity include a chemical structure which can react with the organic impurities so as to make the organic impurities trapped in the organic impurity adsorption filter. More specifically, in a case where a substance to be purified contains long-chain n-alkyl alcohol (corresponding to a structural isomer in a case where the substance to be purified contains long-chain 1-alkyl alcohol as an organic solvent) as the organic impurities, examples of the skeleton of an organic substance include an alkyl group. Furthermore, in a case where the substance to be purified contains dibutylhydroxytoluene (BHT) as the organic impurities, examples of the skeleton of an organic substance include a phenyl group.

Examples of the material of the filter medium that organic impurity adsorption filter comprises include cellulose supporting active carbon, diatomite, nylon, polyethylene, polypropylene, polystyrene, polyfluorocarbon, and the like.

Furthermore, as the organic impurity adsorption filter, it is possible to use the filters obtained by fixing active carbon to non-woven cloth that are described in JP2002-273123A and JP2013-150979A.

For the organic impurity adsorption filter, in addition to the chemical adsorption described above (adsorption using the organic impurity adsorption filter having the skeleton of an organic substance, which can interact with the organic impurities, on the surface thereof), a physical adsorption method can be used.

For example, in a case where the substance to be purified contains BHT as organic impurities, the structure of BHT is larger than 10 angstroms (=1 nm). Accordingly, in a case where an organic impurity adsorption filter comprising a filter medium having a pore size of 1 nm is used, BHT cannot pass through the pore of the filter medium. That is, by being physically trapped by the filter, BHT is removed from the chemical liquid containing an organic solvent. In this way, for removing organic impurities, not only a chemical interaction but also a physical removing method can be used. Here, in this case, a filter comprising a filter medium having a pore size equal to or greater than 3 nm is used as "particle removing filter", and a filter comprising a filter medium having a pore size less than 3 nm is used as "organic impurity adsorption filter".

(Washing Step: Step of Washing Filter)

It is preferable that the chemical liquid purification method according to the embodiment of the present invention further includes a step of washing the filter. The method for washing the filter is not particularly limited, and examples thereof include a method of immersing the filter in a washing solution, a method of causing a washing solution to flow through the filter, and a method of using these methods in combination.

In a case where the filter is washed, it is easy to control the amount of the component extracted from the filter such that the conditions described above relating to the test liquid are satisfied. As a result, a chemical liquid having a further improved effect of the present invention is obtained.

As the washing solution, known washing solutions can be used without particular limitation. The washing solution is not particularly limited, and examples thereof include water, an organic solvent, and the like. As the organic solvent, for example, organic solvents that the chemical liquid can contain, such as alkylene glycol monoalkyl ether carboxylate, alkylene glycol monoalkyl ether, lactic acid alkyl ester, alkoxyalkyl propionate, cyclic lactone (preferably having 4 to 10 carbon atoms), a ketone compound which may have a ring (preferably having 4 to 10 carbon atoms), alkylene carbonate, alkoxyalkyl acetate, and alkyl pyruvate may be used.

More specifically, examples of the washing solution include propylene glycol monomethyl ether, propylene glycol monomethyl ether acetate, dimethyl sulfoxide, N-methyl pyrrolidone, diethylene glycol, ethylene glycol, dipropylene glycol, propylene glycol, ethylene carbonate, propylene carbonate, sulfolane, cyclohexane, cyclohexanone, cycloheptanone, cyclopentanone, 2-heptanone, γ-butyrolactone, a mixture of these, and the like.

In a case where the valve 37 is opened and the pump 35 is operated, the substance to be purified having undergone purification, which has been purified by passing through the filter unit, flows along the direction of $F_2$ and $F_3$, and then in the filling device 34, the substance to be purified is stored in a container as a chemical liquid.

Furthermore, the valve 37 may be operated such that the substance to be purified having undergone purification flows along the direction of $F_4$ from the direction of $F_2$ and circulates again in the manufacturing tank 31. In this case, the substance to be purified having undergone purification may be purified again in the filter unit, and in this way, a chemical liquid having further improved defect inhibition performance is obtained.

The liquid contact portion of the filling device 34 is not particularly limited, but is preferably formed of the member described above or preferably has the coating layer described above. In a case where the liquid contact portion of the filling device is formed of the member described above, the liquid contact portion may be formed such that at least the liquid contact portion becomes a surface satisfying the condition A described above and that the outside, which is not the liquid contact portion, also becomes a surface satisfying the condition A described above. Furthermore, in a case where the filling device has a coating layer, the coating layer is provided to cover the entirety of the liquid contact portion.

[Other Embodiments of Purification Device]

Figure 7:
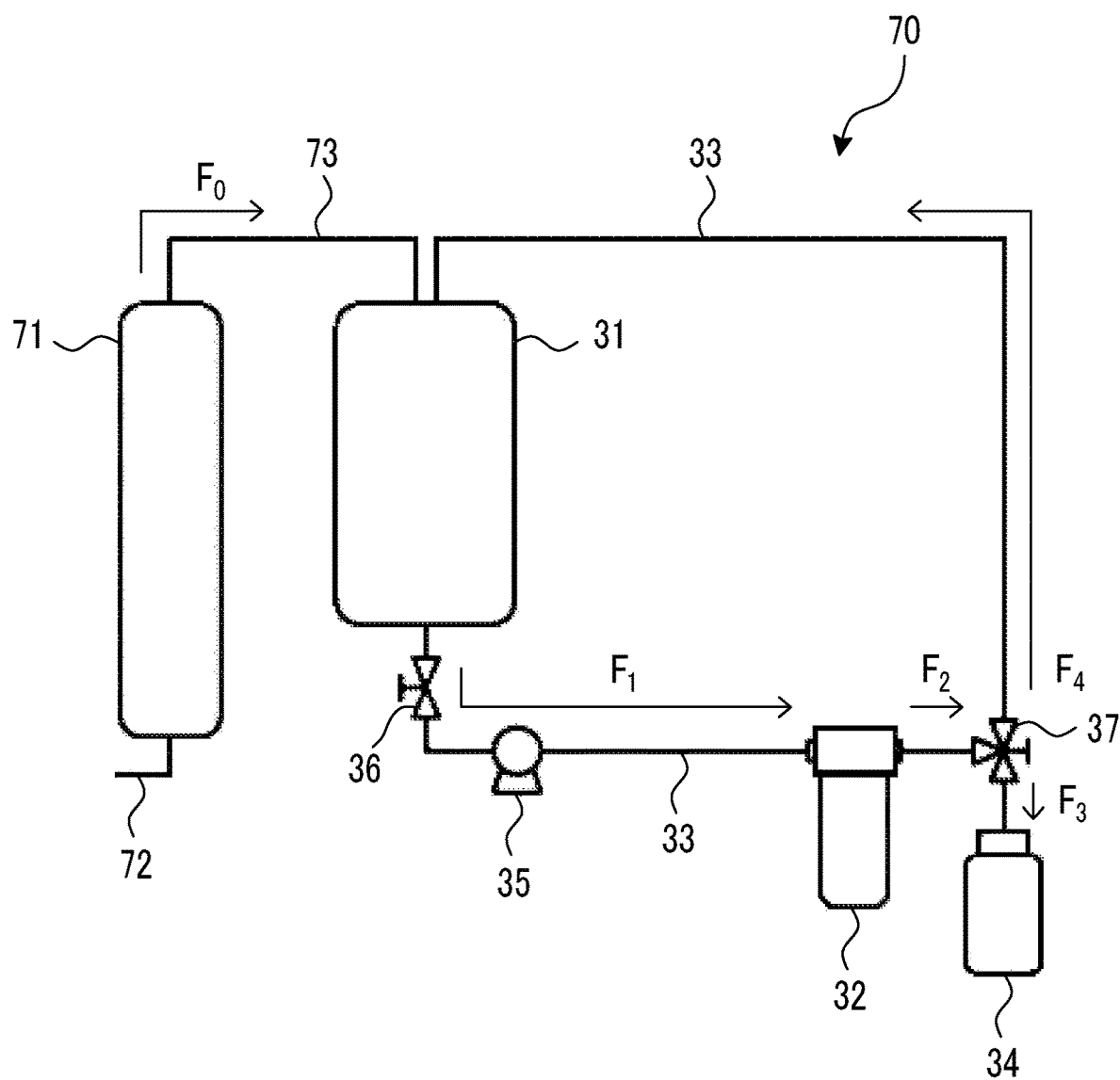
FIG. 7 is a schematic view of a purification device according to another embodiment of the present invention.

A purification device according to another embodiment of the present invention will be described using FIG. 7. A purification device 70 is a purification device in which a distillation column 71 is connected to the manufacturing tank 31 of the purification device 30 shown in FIG. 3 through a pipe line 73.

In the purification device 70, a substance to be purified is introduced into the distillation column 71 from the bottom of the distillation column 71 through a pipe line 72. The substance to be purified introduced into the distillation column 71 is distilled. The substance to be purified having undergone distillation flows along the direction of $F_0$ and is introduced into the manufacturing tank 31. The purification step performed thereafter is as described above.

The liquid contact portion of the distillation column is not particularly limited, but is preferably formed of the member described above. In a case where the liquid contact portion of the distillation column is formed of the member described above, the liquid contact portion may be formed such that at least the liquid contact portion becomes a surface satisfying the condition A described above and that the outside, which is not the liquid contact portion, also becomes a surface satisfying the condition A described above. Furthermore, in a case where the distillation column has a coating layer, the coating layer is provided to cover the entirety of the liquid contact portion.

The aforementioned distillation column may be a distillation column which has a column body and a coating layer formed on the column body, in which the coating layer contains a fluorine-containing polymer and a surfactant containing fluorine atoms, provided that a mass-based content of the surfactant in at least a surface of a portion (preferably the surface of the liquid contact portion of the distillation column) of the distillation column (coating layer) is $M_1$, and a mass-based content of the surfactant in a position 10 nm below the surface in a thickness direction is $M_2$, $M_1/M_2$ is 0.50 to 0.90, and an atom number ratio $X_1$ of the number of fluorine atoms contained in the surface to the number of carbon atoms contained in the surface is 0.5 to 3.0.

Examples of the material constituting the column body include the materials exemplified above regarding the base material described above.

It is preferable that the method for purifying a chemical liquid by using the chemical liquid purification device according to the embodiment described above has a distillation step of distilling a substance to be purified by using the distillation column in addition to the chemical liquid purification step described above.

[Manufacturing Device]

Figure 8:
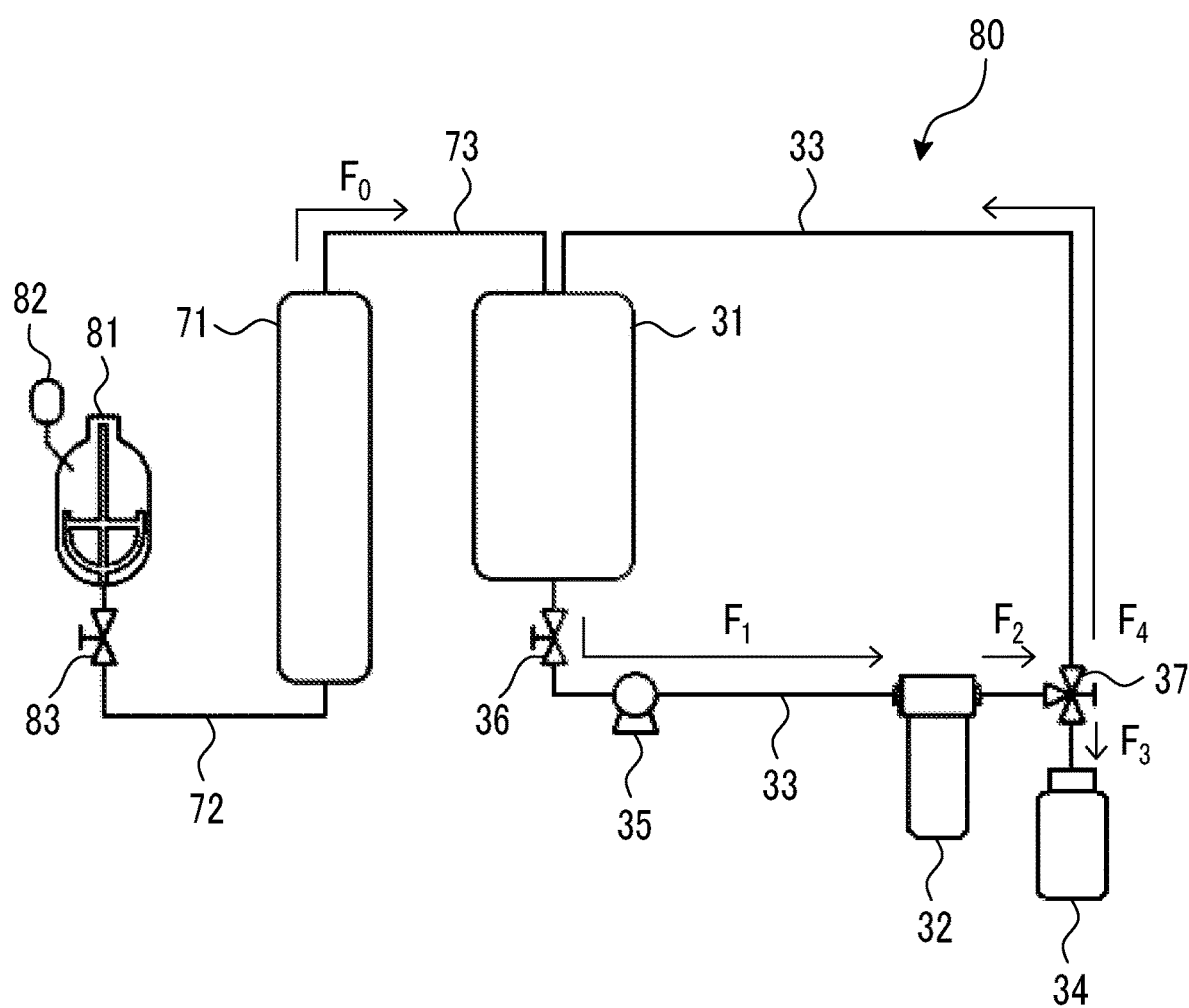
FIG. 8 is a schematic view of a manufacturing device according to an embodiment of the present invention.

The manufacturing device according to an embodiment of the present invention will be described using FIG. 8. FIG. 8 is a schematic view of the chemical liquid manufacturing device. In a chemical liquid manufacturing device 80, a reactor 81 comprising a raw material inlet 82 (these will be collectively referred to as "reaction portion" as well) is connected to the distillation column 71 of the purification device 70 illustrated in FIG. 7 through a pipe line 72 comprising a valve 83. The chemical liquid purification device shown in FIG. 8 has the distillation column 71, but the purification device is not limited thereto and may not have the distillation column 71. In this case, for example, the purification device may have an aspect in which the manufacturing tank 31 of the purification device 30 shown in FIG. 3 and the reactor 81 comprising the raw material inlet 82 are connected to each other through the pipe line 72 comprising the valve 83.

The reaction portion has a function of obtaining a reactant containing an organic solvent by reacting raw materials supplied from the raw material inlet 82 (if necessary, in the presence of a catalyst) in the reactor 81.

The liquid contact portion of the reactor 81 and the raw material inlet 82 is not particularly limited, but is preferably formed of the member described above. In a case where the reactor is formed of the member, the liquid contact portion may be formed such that at least the liquid contact portion becomes a surface satisfying the condition A described above and that the outside, which is not the liquid contact portion, also becomes a surface satisfying the condition A described above. Furthermore, in a case where the reactor has a coating layer, the coating layer is provided to cover the entirety of the liquid contact portion.

The reactor may be a reactor which has a reactor body and a coating layer formed on the reactor body, in which the coating layer contains a fluorine-containing polymer and a surfactant containing fluorine atoms, provided that a mass-based content of the surfactant in at least a surface of a portion (preferably the surface of the liquid contact portion of the reactor) of the reactor (coating layer) is $M_1$, and a mass-based content of the surfactant in a position 10 nm below the surface in a thickness direction is $M_2$, $M_1/M_2$ is 0.50 to 0.90, and an atom number ratio $X_1$ of the number of fluorine atoms contained in the surface to the number of carbon atoms contained in the surface is 0.5 to 3.0.

Examples of the material constituting the reactor body include the materials exemplified above regarding the base material described above.

<Chemical Liquid Manufacturing Method>

The method for manufacturing a chemical liquid by using the manufacturing device described above is not particularly limited, but it is preferable that the method has the following steps.

Reaction step

Purification step

The purification step is the same as the aspect described above. Therefore, hereinafter, the reaction step will be described without describing the purification step.

The reaction step is a step of obtaining a reactant by reacting raw materials.

The reactant is not particularly limited, and examples thereof include the aforementioned substance to be purified containing an organic solvent. That is, for example, the reactant is obtained by a step of synthesizing an organic solvent so as to obtain a substance to be purified containing an organic solvent.

As the method for obtaining the reactant, known methods can be used without particular limitation. Examples thereof include a method of obtaining a reactant by reacting one raw material or a plurality of raw materials in the presence of a catalyst.

More specifically, examples thereof include a step of obtaining butyl acetate by reacting acetic acid and n-butanol in the presence of sulfuric acid, a step of obtaining 1-hexanol by reacting ethylene, oxygen, and water in the presence of $Al(C_2H_5)_3$, a step of obtaining 4-methyl-2-pentanol by reacting cis-4-methyl-2-pentene in the presence of Diisopinocamphenyl borane (Ipc2BH), a step of obtaining propylene glycol 1-monomethyl ether 2-acetate (PGMEA) by reacting propylene oxide, methanol, and acetic acid in the presence of sulfuric acid, a step of obtaining isopropyl alcohol (IPA) by reacting acetone and hydrogen in the presence of copper oxide-zinc oxide-aluminum oxide, a step of obtaining ethyl lactate by reacting lactic acid and ethanol, and the like.

EXAMPLES

Hereinafter, the present invention will be more specifically described based on examples. The materials, the amount and proportion of the materials used, the details of treatments, the procedure of treatments, and the like shown in the following examples can be appropriately modified as long as the gist of the present invention is maintained.

Accordingly, the scope of the present invention is not limited to the following examples.

Example 1

A container was prepared by the following method, and a chemical liquid, which contained propylene glycol monomethyl ether (PGME) as an organic solvent, was stored in the prepared container, thereby manufacturing a chemical liquid storage body.

The container was prepared by using a member obtained by forming a coating layer on a base material by the following method.

[Preparation of Base Material]

The base material used for preparing the container was prepared by the following method. First, a base material (volume: 1,000 ml) made of SUS316 having the same shape as the container 11 shown in FIG. 1 was subjected to buffing and then electropolished under the following conditions, thereby obtaining a base material having undergone electropolishing.

(Conditions of Electropolishing)

Electropolishing liquid: "S-CLEAN EP" manufactured by SASAKI CHEMICAL CO., LTD.

Temperature: 60° C.

Time: 10 minutes

Current density: 20 A/dm$^3$

Interpole distance: 25 cm

[Formation of Coating Layer]

The coating layer was formed using a composition for forming a coating layer that was prepared by the following method and contained PTFE and a fluorine-containing surfactant.

First, 530 g of deionized water and 30 g of paraffin wax were put into a reactor with a stirrer that had an internal volume 1 L and was made of glass. Furthermore, perfluorohexanoic acid was added thereto by adjusting the amount thereof such that the amount of perfluorohexanoic acid (corresponding to a fluorine-containing surfactant 1) contained in the finally obtained coating layer became 0.1% by mass. Then, the content in the reactor was aspirated in a state of being heated to 85° C., and purging was performed using a tetraluoroethylene monomer so as to remove oxygen in the reactor. Thereafter, 0.03 g of ethane gas was added to the reactor, and the content was stirred at 540 rpm. A tetrafluoroethylene monomer was added to the reactor until the internal pressure became 0.73 MPaG. Ammonium persulfate (0.11 g) dissolved in 20 g of deionized water was injected into the reactor such that the internal pressure of the reactor became 0.83 MPaG. After the injection of the initiator, the pressure was reduced, and the initiation of polymerization was observed. A tetrafluoroethylene monomer was added to the reactor so as to maintain the pressure, and the polymerization was continued until approximately 140 g of the tetrafluoroethylene monomer finished the reaction. Subsequently, the reactor was evacuated until the internal pressure of the reactor became normal pressure, and the content was taken out of the reactor and cooled. Paraffin wax as a supernatant was removed from the aqueous PTFE dispersion liquid.

The aqueous PTFE dispersion liquid was put into a freezer and left to freeze. The frozen aqueous PTFE dispersion liquid was left until the temperature thereof became 25° C., thereby obtaining solidified powder. The solidified wet powder was dried at 150° C. for 18 hours, thereby obtaining a composition for forming a coating layer.

A base material having undergone electropolishing was electrostatically coated with the composition for forming a coating layer obtained as above such that the thickness of the obtained coating film became 200 μm, and the coating film was fired for 15 minutes at the temperature described in Table 1 (described as "Firing temperature" in the table) and cooled in the air. In this way, a coating layer containing PTFE and a fluorine-containing surfactant was formed on the base material. The thickness of the coating layer was 20 μm.

<Measurement of $M_1/M_2$ and $M_3/M_4$>

For the liquid contact portion of the obtained coating layer, by using time-of-flight secondary ion mass spectrometer (TOF-SIMS) (manufactured by ION-TOF GmbH, trade name: "TOF-SIMS5"), $M_1/M_2$ was measured. The measurement conditions will be shown below.

$M_3/M_4$ was measured by the same method.

Primary ion: $Bi_3^{2+}$

Primary ion accelerating voltage: 25 kV

Measurement area: 150 μm

Angle measurement temperature: equal to or lower than −100° C.

The obtained sample was irradiated with Ar gas cluster ion beams (Ar-GCIB) for etching and with $Bi^{3+}$ as a primary ion source, and the obtained secondary ions were analyzed using a time-of-flight mass spectrometer, thereby obtaining a spectrum.

In a case where etching was performed using Ar-GCIB, the molecular structure was not destroyed in the thickness direction from the outermost surface. Accordingly, regarding the state of interfacial bonding, accurate information could be obtained. Because the value obtained by the measurement was expressed using atom/cm$^2$, the number of moles was calculated from the numerical value and multiplied by the number of atoms (number of molecules) so as to convert the value into mass.

Ar-GCIB injection pressure: 3 MPa
Measurement area: 150 μm
Angle measurement mode: high-resolution mass spectrometry <Measurement of $X_1$>

The atom number ration $X_1$ of the number of fluorine atoms contained in the surface of the coating layer to the number of carbon atoms contained in the same surface was measured by the following method.

Device: Quantera-SXM (trade name) device manufactured by PHYSICAL ELECTRONICS, INC.
X-ray source: monochromatic Al kα rays (1486.6 eV, 25 W, 15 kV, beam size: 200
Measurement region: 200 μm
Measurement condition: Pass Energy=140 eV, step=0.1 eV, number of times of integration: 4 to 8
Measurement method: the measurement sample was set in the device described above and measured by setting a photoelectron take-off angle to be 10°.

By using the content (at %) of carbon atoms and the content (at %) of fluorine atoms obtained as above, $X_1$ was calculated. The results are shown in Table 1.

<Elution Test>

A coating layer, which was prepared in addition to the above coating layer by the same method, was immersed for 48 hours in a test solvent (manufactured by FUJIFILM Ultra Pure Solutions, INC.) containing isopropanol at a proportion equal to or higher than 99.99% by mass at a liquid temperature of 25° C. under the condition that a mass ratio (g/g) of coating layer/test solvent became 0.1. The increase in the content of each impurity contained in the test solvent before and after the immersion was measured by the following method. The results are shown in Table 1.

(Metal Particles and Metal Ions)

For the measurement, Agilent 8800 triple quadrupole inductively coupled plasma mass spectrometry (ICP-MS, for semiconductor analysis, option #200) was used. Based on the measurement results, the content of metal particles and the content of metal ions were determined.

Measurement Conditions

As a sample introduction system, a quartz torch, a coaxial perfluoroalkoxyalkane (PFA) nebulizer (for self-suction), and a platinum interface cone were used. The measurement parameters of cool plasma conditions are as below.

Output of Radio Frequency (RF) (W): 600
Flow rate of carrier gas (L/min): 0.7
Flow rate of makeup gas (L/min): 1
Sampling depth (mm): 18

(Organic Impurities)

For the measurement, a gas chromatography mass spectrometer (trade name "GCMS-2020", manufactured by Shimadzu Corporation, the measurement conditions were as described below) was used.

Measurement Condition

Capillary column: InertCap 5MS/NP 0.25 mmI.D.×30 m df=0.25 μm
Sample introduction method: split 75 kPa constant pressure
Vaporizing chamber temperature: 230° C.
Column oven temperature: 80° C. (2 min)-500° C. (13 min)
Heating rate 15° C./min
Carrier gas: helium
Septum purge flow rate: 5 mL/min
Split ratio: 25:1
Interface temperature: 250° C.
Ion source temperature: 200° C.
Measurement mode: Scan m/z=85~500
Amount of sample introduced: 1 μL (Fluoride Ions)

For the measurement, HIC-SP suppressor ion chromatograph manufactured by Shimadzu Corporation was used. The measurement conditions are as described below.

Measurement Conditions

Used column: ion exchange resin (inner diameter: 4.0 mm, length: 25 cm)
Mobile phase: sodium hydrogen carbonate solution (1.7 mmol/L)-sodium carbonate solution (1.8 mmol/L)
Flow rate: 1.5 mL/min
Amount of sample injected: 25 μL
Column temperature: 40° C.
Suppressor: electrodialysis type
Detector: electric conductivity detector (30° C.)

<Evaluation of Defect Inhibition Performance of Chemical Liquid>

The defect inhibition performance of the chemical liquid stored in the chemical liquid storage body was evaluated by the following method.

First, a silicon oxide film substrate having a diameter of 300 mm was prepared.

Then, by using a wafer surface inspection device (SP-5; manufactured by KLA-Tencor Corporation.), the number of particles (hereinafter, referred to as "defects") having a diameter equal to or greater than 32 nm that were present on the substrate was counted (the counted number was adopted as an initial value). Subsequently, the substrate was set in a spin jetting device, and while the substrate was being rotated, each of the chemical liquids was jetted to the surface of the substrate at a flow rate of 1.5 L/min. Thereafter, the substrate was spin-dried.

Then, by using the aforementioned device (SP-5), the number of defects present on the substrate having been coated with the chemical liquid was counted (the counted number was adopted as a counted value). Thereafter, a difference between the initial value and the counted value (initial value−counted value) was calculated. Based on the following standards, the obtained result was evaluated.

The above test was performed for the chemical liquid immediately after the chemical liquid storage body was manufactured. The results are described in Table 1 as "Initial defect inhibition performance". Then, the chemical liquid storage body was stored for 1 month at 25° C., the stored chemical liquid was then taken out and evaluated as described above. The results are described in Table 1 as "Defect inhibition performance after 1 month of storage".

"AA": The difference between the initial value and the counted value of the number of defects was equal to or smaller than 100.

"A": The difference between the initial value and the counted value of the number of defects was greater than 100 and equal to or smaller than 300.

"B": The difference between the initial value and the counted value of the number of defects was greater than 300 and equal to or smaller than 500.

"C": The difference between the initial value and the counted value of the number of defects was greater than 500 and equal to or smaller than 1,000.

"D": The difference between the initial value and the counted value of the number of defects was greater than 1,000.

Examples 2 to 35 and 37 to 70

By using a composition for forming a coating layer, which was manufactured by the same method as in Example 1 by using the fluorine-containing polymer and the fluorine-containing surfactant described in Table 1, a coating layer having a thickness of 20 μm was formed on the same base material as that in Example 1, thereby preparing a container. For PFA of Example 26, a fluorine-containing polymer in which the terminal of a molecular chain was stabilized using —$CF_3$ was used (in Table 1, a fluorine-containing polymer for which "1" is described in the column of "Terminal stabilization" is a polymer having undergone terminal stabilization). The chemical liquid containing an organic solvent described in Table 1 was stored in the prepared container, thereby manufacturing a chemical liquid storage body. For each container, the elution test was performed. The results are shown in Table 1.

In Examples 67 to 70 for which "Sheet" is described in the column of "Firing temperature" in the table, a sheet containing PTFE and a fluorine-containing surfactant exhibiting the characteristics described in Table 1 was prepared and bonded at 120° C. to a base material (volume: 1,000 ml) made of high density polyethylene (HDPE) having the same shape as the container 11 in FIG. 1, thereby manufacturing a predetermined container.

Comparative Examples 1 to 8

By using the composition shown in Table 1, containers were prepared by the same method as in Example 1, and the chemical liquids described in Table 1 were stored in the prepared containers, thereby manufacturing chemical liquid storage bodies. The elution test was performed for each of the container. The results are shown in Table 1.

The abbreviations described in Table 1 represent the following fluorine-containing polymers.

PTFE: polytetrafluoroethylene
PFA: perfluoroalkoxyalkane
FEP: tetrafluoroethylene.hexafluoropropylene copolymer
ETFE: ethylene.tetrafluoroethylene copolymer (ethylene:tetrafluoroethylene=1:4 (molar ratio))
ECTFE: ethylene.chlorotrifluoroethylene copolymer (ethylene:chlorotrifluoroethylene=6:4 (molar ratio))
PCTFE: polychlorotrifluoroethylene
PVDF: polyvinylidene fluoride
PVF: polyvinyl fluoride
PTFE/PE: polytetrafluoroethylene/polyethylene The abbreviation shown in Table 1 represents the following.

PE: polyethylene

The used fluorine-containing surfactants are as below. The numbers "1 to 5" correspond to the type of the surfactant in Table 1.

1: $CF_3(CF_2)_4COOH$ (Log Pow: 3.15)
2: $CF_3CF_2CF_2OCF(CF_3)COOH$ (Log Pow: 4.98)
3: $CF_3OCF(CF_3)CF_2OCF(CF_3)COOH$ (Log Pow: 6.37)
4: $CF_3CF_2OCF_2CF_2OCF_2COOH$ (Log Pow: 6.29)
5: $CF_3(CF_2)_6COOH$ (Log Pow: 3.62)

Furthermore, the used surfactant which does not contain fluorine atoms is as below.

The number "6" corresponds to the type of the surfactant in Table 1.

6: $CH_3(CH_2)_8COOH$ (Log Pow: 3.27)

In Table 1, both the fluorine-containing surfactant and surfactant which does not contain fluorine atoms are described in the column of "Surfactant". Accordingly, $M_1$, $M_2$, and the like in Comparative Example 2 represent the content of the surfactant 6 and the like.

In Table 1, "-" means that the material was not used or the treatment was not performed.

In Table 1, "Bottle" in the column of "Container shape" means the container having the shape shown in Table 1, and "Tote can" means a rectangular container (size: 200 kg to 1 ton (provided from makers such as SUN FLUORO SYSTEM CO., LTD., Entegris, Inc., and the like as standard products in the related art)).

In Table 1, the column of "O-ring" shows whether an O-ring was used at the time of blocking the mouth of the bottle and the Tote can, and "-" means that an O-ring was not used. Furthermore, "PTFE" represents an O-ring including an O-ring body constituted with PTFE, "HDPE" represents an O-ring including an O-ring body constituted with high density polyethylene (HDPE), and "PE" represents an O-ring including an O-ring body constituted with polyethylene (PE).

In Table 1, the abbreviations in the column of "Polymerization initiator" represent the following compounds.

Az: azo-based polymerization initiator
Pe: peroxyester-based polymerization initiator
Di: dialkyl peroxide-based polymerization initiator In Table 1, the column of "Compound 3" represents the content of the compound 3 with respect to the total mass of a coating layer.

In Table 1, the column of "Polymerization initiator" represents the content of a polymerization initiator with respect to the total mass of a coating layer.

In Table 1, the column of "Chain transfer agent" represents the content of a chain transfer agent with respect to the total mass of a coating layer.

In Table 1, the column of "Plasticizer" represents the content of a plasticizer with respect to the total mass of a coating layer.

In Table 1, the data relating to each of the examples and comparative examples are listed in each line in Table 1-1-1 to 1-1-4 or Table 1-2-1 to 1-2-4. For example, for Example 1, the container of the chemical liquid storage body contains PTFE as a fluorine-containing polymer contained in the coating layer as shown in Table 1-1-1, the content of the compound 3 in the coating layer is 0.005% by mass as shown in Table 1-1-2, PGMM is stored as a chemical liquid in the container as shown in Table 1-1-3, and the result of initial defect inhibition performance is "A" as shown in Table 1-1-4. For other examples and comparative examples, the data can be read in the same manner.

[Table 1]

TABLE 1-1-1

| | Chemical liquid storage body Container Composition | | | | | | | | |
|---|---|---|---|---|---|---|---|---|---|
| | Fluorine- | | | Weight- | Fluorine-containing surfactant | | | | |
| | containing polymer Type | Container shape | O-RING | average molecular weight | Type | Terminal stabilization | $M_1$ (% by mass) | $M_2$ (% by mass) | $M_1/M_2$ |
| Example 1 | PTFE | Bottle | — | 480,000 | 1 | — | 0.10 | 0.20 | 0.50 |
| Example 2 | PTFE | Tote can | PTFE | 480,000 | 1 | — | 0.10 | 0.20 | 0.50 |
| Example 3 | PTFE | Tote can | PTFE | 480,000 | 1 | — | 0.10 | 0.20 | 0.50 |
| Example 4 | PTFE | Tote can | PTFE | 480,000 | 1 | — | 0.10 | 0.20 | 0.50 |
| Example 5 | PTFE | Tote can | PTFE | 480,000 | 1 | — | 0.10 | 0.20 | 0.50 |
| Example 6 | PTFE | Tote can | PTFE | 480,000 | 1 | — | 0.10 | 0.20 | 0.50 |
| Example 7 | FTFE | Tote can | PTFE | 480,000 | 1 | — | 0.10 | 0.20 | 0.50 |
| Example 8 | PTFE | Tote can | PTFE | 450,000 | 1 | — | 0.10 | 0.20 | 0.50 |
| Example 9 | FTFE | Tote can | PTFE | 580,000 | 1 | — | 0.10 | 0.20 | 0.50 |
| Example 10 | PTFE | Tote can | PTFE | 580,000 | 1 | — | 0.10 | 0.20 | 0.50 |
| Example 11 | PTFE | Tote can | PTFE | 450,000 | 1 | — | 0.10 | 0.20 | 0.50 |
| Example 12 | PTFE | Tote can | PTFE | 450,000 | 1 | — | 0.10 | 0.20 | 0.50 |
| Example 13 | PTFE | Tote can | PTFE | 450,000 | 1 | — | 0.10 | 0.20 | 0.50 |
| Example 14 | PTFE | Tote can | PTFE | 450,000 | 1 | — | 0.10 | 0.20 | 0.50 |
| Example 15 | PTFE | Tote can | PTFE | 580,000 | 1 | — | 0.10 | 0.20 | 0.50 |
| Example 16 | PTFE | Tote can | PTFE | 580,000 | 1 | — | 0.10 | 0.20 | 0.50 |
| Example 17 | PTFE | Tote can | PTFE | 580,000 | 1 | — | 0.10 | 0.20 | 0.50 |
| Example 18 | PTFE | Tote can | PTFE | 580,000 | 1 | — | 0.10 | 0.20 | 0.50 |
| Example 19 | PTFE | Tote can | PTFE | 580,000 | 1 | — | 0.10 | 0.20 | 0.50 |
| Example 20 | PTFE | Tote can | PTFE | 580,000 | 1 | — | 0.10 | 0.20 | 0.50 |
| Example 21 | PTFE | Tote can | PTFE | 580,000 | 2 | — | 0.10 | 0.15 | 0.67 |
| Example 22 | PTFE | Tote can | PTFE | 580,000 | 3 | — | 0.075 | 0.10 | 0.75 |
| Example 23 | PTFE | Tote can | PTFE | 580,000 | 4 | — | 0.080 | 0.10 | 0.80 |
| Example 24 | PTFE | Tote can | PTFE | 580,000 | 5 | — | 0.10 | 0.20 | 0.50 |
| Example 25 | PFA | Tote can | PTFE | 580,000 | 1 | — | 0.10 | 0.15 | 0.67 |
| Example 26 | PFA | Bottle | — | 580,000 | 1 | 1 | 0.08 | 0.15 | 0.53 |
| Example 27 | FEP | Bottle | — | 580,000 | 1 | — | 0.10 | 0.13 | 0.77 |
| Example 28 | ETFE | Bottle | — | 580,000 | 1 | — | 0.10 | 0.12 | 0.83 |
| Example 29 | ECTFE | Bottle | — | 580,000 | 1 | — | 0.10 | 0.14 | 0.71 |
| Example 30 | PCTFE | Bottle | — | 580,000 | 1 | — | 0.090 | 0.11 | 0.82 |
| Example 31 | PVDF | Bottle | — | 580,000 | 1 | — | 0.10 | 0.16 | 0.63 |
| Example 32 | PVF | Bottle | — | 580,000 | 1 | — | 0.15 | 0.25 | 0.60 |
| Example 34 | PTFE | Tote can | PTFE | 580,000 | 1 | — | 0.10 | 0.13 | 0.77 |
| Example 35 | PTFE | Tote can | PTFE | 480,000 | 1 | — | 0.10 | 0.14 | 0.71 |

TABLE 1-1-1-continued

| | Chemical liquid storage body Container Composition | | | | | | | |
|---|---|---|---|---|---|---|---|---|
| | Fluorine-containing polymer Type | Container shape | O-RING | Weight-average molecular weight | Fluorine-containing surfactant | | | |
| | | | | | Type | Terminal stabilization | $M_1$ (% by mass) | $M_2$ (% by mass) | $M_1/M_2$ |
| Example 37 | PTFE | Bottle | — | 480,000 | 1 | — | 0.10 | 0.15 | 0.67 |
| Example 38 | PTFE | Tote can | PTFE | 480,000 | 1 | — | 0.00050 | 0.00080 | 0.63 |
| Example 39 | PTFE | Tote can | PTFE | 480,000 | 1 | — | 0.0010 | 0.0012 | 0.83 |
| Example 40 | PTFE | Tote can | PTFE | 480,000 | 1 | — | 0.030 | 0.040 | 0.75 |

[Table 2]

TABLE 1-1-2

| | Chemical liquid storage body Container | | | | | |
|---|---|---|---|---|---|---|
| | $X_1$ | Compound 3 (% by mass) | Polymerization initiator Type | Content (mass ppb) | Chain transfer agent (mass ppb) | Plasticizer (mass ppt) |
| Example 1 | 1.8 | 0.005 | Az | 200.0 | 40.0 | 100 |
| Example 2 | 1.8 | 0.005 | Pe | 200.0 | 40.0 | 100 |
| Example 3 | 1.8 | 0.005 | Az | 200.0 | 40.0 | 100 |
| Example 4 | 1.8 | 0.005 | Pe | 200.0 | 40.0 | 100 |
| Example 5 | 1.8 | 0.005 | Az | 200.0 | 40.0 | 100 |
| Example 6 | 1.8 | 0.005 | Di | 200.0 | 40.0 | 100 |
| Example 7 | 1.8 | 0.005 | Az | 200.0 | 40.0 | 100 |
| Example 8 | 1.8 | 0.005 | Az | 200.0 | 40.0 | 100 |
| Example 9 | 1.8 | 0.005 | Az | 200.0 | 40.0 | 100 |
| Example 10 | 1.8 | 0.005 | Az | 200.0 | 40.0 | 100 |
| Example 11 | 1.8 | 0.005 | Az | 200.0 | 40.0 | 100 |
| Example 12 | 1.8 | 0.005 | Az | 200.0 | 40.0 | 100 |
| Example 13 | 1.8 | 0.005 | Az | 200.0 | 40.0 | 100 |
| Example 14 | 1.8 | 0.005 | Az | 200.0 | 40.0 | 100 |
| Example 15 | 1.8 | 0.005 | Di | 200.0 | 40.0 | 100 |
| Example 16 | 1.8 | 0.005 | Az | 200.0 | 40.0 | 100 |
| Example 17 | 1.8 | 0.005 | Pe | 200.0 | 40.0 | 100 |
| Example 18 | 1.8 | 0.005 | Di | 200.0 | 40.0 | 100 |
| Example 19 | 1.8 | 0.005 | Az | 200.0 | 40.0 | 100 |
| Example 20 | 1.8 | 0.005 | Pe | 200.0 | 40.0 | 100 |
| Example 21 | 1.8 | 0.004 | Pe | 160.0 | 32.0 | 80 |
| Example 22 | 1.8 | 0.006 | Az | 240.0 | 48.0 | 120 |
| Example 23 | 18 | 0.004 | Az | 160.0 | 32.0 | 80 |
| Example 24 | 1.8 | 0.004 | Az | 160.0 | 32.0 | 80 |
| Example 25 | 1.4 | 0.006 | Az | 186.7 | 37.0 | 93 |
| Example 26 | 1.6 | 0.004 | Az | 142.2 | 28.0 | 71 |
| Example 27 | 1.8 | 0.003 | Az | 120.0 | 24.0 | 60 |
| Example 28 | 1.0 | 0.004 | Az | 88.9 | 18.0 | 44 |
| Example 29 | 1.1 | 0.006 | Az | 146.7 | 29.0 | 73 |
| Example 30 | 1.5 | 0.004 | Az | 133.3 | 27.0 | 67 |
| Example 31 | 1.0 | 0.006 | Di | 133.3 | 27.0 | 67 |
| Example 32 | 0.90 | 0.004 | Az | 80.0 | 16.0 | 40 |
| Example 34 | 1.9 | 0.004 | Az | 168.9 | 23.0 | 84 |
| Example 35 | 2.0 | 0.006 | Az | 266.7 | 53.0 | 133 |
| Example 37 | 1.9 | 0.004 | Az | 168.9 | 34.0 | 84 |
| Example 38 | 1.9 | 0.006 | Az | 253.3 | 51.0 | 127 |
| Example 39 | 1.9 | 0.004 | Az | 168.9 | 34.0 | 84 |
| Example 40 | 1.9 | 0.004 | Az | 168.9 | 34.0 | 84 |

[Table 3]

TABLE 1-1-3

| | Chemical liquid storage body Container | | | | | Chemical liquid |
|---|---|---|---|---|---|---|
| | $M_3$ (% by mass) | $M_1$ (% by mass) | $M_3/M_4$ | $M_1/M_3$ | Firing temperature (° C.) | Organic solvent |
| Example 1 | 0.005 | 0.004 | 1.25 | 20 | 315 | PGMM |
| Example 2 | 0.005 | 0.004 | 1.25 | 20 | 315 | PGME |
| Example 3 | 0.005 | 0.004 | 1.25 | 20 | 315 | PGMP |
| Example 4 | 0.005 | 0.004 | 1.25 | 20 | 315 | PGMEA |
| Example 5 | 0.005 | 0.004 | 1.25 | 20 | 315 | EL |
| Example 6 | 0.005 | 0.004 | 1.25 | 20 | 315 | MPM |
| Example 7 | 0.005 | 0.004 | 1.25 | 20 | 315 | CyPn |
| Example 8 | 0.005 | 0.004 | 1.25 | 20 | 315 | CyHe |
| Example 9 | 0.005 | 0.004 | 1.25 | 20 | 315 | γBL |
| Example 10 | 0.005 | 0.004 | 1.25 | 20 | 315 | D1AE |
| Example 11 | 0.005 | 0.004 | 1.25 | 20 | 295 | CyPn |
| Example 12 | 0.005 | 0.004 | 1.25 | 20 | 295 | CyHe |
| Example 13 | 0.005 | 0.004 | 1.25 | 20 | 295 | γBL |
| Example 14 | 0.005 | 0.004 | 1.25 | 20 | 295 | D1AE |
| Example 15 | 0.005 | 0.004 | 1.25 | 20 | 315 | nBA |
| Example 16 | 0.005 | 0.004 | 1.25 | 20 | 315 | iAA |
| Example 17 | 0.005 | 0.004 | 1.25 | 20 | 315 | Hexane |
| Example 18 | 0.005 | 0.004 | 1.25 | 20 | 315 | MAK |
| Example 19 | 0.005 | 0.004 | 1.25 | 20 | 315 | IPA |

TABLE 1-1-3-continued

| | Chemical liquid storage body Container | | | | | Chemical liquid |
|---|---|---|---|---|---|---|
| | $M_3$ (% by mass) | $M_1$ (% by mass) | $M_3/M_4$ | $M_1/M_3$ | Firing temperature (° C.) | Organic solvent |
| Example 20 | 0.005 | 0.004 | 1.25 | 20 | 315 | PGMEA/ PGME (v/v = 7/3) |
| Example 21 | 0.004 | 0.0032 | 1.25 | 25 | 315 | CyHe |
| Example 22 | 0.006 | 0.0048 | 1.25 | 12.5 | 315 | CyHe |
| Example 23 | 0.004 | 0.0032 | 1.25 | 20 | 315 | CyHe |
| Example 24 | 0.004 | 0.0032 | 1.25 | 25 | 315 | CyHe |
| Example 25 | 0.006 | 0.0048 | 1.25 | 16.7 | 300 | CyHe |
| Example 26 | 0.004 | 0.0032 | 1.25 | 20 | 300 | CyHe |
| Example 27 | 0.003 | 0.0024 | 1.25 | 33.3 | 220 | CyHe |
| Example 28 | 0.004 | 0.0032 | 1.25 | 25 | 160 | CyHe |
| Example 29 | 0.006 | 0.0048 | 1.25 | 16.7 | 150 | CyHe |
| Example 30 | 0.004 | 0.0032 | 1.25 | 22.5 | 150 | CyHe |
| Example 31 | 0.006 | 0.0048 | 1.25 | 16.7 | 150 | CyHe |
| Example 32 | 0.004 | 0.0032 | 1.25 | 37.5 | 150 | CyHe |
| Example 34 | 0.004 | 0.0032 | 1.25 | 25 | 315 | CyHe |
| Example 35 | 0.006 | 0.0048 | 1.25 | 16.7 | 320 | CyHe |
| Example 37 | 0.004 | 0.0032 | 1.25 | 25 | 300 | CyHe |
| Example 38 | 0.006 | 0.0048 | 1.25 | 0.1 | 300 | CyHe |
| Example 39 | 0.004 | 0.0032 | 1.25 | 0.25 | 300 | CyHe |
| Example 40 | 0.004 | 0.0032 | 1.25 | 7.5 | 300 | CyHe |

[Table 4]

TABLE 1-1-4

| | Evaluation | | | | | |
|---|---|---|---|---|---|---|
| | Elution test Increase in impurities before and after immersion | | | | Initial | Defect inhibition performance |
| | Organic impurities (mass ppt) | Metal ions (mass ppt) | Metal particles (mass ppt) | Fluoride ions (mass ppt) | defect inhibition performance | after 1 month of storage |
| Example 1 | $2.25 \times 10^2$ | $4.50 \times 10^{-1}$ | $2.70 \times 10^{-1}$ | $1.80 \times 10^2$ | A | A |
| Example 2 | $1.50 \times 10^2$ | $3.00 \times 10^{-1}$ | $1.80 \times 10^{-1}$ | $1.20 \times 10^2$ | A | A |
| Example 3 | $3.00 \times 10^2$ | $6.00 \times 10^{-1}$ | $3.60 \times 10^{-1}$ | $2.40 \times 10^2$ | A | A |
| Example 4 | $2.25 \times 10^2$ | $4.50 \times 10^{-1}$ | $2.70 \times 10^{-1}$ | $1.80 \times 10^2$ | A | A |
| Example 5 | $3.75 \times 10^2$ | $7.50 \times 10^{-1}$ | $4.50 \times 10^{-1}$ | $3.00 \times 10^2$ | A | A |
| Example 6 | $1.50 \times 10^2$ | $3.00 \times 10^{-1}$ | $1.80 \times 10^{-1}$ | $1.20 \times 10^2$ | A | A |
| Example 7 | $3.00 \times 10^2$ | $6.00 \times 10^{-1}$ | $3.60 \times 10^{-1}$ | $2.40 \times 10^2$ | A | A |
| Example 8 | $3.75 \times 10^2$ | $7.50 \times 10^{-1}$ | $4.50 \times 10^{-1}$ | $3.00 \times 10^2$ | A | A |
| Example 9 | $1.50 \times 10^2$ | $3.00 \times 10^{-1}$ | $1.80 \times 10^{-1}$ | $1.20 \times 10^2$ | A | A |
| Example 10 | $4.50 \times 10^2$ | $9.00 \times 10^{-1}$ | $5.40 \times 10^{-1}$ | $3.60 \times 10^2$ | A | A |
| Example 11 | $1.29 \times 10^6$ | $2.58 \times 10^1$ | $1.55 \times 10^1$ | $1.20 \times 10^2$ | B | C |
| Example 12 | $3.75 \times 10^2$ | $1.25 \times 10^4$ | $4.50 \times 10^{-1}$ | $3.00 \times 10^2$ | B | C |
| Example 13 | $1.50 \times 10^2$ | $3.00 \times 10^{-1}$ | $1.07 \times 10^4$ | $1.20 \times 10^2$ | B | C |
| Example 14 | $4.50 \times 10^2$ | $9.00 \times 10^{-1}$ | $5.40 \times 10^{-1}$ | $1.02 \times 10^7$ | C | C |
| Example 15 | $2.25 \times 10^2$ | $4.50 \times 10^{-1}$ | $2.70 \times 10^{-1}$ | $1.80 \times 10^2$ | A | A |
| Example 16 | $2.25 \times 10^2$ | $4.50 \times 10^{-1}$ | $2.70 \times 10^{-1}$ | $1.80 \times 10^2$ | A | A |
| Example 17 | $3.00 \times 10^2$ | $6.00 \times 10^{-1}$ | $3.60 \times 10^{-1}$ | $2.40 \times 10^2$ | A | A |
| Example 18 | $2.25 \times 10^2$ | $4.50 \times 10^{-1}$ | $2.70 \times 10^{-1}$ | $1.80 \times 10^2$ | A | A |
| Example 19 | $1.50 \times 10^2$ | $3.00 \times 10^{-1}$ | $1.80 \times 10^{-1}$ | $1.20 \times 10^2$ | A | A |
| Example 20 | $1.50 \times 10^2$ | $3.00 \times 10^{-1}$ | $1.80 \times 10^{-1}$ | $1.20 \times 10^2$ | A | A |
| Example 21 | $3.75 \times 10^2$ | $7.50 \times 10^{-1}$ | $4.50 \times 10^{-1}$ | $3.00 \times 10^2$ | A | B |
| Example 22 | $3.75 \times 10^2$ | $7.50 \times 10^{-1}$ | $4.50 \times 10^{-1}$ | $3.00 \times 10^2$ | A | B |
| Example 23 | $3.75 \times 10^2$ | $7.50 \times 10^{-1}$ | $4.50 \times 10^{-1}$ | $3.00 \times 10^2$ | A | B |
| Example 24 | $3.75 \times 10^2$ | $7.50 \times 10^{-1}$ | $4.50 \times 10^{-1}$ | $3.00 \times 10^2$ | A | A |
| Example 25 | $5.25 \times 10^3$ | $1.05 \times 10^1$ | $6.30 \times 10^0$ | $4.20 \times 10^3$ | B | B |
| Example 26 | $8.75 \times 10^2$ | $1.30 \times 10^1$ | $1.20 \times 10^0$ | $6.50 \times 10^2$ | A | A |
| Example 27 | $1.08 \times 10^4$ | $2.15 \times 10^1$ | $1.29 \times 10^1$ | $8.60 \times 10^3$ | B | B |
| Example 28 | $1.22 \times 10^4$ | $2.43 \times 10^1$ | $1.46 \times 10^1$ | $9.72 \times 10^3$ | B | B |
| Example 29 | $9.45 \times 10^3$ | $1.89 \times 10^1$ | $1.13 \times 10^1$ | $7.56 \times 10^3$ | B | B |
| Example 30 | $7.80 \times 10^3$ | $1.56 \times 10^1$ | $9.36 \times 10^0$ | $6.24 \times 10^3$ | B | B |
| Example 31 | $1.30 \times 10^4$ | $2.59 \times 10^1$ | $1.55 \times 10^1$ | $1.04 \times 10^4$ | B | B |
| Example 32 | $1.45 \times 10^4$ | $2.89 \times 10^1$ | $1.73 \times 10^1$ | $1.16 \times 10^4$ | B | B |
| Example 34 | $5.00 \times 10^{-1}$ | $1.00 \times 10^{-1}$ | $6.00 \times 10^{-2}$ | $4.00 \times 10^1$ | AA | AA |
| Example 35 | $5.00 \times 10^{-1}$ | $1.00 \times 10^{-1}$ | $6.00 \times 10^{-2}$ | $2.15 \times 10^3$ | B | C |
| Example 37 | $5.00 \times 10^0$ | $1.00 \times 10^{-2}$ | $6.00 \times 10^{-3}$ | $4.00 \times 10^0$ | AA | AA |

TABLE 1-1-4-continued

|  | Elution test Increase in impurities before and after immersion | | | | Evaluation | |
|---|---|---|---|---|---|---|
|  | Organic impurities (mass ppt) | Metal ions (mass ppt) | Metal particles (mass ppt) | Fluoride ions (mass ppt) | Initial defect inhibition performance | Defect inhibition performance after 1 month of storage |
| Example 38 | $1.75 \times 10^3$ | $3.50 \times 10^0$ | $1.75 \times 10^0$ | $1.40 \times 10^3$ | C | C |
| Example 39 | $1.40 \times 10^3$ | $2.80 \times 10^0$ | $1.40 \times 10^0$ | $1.12 \times 10^3$ | B | B |
| Example 40 | $5.50 \times 10^2$ | $1.10 \times 10^0$ | $5.50 \times 10^{-1}$ | $4.40 \times 10^2$ | A | B |

[Table 5]

TABLE 1-2-1

|  | Chemical liquid storage body | | | | | | | |
|---|---|---|---|---|---|---|---|---|
|  | Container | | | | | Fluorine-containing surfactant | | |
|  | Fluorine-containing polymer Type | Container shape | O-RING | Weight-average molecular weight | Type | Terminal stabilization | $M_1$ (% by mass) | $M_2$ (% by mass) | $M_1/M_2$ |
| Example 41 | PTFE | Tote can | PTFE | 480,000 | 1 | — | 1.0 | 2.0 | 0.50 |
| Example 42 | PTFE | Bottle | — | 480,000 | 1 | — | 1.0 | 1.8 | 0.56 |
| Example 43 | PTFE | Tote can | PTFE | 480,000 | 1 | — | 8.0 | 14 | 0.57 |
| Example 50 | PTFE | Tote can | PTFE | 440,000 | 1 | — | 0.15 | 0.20 | 0.75 |
| Example 51 | PTFE | Tote can | PTFE | 490,000 | 1 | — | 0.08 | 0.12 | 0.67 |
| Example 52 | PTFE | Tote can | PTFE | 450,000 | 1 | — | 0.60 | 1.02 | 0.59 |
| Example 53 | PTFE | Tote can | PTFE | 440,000 | 1 | — | 0.01 | 0.02 | 0.67 |
| Example 54 | PTFE | Tote can | PTFE | 490,000 | 1 | — | 0.03 | 0.05 | 0.60 |
| Example 55 | PTFE | Tote can | PTFE | 490,000 | 1 | — | 0.10 | 0.18 | 0.56 |
| Example 56 | PTFE | Tote can | PTFE | 490,000 | 1 | — | 0.007 | 0.01 | 0.64 |
| Example 57 | PTFE | Tote can | PTFE | 35,000 | 1 | — | 0.05 | 0.09 | 0.56 |
| Example 58 | PTFE | Tote can | PTFE | 100,000 | 1 | — | 0.07 | 0.09 | 0.78 |
| Example 59 | PTFE | Tote can | PTFE | 2,500,000 | 1 | — | 0.08 | 0.10 | 0.80 |
| Example 60 | PTFE | Tote can | PTFE | 5,500,000 | 1 | — | 0.12 | 0.22 | 0.55 |
| Example 61 | PTFE | Tote can | PTFE | 6,300,000 | 1 | — | 0.15 | 0.26 | 0.58 |
| Example 62 | PFA | Tote can | PTFE | 480,000 | 1 | — | 0.08 | 0.15 | 0.53 |
| Example 63 | PTFE | Tote can | HDPE | 480,000 | 1 | — | 0.10 | 0.20 | 0.50 |
| Example 64 | PFA | Tote can | HDPE | 480,000 | 1 | — | 0.08 | 0.15 | 0.53 |
| Example 65 | PTFE | Tote can | PTFE | 480,000 | 1 | — | 0.08 | 0.15 | 0.53 |
| Example 66 | PTFE | Tote can | PE | 480,000 | 1 | — | 0.08 | 0.15 | 0.53 |
| Example 67 | PTFE | Tote can | — | 480,000 | 1 | — | 0.15 | 0.18 | 0.83 |
| Example 68 | PTFE | Tote can | — | 480,000 | 1 | — | 0.15 | 0.20 | 0.75 |
| Example 69 | PTFE | Tote can | — | 480,000 | 1 | — | 0.15 | 0.20 | 0.75 |
| Example 70 | PTFE | Tote can | — | 480,000 | 1 | — | 0.15 | 0.20 | 0.75 |
| Comparative Example 1 | PTFE/PE | Bottle | — | 480,000 | 1 | — | 0.10 | 0.10 | 1.0 |
| Comparative Example 2 | PFA | Bottle | — | 480,000 | 6 | — | 0.10 | 0.15 | 0.67 |
| Comparative Example 3 | PE | Bottle | — | 380,000 | 1 | — | 0.10 | 0.10 | 1.0 |
| Comparative Example 4 | PTFE | Bottle | — | 480,000 | — | — | 0.30 | 0.20 | 1.5 |
| Comparative Example 5 | PTFE | Bottle | — | 500,000 | 1 | — | 0.10 | 0.50 | 0.20 |
| Comparative Example 6 | PTFE | Bottle | — | 500,000 | 1 | — | 0.50 | 0.20 | 2.5 |
| Comparative Example 7 | PTFE | Bottle | — | 400,000 | 1 | — | 0.10 | 0.10 | 1.0 |
| Comparative Example 8 | PTFE | Bottle | — | 500,000 | 1 | — | 0.010 | 0.50 | 0.020 |

TABLE 1-2-2

| | Chemical liquid storage body Container | | | | |
|---|---|---|---|---|---|
| | Compound | | Polymerization initiator | | Chain transfer agent (mass ppb) | Plasti- cizer (mass ppt) |
| | $X_1$ | 3 (% by mass) | Type | Content (mass ppb) | | |
| Example 41 | 1.9 | 0.006 | Az | 253.3 | 51.0 | 127 |
| Example 42 | 1.9 | 0.004 | Az | 168.9 | 34.0 | 84 |
| Example 43 | 1.9 | 0.006 | Az | 253.3 | 51.0 | 127 |
| Example 50 | 1.8 | 0.001 | Az | 40.0 | 8.0 | 20 |
| Example 51 | 1.8 | 0.003 | Az | 120.0 | 24.0 | 60 |
| Example 52 | 1.8 | 0.005 | Az | 200.0 | 40.0 | 100 |
| Example 53 | 1.8 | 0.006 | Az | 240.0 | 48.0 | 120 |
| Example 54 | 1.8 | 0.0008 | Az | 32.0 | 6.0 | 16 |
| Example 55 | 1.8 | 0.03 | Az | 1200.0 | 240.0 | 600 |
| Example 56 | 1.8 | 0.08 | Az | 3200.0 | 640.0 | 1600 |
| Example 57 | 1.8 | 0.0008 | Az | 32.0 | 6.0 | 16 |
| Example 58 | 1.8 | 0.001 | Az | 40.0 | 8.0 | 20 |
| Example 59 | 1.8 | 0.003 | Az | 120.0 | 24.0 | 60 |
| Example 60 | 1.8 | 0.009 | Az | 360.0 | 72.0 | 180 |
| Example 61 | 1.8 | 0.012 | Az | 480.0 | 96.0 | 240 |
| Example 62 | 1.6 | 0.004 | Az | 140.0 | 28.0 | 71 |
| Example 63 | 1.8 | 0.005 | Pe | 200.0 | 40.0 | 100 |
| Example 64 | 1.6 | 0.004 | Az | 142.2 | 28.0 | 71 |
| Example 65 | 1.6 | 0.004 | Az | 142.2 | 28.0 | 71 |
| Example 66 | 1.6 | 0.004 | Az | 142.2 | 28.0 | 71 |
| Example 67 | 1.9 | 0.004 | Az | 168.9 | 34.0 | 85 |
| Example 68 | 1.9 | 0.004 | Az | 168.9 | 34.0 | 83 |
| Example 69 | 1.9 | 0.004 | Az | 168.9 | 34.0 | 83 |
| Example 70 | 1.9 | 0.004 | Az | 168.9 | 34.0 | 83 |
| Comparative Example 1 | 0.40 | 0.004 | Az | 35.6 | 7.0 | 18 |
| Comparative Example 2 | 0.50 | 0.004 | Az | 44.4 | 9.0 | 22 |
| Comparative Example 3 | 0.30 | 0.006 | Az | 40.0 | 8.0 | 20 |
| Comparative Example 4 | 1.6 | 0.004 | Az | 142.2 | 28.0 | 71 |
| Comparative Example 5 | 1.8 | 0.004 | Az | 160.0 | 32.0 | 80 |
| Comparative Example 6 | 1.6 | 0.006 | Az | 213.3 | 43.0 | 107 |
| Comparative Example 7 | 0.40 | 0.004 | Az | 35.6 | 7.0 | 18 |
| Comparative Example 8 | 3.1 | 0.005 | Az | 344.4 | 69.0 | 172 |

TABLE 1-2-3

| | Chemical liquid storage body Container | | | | | |
|---|---|---|---|---|---|---|
| | $M_3$ (% by mass) | $M_4$ (% by mass) | $M_3/M_4$ | $M_1/M_3$ | Firing temp- erature (°C) | Chemical liquid Organic solvent |
| Example 41 | 0.02 | 0.016 | 1.25 | 50.0 | 300 | CyHe |
| Example 42 | 0.018 | 0.0144 | 1.25 | 56 | 300 | CyHe |
| Example 43 | 0.1 | 0.08 | 1.25 | 80.0 | 300 | CyHe |
| Example 50 | 0.001 | 0.001 | 1.00 | 150 | 300 | CyHe |
| Example 51 | 0.003 | 0.006 | 0.50 | 27 | 300 | CyHe |
| Example 52 | 0.005 | 0.015 | 0.33 | 120 | 300 | CyHe |
| Example 53 | 0.006 | 0.0036 | 1.67 | 2 | 300 | CyHe |
| Example 54 | 0.0008 | 0.00064 | 1.25 | 38 | 300 | CyHe |
| Example 55 | 0.03 | 0.024 | 1.25 | 3.33 | 300 | CyHe |
| Example 56 | 0.08 | 0.064 | 1.25 | 0.088 | 300 | CyHe |
| Example 57 | 0.0008 | 0.00064 | 1.25 | 63 | 300 | CyHe |
| Example 58 | 0.001 | 0.0008 | 1.25 | 70 | 300 | CyHe |
| Example 59 | 0.003 | 0.0024 | 1.25 | 27 | 300 | CyHe |
| Example 60 | 0.009 | 0.0072 | 1.25 | 13 | 300 | CyHe |
| Example 61 | 0.012 | 0.0096 | 1.25 | 13 | 300 | CyHe |
| Example 62 | 0.004 | 0.0032 | 1.25 | 20 | 300 | CyHe |
| Example 63 | 0.005 | 0.004 | 1.25 | 20 | 300 | CyHe |
| Example 64 | 0.004 | 0.0032 | 1.25 | 20 | 300 | CyHe |
| Example 65 | 0.004 | 0.0032 | 1.25 | 20 | 300 | CyHe |
| Example 66 | 0.004 | 0.0032 | 1.25 | 20 | 300 | CyHe |
| Example 67 | 0.002 | 0.0012 | 1.67 | 75 | Sheet | CyHe |
| Example 68 | 0.002 | 0.0013 | 1.54 | 75 | Sheet | nBA |
| Example 69 | 0.002 | 0.0013 | 1.54 | 75 | Sheet | EL |
| Example 70 | 0.002 | 0.0013 | 1.54 | 75 | Sheet | PGMEA |
| Comparative Example 1 | 0.004 | 0.0032 | 1.25 | 25 | 250 | nBA |
| Comparative Example 2 | 0.004 | 0.0032 | 1.25 | 25 | 300 | nBA |
| Comparative Example 3 | 0.006 | 0.0048 | 1.25 | 16.7 | 200 | nBA |
| Comparative Example 4 | 0.004 | 0.0032 | 1.25 | 75 | 315 | nBA |
| Comparative Example 5 | 0.004 | 0.0032 | 1.25 | 25 | 315 | nBA |
| Comparative Example 6 | 0.006 | 0.0048 | 1.25 | 83.3 | 315 | nBA |
| Comparative Example 7 | 0.004 | 0.0032 | 1.25 | 25 | 315 | nBA |
| Comparative Example 8 | 0.005 | 0.004 | 1.25 | 2 | 315 | nBA |

TABLE 1-2-4

| | Evaluation | | | | | |
|---|---|---|---|---|---|---|
| | Elution test Increase in impurities before and after immersion | | | | Defect inhibition performance | |
| | Organic impurities (mass ppt) | Metal ions (mass ppt) | Metal particles (mass ppt) | Fluoride ions (mass ppt) | Initial defect inhibition performance | after 1 month of storage |
| Example 41 | $5.00 \times 10^1$ | $1.00 \times 10^{-1}$ | $5.00 \times 10^{-2}$ | $4.00 \times 10^1$ | B | B |
| Example 42 | $1.50 \times 10^2$ | $3.00 \times 10^{-1}$ | $1.50 \times 10^{-1}$ | $1.20 \times 10^2$ | A | A |
| Example 43 | $1.25 \times 10^3$ | $2.50 \times 10^0$ | $1.25 \times 10^0$ | $1.00 \times 10^3$ | B | A |
| Example 50 | $3.0 \times 10^2$ | $6.00 \times 10^{-1}$ | $4.00 \times 10^{-1}$ | $2.40 \times 10^2$ | B | B |
| Example 51 | $3.0 \times 10^2$ | $6.00 \times 10^{-1}$ | $4.00 \times 10^{-1}$ | $2.40 \times 10^2$ | A | A |
| Example 52 | $3.0 \times 10^2$ | $6.00 \times 10^{-1}$ | $4.00 \times 10^{-1}$ | $2.40 \times 10^2$ | B | B |
| Example 53 | $3.0 \times 10^2$ | $6.00 \times 10^{-1}$ | $4.00 \times 10^{-1}$ | $2.40 \times 10^2$ | B | B |
| Example 54 | $3.0 \times 10^2$ | $6.00 \times 10^{-1}$ | $4.00 \times 10^{-1}$ | $2.40 \times 10^2$ | A | A |
| Example 55 | $3.0 \times 10^2$ | $6.00 \times 10^{-1}$ | $4.00 \times 10^{-1}$ | $2.40 \times 10^2$ | A | B |
| Example 56 | $3.0 \times 10^2$ | $6.00 \times 10^{-1}$ | $4.00 \times 10^{-1}$ | $2.40 \times 10^2$ | B | B |
| Example 57 | $3.65 \times 10^2$ | $7.50 \times 10^{-1}$ | $5.00 \times 10^{-1}$ | $3.00 \times 10^2$ | A | C |
| Example 58 | $3.25 \times 10^2$ | $6.50 \times 10^{-1}$ | $4.00 \times 10^{-1}$ | $2.70 \times 10^2$ | A | A |

TABLE 1-2-4-continued

| | Elution test Increase in impurities before and after immersion | | | | Evaluation | |
|---|---|---|---|---|---|---|
| | | | | | Defect inhibition performance | |
| | Organic impurities (mass ppt) | Metal ions (mass ppt) | Metal particles (mass ppt) | Fluoride ions (mass ppt) | Initial defect inhibition performance | after 1 month of storage |
| Example 59 | $3.9 \times 10^2$ | $5.50 \times 10^{-1}$ | $4.00 \times 10^{-1}$ | $2.60 \times 10^2$ | A | B |
| Example 60 | $3.65 \times 10^2$ | $7.00 \times 10^{-1}$ | $2.00 \times 10^{-1}$ | $1.20 \times 10^2$ | A | C |
| Example 61 | $3.80 \times 10^2$ | $6.00 \times 10^{-1}$ | $2.00 \times 10^{-1}$ | $0.90 \times 10^2$ | A | C |
| Example 62 | $2.25 \times 10^2$ | $5.00 \times 10^{-1}$ | $3.00 \times 10^{-1}$ | $1.80 \times 10^2$ | A | A |
| Example 63 | $3.37 \times 10^4$ | $6.80 \times 10^1$ | $4.10 \times 10^1$ | $2.70 \times 10^4$ | A | A |
| Example 64 | $3.89 \times 10^4$ | $7.80 \times 10^1$ | $4.70 \times 10^1$ | $3.11 \times 10^4$ | A | B |
| Example 65 | $3.0 \times 10^2$ | $6.00 \times 10^{-1}$ | $4.00 \times 10^{-1}$ | $2.40 \times 10^2$ | A | A |
| Example 66 | $4.5 \times 10^4$ | $9.0 \times 10^1$ | $5.40 \times 10^1$ | $3.60 \times 10^4$ | A | B |
| Example 67 | $1.10 \times 10^1$ | $1.00 \times 10^{-2}$ | $6.00 \times 10^{-3}$ | $4.00 \times 10^0$ | AA | AA |
| Example 68 | $7.00 \times 10^0$ | $1.00 \times 10^{-2}$ | $6.00 \times 10^{-3}$ | $4.00 \times 10^0$ | AA | AA |
| Example 69 | $7.00 \times 10^0$ | $1.00 \times 10^{-2}$ | $6.00 \times 10^{-3}$ | $4.00 \times 10^0$ | AA | AA |
| Example 70 | $7.00 \times 10^0$ | $1.00 \times 10^{-2}$ | $6.00 \times 10^{-3}$ | $4.00 \times 10^0$ | AA | AA |
| Comparative Example 1 | $1.13 \times 10^7$ | $2.25 \times 10^4$ | $1.35 \times 10^4$ | $9.00 \times 10^6$ | D | D |
| Comparative Example 2 | $1.69 \times 10^7$ | $3.38 \times 10^4$ | $2.03 \times 10^4$ | $1.35 \times 10^7$ | D | D |
| Comparative Example 3 | $5.63 \times 10^7$ | $1.13 \times 10^5$ | $6.75 \times 10^4$ | $4.50 \times 10^7$ | D | D |
| Comparative Example 4 | $3.75 \times 10^6$ | $7.50 \times 10^3$ | $4.50 \times 10^3$ | $3.00 \times 10^6$ | D | D |
| Comparative Example 5 | $7.50 \times 10^6$ | $1.50 \times 10^4$ | $9.00 \times 10^3$ | $6.00 \times 10^6$ | D | D |
| Comparative Example 6 | $9.00 \times 10^6$ | $1.80 \times 10^4$ | $1.08 \times 10^4$ | $7.20 \times 10^6$ | D | D |
| Comparative Example 7 | $1.35 \times 10^7$ | $2.70 \times 10^4$ | $1.62 \times 10^4$ | $1.08 \times 10^7$ | D | D |
| Comparative Example 8 | $4.50 \times 10^7$ | $9.00 \times 10^4$ | $5.40 \times 10^4$ | $3.60 \times 10^7$ | D | D |

In examples, the entire surface of the liquid contact portion of the container shows the value of $M_1$, $M_2$, $M_3$, $M_4$, and $X_1$ of each of the examples.

As shown in the results described in Table 1, in a case where $X_1$ was equal to or higher than 1.5 and lower than 2.0, effects were excellent. Particularly, the chemical liquid stored in the chemical liquid storage body, which had a container formed of the member of Example 34 in which $X_1$ was higher than 1.8, had better initial defect inhibition performance and better defect inhibition performance after 1 month of storage, compared to the chemical liquid stored in the chemical liquid storage body formed of the member of Example 1. Presumably, this is because in a case where $X_1$ is higher than 1.8, the chemical resistance of the surface of the member may be improved, the amount of organic impurities and fluoride ions eluted from the surface of the member may be further reduced.

Furthermore, as shown in Examples 1 to 20, the chemical liquid stored in the chemical liquid storage body having a container, which was formed of the member of Example 1 in which the content of organic impurities contained in the test solvent having been used for immersion was equal to or smaller than 1,000 mass ppb, had better initial defect inhibition performance and better defect inhibition performance after 1 month of storage, compared to the chemical liquid stored in the chemical liquid storage body having a container formed of the member of Example 11. The chemical liquid stored in the chemical liquid storage body having a container, which was formed of the member of Example 1 in which the content of metal ions contained in the test solvent having been used for immersion was equal to or smaller than 10 mass ppb, had better initial defect inhibition performance and better defect inhibition performance after 1 month of storage, compared to the chemical liquid stored in the chemical liquid storage body having a container formed of the member of Example 12. The chemical liquid stored in the chemical liquid storage body having a container, which was formed of the member of Example 1 in which the content of metal particles contained in the test solvent having been used for immersion was equal to or smaller than 10 mass ppb, had better initial defect inhibition performance and better defect inhibition performance after 1 month of storage, compared to the chemical liquid stored in the chemical liquid storage body having a container formed of the member of Example 13. The chemical liquid stored in the chemical liquid storage body having a container, which was formed of the member of Example 1 in which the content of fluoride ions contained in the test solvent having been used for immersion was equal to or smaller than 10 mass ppm, had better initial defect inhibition performance and better defect inhibition performance after 1 month of storage, compared to the chemical liquid stored in the chemical liquid storage body having a container formed of the member of Example 14.

The chemical liquid stored in the chemical liquid storage body having a container, which was formed of the member of Example 34 in which Log Pow of the fluorine-containing surfactant contained in the composition was equal to or smaller than 3.7, had better initial defect inhibition performance and better defect inhibition performance after 1 month of storage, compared to the chemical liquid stored in the chemical liquid storage body having a container formed of the member of Examples 21 to 23.

The chemical liquid stored in the chemical liquid storage body having a container, which was formed of the member of Example 34 in which Log Pow of the fluorine-containing surfactant contained in the composition was equal to or smaller than 3.4, had better initial defect inhibition performance and better defect inhibition performance after 1 month of storage, compared to the chemical liquid stored in the chemical liquid storage body having a container formed of the member of Example 24.

The chemical liquid stored in the chemical liquid storage body having a container, which was formed of the member of Example 34 in which PTFE was used as a fluorine-containing polymer and the member of Example 26 in which PFA having undergone terminal stabilization treatment was used, had better initial defect inhibition performance and better defect inhibition performance after 1 month of storage, compared to the chemical liquid stored in the chemical liquid storage body having a container formed of the member of Example 21 and Examples 27 to 32.

The chemical liquid stored in the chemical liquid storage body having a container, which was formed of the member of Example 34 in which $X_1$ was lower than 2.0, had better defect inhibition performance after 1 month of storage, compared to the chemical liquid stored in the container formed of the member of Example 35. Presumably, this is because in a case where $X_1$ is lower than 2.0, amounts of free fluorine compounds such as decomposition products of the fluorine-containing surfactant present on the surface of the member may be relatively reduced, and accordingly, even though the chemical liquid storage body is stored for 1 month, amounts of free fluorine compounds eluted into the chemical liquid may be reduced.

The chemical liquid stored in the chemical liquid storage body having a container, which was formed of the member of Example 34 in which $M_2$ was equal to or smaller than 5.0% by mass, had better initial defect inhibition performance and better defect inhibition performance after 1 month of storage, compared to the chemical liquid stored in the chemical liquid storage body formed of the member of Example 43.

From Examples 64 and 66, it was confirmed that in a case where the O-ring is formed of PTFE, the effects are further improved.

By comparing Examples 52 and 53 with other examples, it was confirmed that in a case where $M_3/M_4$ is 0.50 to 1.50, the effects are further improved.

By comparing Examples 50 and 56 with other examples, it was confirmed that in a case where $M_1/M_3$ is 0.01 to 100, the effects are further improved.

By comparing Examples 57 to 61 with one another, it was confirmed that in a case where the weight-average molecular weight of the fluorine-containing polymer is 40,000 to 600,000, the effects are further improved.

Example 100

On the surface of SUS316 having undergone buffing, a coating layer was formed using the same material as the coating layer used in Example 1, thereby obtaining a member. In order for the coating layer to be a liquid contact portion of each of the units, the chemical liquid manufacturing device shown in FIG. 8 was modified. Then, in this device, acetone and hydrogen were reacted in the presence of copper oxide-zinc oxide-aluminum oxide so as to obtain a reactant containing IPA, and the reactant was purified, thereby manufacturing a chemical liquid. The aforementioned units were sequentially operated. The defect inhibition performance of the chemical liquid manufactured immediately after modification and the chemical liquid manufactured after 1 month was evaluated by the method described above. The results are shown in Table 2.

Examples 101 to 105 and Comparative Example 2-1

A chemical liquid was manufactured in the same manner as in Example 38, except that SUS316 having undergone buffing was used in the liquid contact portion of a predetermined unit instead of the member described above. The defect inhibition performance of the chemical liquid was evaluated. The results are shown in Table 2. In Table 2, "1" listed for the material of the liquid contact portion means that the liquid contact portion is formed of the aforementioned member, and "0" means that the liquid contact portion is formed of SUS316.

[Table 9]

TABLE 2

| | Material of liquid contact portion | | | | | Defect inhibition performance of chemical liquid manufactured | |
|---|---|---|---|---|---|---|---|
| | Reaction portion | Distillation column | Manufacturing tank | Filter unit | Filling device | Immediately after preparation | After 1 month |
| Example 100 | 1 | 1 | 1 | 1 | 1 | A | A |
| Example 101 | 0 | 1 | 1 | 1 | 1 | A | B |
| Example 102 | 1 | 0 | 1 | 1 | 1 | A | B |
| Example 103 | 1 | 1 | 0 | 1 | 1 | A | B |
| Example 104 | 1 | 1 | 1 | 0 | 1 | A | B |
| Example 105 | 1 | 1 | 1 | 1 | 0 | A | B |
| Comparative Example 2-1 | 0 | 0 | 0 | 0 | 0 | D | D |

As shown in results from Example 100, in a case where the member, which had a coating layer formed of the same material as the coating layer used in Example 1, was used as the liquid contact portion of each of the units, the chemical liquid obtained using the aforementioned manufacturing device immediately after modifying the manufacturing device had excellent defect inhibition performance. Furthermore, the chemical liquid, which was obtained 1 month after the manufacturing device was continuously operated and modified, also maintained excellent defect inhibition performance.

In contrast, with the manufacturing device of Comparative Example 2-1 in which SUS316 having undergone buffing was used in the liquid contact portion of each of the units, immediately after the manufacturing and after 1 month, the chemical liquid having predetermined defect inhibition performance was not obtained.

Furthermore, in a case where the manufacturing device of Example 100 was used in which the liquid contact portions of all the units including the reaction portion, the distillation column, the manufacturing tank, the filter unit, and the filling device were formed of the member described above, the chemical liquid obtained 1 month after the continuous operation had better defect inhibition performance, compared to the chemical liquids manufactured using the manufacturing devices of Example 101 to Example 105.

EXPLANATION OF REFERENCES 10, 20: Container with lid
11, 52: container
12, 51: lid
13: mouth
14: lateral portion
15: inner wall surface
16: outer wall surface
21: base material
22: coating layer
23: outer surface
30, 70: purification device
31: manufacturing tank
32: filter unit
33, 71, 72: pipe line
34: filling device
35: pump
36, 37, 83: valve
40: filter
41: filter medium
42: core
43: cap
44: liquid outlet
50: housing
53: liquid inlet
54: liquid outlet
55, 56: internal pipe line
71: distillation column
80: manufacturing device
81: reactor
82: raw material inlet

What is claimed is:

1. A container with a lid comprising:
a container body having a mouth;
a lid that covers the mouth; and
a coating layer,
wherein the coating layer is formed on a part of the container body and the lid, the part contacting and being likely to contact a chemical liquid in a case where the chemical liquid is stored in the container, and
wherein the coating layer comprises a fluorine-containing polymer; and a surfactant containing fluorine atoms,
provided that, in at least a surface of a portion of at least the container body, a mass-based content of the surfactant in the surface is $M_1$, and a mass-based content of the surfactant in a position 10 nm below the surface in a thickness direction of the container body is $M_2$, $M_1/M_2$ is 0.50 to 0.90, and an atom number ratio $X_1$ of the number of fluorine atoms contained in the surface to the number of carbon atoms contained in the surface is 0.5 to 3.0.

2. The container with the lid according to claim 1, wherein a weight-average molecular weight of the fluorine-containing polymer is 40,000 to 600,000.

3. The container with the lid according to claim 1, wherein an octanol/water partition coefficient of the surfactant represented by LogPow is equal to or smaller than 8.0.

4. The container with the lid according to claim 1, wherein $M_2$ is 0.0010% to 5.0% by mass.

5. The container with the lid according to claim 1, wherein the fluorine-containing polymer is a fluorine-containing polymer having a perfluoroalkyl group on a terminal thereof.

6. The container with the lid according to claim 1, wherein the surfactant is at least one of compound selected from the group consisting of a compound represented by Formula (1) and a compound represented by Formula (2), and
an octanol/water partition coefficient of the surfactant represented by Log Pow is equal to or smaller than 3.7, $$A\text{-}CH_2\text{---}OH \qquad \text{Formula (1)}$$

$$A\text{-}COO^-M^+ \qquad \text{Formula (2)}$$

in the formula, $M^+$ represents a cation, A in Formula (1) and Formula (2) represents a group represented by Formula (A1):

$$Rf\text{---}[O]_p\text{---}[CXY]_m\text{---}[O\text{---}(CX'Y')_n]_r\text{---}* \qquad \text{Formula (A1)}$$

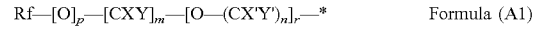

in the formula, * represents a binding position, Rf represents a fluorinated alkyl group which may have one or more oxygen atoms, p represents 1 or 0, m and n each independently represent an integer equal to or greater than 1, r represents 0 or an integer equal to or greater than 1, X, X', Y, and Y' each independently represent H, F, $CF_3$, or $C_2F_5$, a plurality of X's, X"s, Y's, and Y"s may be the same as or different from each other respectively, and X, X', Y, and Y' do not simultaneously represent H, alternatively, A represents a group represented by Formula (A2):

$$R\text{---}[CFX]_t\text{---}* \qquad \text{Formula (A2)}$$

in the formula, * represents a binding position, X represents a hydrogen atom, a halogen atom, or an alkyl group, an alkenyl group, a cycloalkyl group, or an aryl group which may contain one or more fluorine atoms and may contain one or more oxygen atoms, R represents a hydrogen atom or an alkyl group, an alkenyl group, a cycloalkyl group, or an aryl group which may contain a halogen atom except for a fluorine atom and may contain one or more oxygen atoms, and t represents an integer equal to or greater than 1.

7. The container with the lid according to claim 1, further comprising:
a compound represented by formula (3),
wherein a content of the compound represented by formula (3) with respect to the total mass of the container body is 0.0001% by mass to 0.05% by mass, $$CH_2\text{=}CX^a(CF_2)_nY^a \qquad \text{Formula (3)}$$

$X^a$ and $Y^a$ each independently represent a hydrogen atom or a fluorine atom, and n represents an integer of 1 to 8.

8. The container with the lid according to claim 7, wherein provided that a mass-based content of the compound represented by formula (3) in the surface is M3, and a mass-based content of the compound represented by formula (3) in a position 10 nm below the surface in the thickness direction of the container body $M_4$, $M_3/M_4$ is 0.50 to 1.50.

9. The container with the lid according to claim 8, wherein $M_1/M_3$ is 0.01 to 100.

10. The container with the lid according to claim 1, further comprising:
a polymerization initiator,
wherein a content of the polymerization initiator with respect to the total mass of the container body is 0.01 mass ppt to 200 mass ppb.

11. The container with the lid according to claim 1, further comprising:
a chain transfer agent,
wherein a content of the chain transfer agent with respect to the total mass of the container body is 0.01 mass ppt to 100 mass ppb.

12. The container with the lid according to claim 1, further comprising:
a plasticizer,
wherein a content of the plasticizer with respect to the total mass of the container body is 0.01 mass ppt to 100 mass ppb.

13. A method for manufacturing, the method comprising: manufacturing of a chemical liquid for manufacturing semiconductors using the container with the lid according to claim 1.

14. The container with the lid according to claim 1, wherein the fluorine-containing polymer is at least one of compound selected from the group consisting of polytetrafluoroethylene, perfluoroalkoxyalkane, a tetrafluoroethylene·hexafluoropropylene copolymer, an ethylene·tetrafluoroethylene copolymer, an ethylene·chlorotrifluoroethylene copolymer, polychlorotrifluoroethylene, polyvinylidene fluoride, and polyvinyl fluoride.

15. The container with the lid according to claim 1 that satisfies a condition 1 in a test described below,
test: under the condition that a mass ratio of a mass of the container body to a mass of a test solvent containing isopropanol at a proportion equal to or higher than 99.99% by mass is 0.1 in a case where a liquid temperature of the test solvent is set to be 25° C., the container body is immersed in the test solvent with a liquid temperature of 25° C. for 48 hours,
condition 1: in a case where the test solvent having been used for immersion contains one kind of organic impurities, an increase in the content of one kind of the organic impurities before and after the immersion is equal to or smaller than 1,000 mass ppb, and in a case where the test solvent having been used for immersion contains two or more kinds of organic impurities, an increase in the total content of two or more kinds of the organic impurities before and after the immersion is equal to or smaller than 1,000 mass ppb.

16. The container with the lid according to claim 1 that satisfies a condition 2 in a test described below,
test: under the condition that a mass ratio of a mass of the container body to a mass of a test solvent containing isopropanol at a proportion equal to or higher than 99.99% by mass is 0.1 in a case where a liquid temperature of the test solvent is set to be 25° C., the container body is immersed in the test solvent with a liquid temperature of 25° C. for 48 hours,
condition 2: in a case where the test solvent having been used for immersion contains one kind of metal ions, an increase in the content of one kind of the metal ions before and after the immersion is equal to or smaller than 10 mass ppb, and in a case where the test solvent having been used for immersion contains two or more kinds of metal ions, an increase in the total content of two or more kinds of the metal ions before and after the immersion is equal to or smaller than 10 mass ppb.

17. The container with the lid according to claim 1 that satisfies a condition 3 in a test described below,
test: under the condition that a mass ratio of a mass of the container body to a mass of a test solvent containing isopropanol at a proportion equal to or higher than 99.99% by mass is 0.1 in a case where a liquid temperature of the test solvent is set to be 25° C., the container body is immersed in the test solvent with a liquid temperature of 25° C. for 48 hours,
condition 3: in a case where the test solvent having been used for immersion contains one kind of metal particles, an increase in the content of one kind of the metal particles before and after the immersion is equal to or smaller than 10 mass ppb, and in a case where the test solvent having been used for immersion contains two or more kinds of metal particles, an increase in the total content of two or more kinds of the metal particles before and after the immersion is equal to or smaller than 10 mass ppb.

18. The container with the lid according to claim 1 that satisfies a condition 4 in a test described below,
test: under the condition that a mass ratio of a mass of the container body to a mass of a test solvent containing isopropanol at a proportion equal to or higher than 99.99% by mass is 0.1 in a case where a liquid temperature of the test solvent is set to be 25° C., the container body is immersed in the test solvent with a liquid temperature of 25° C. for 48 hours,
condition 4: in a case where the test solvent having been used for immersion contains one kind of fluoride ions, an increase in the content of one kind of the fluoride ions before and after the immersion is equal to or smaller than 10 mass ppm; and in a case where the test solvent having been used for immersion contains two or more kinds of fluoride ions, an increase in the total content of two or more kinds of the fluoride ions before and after the immersion is equal to or smaller than 10 mass ppm.

19. A method for manufacturing, the method comprising: manufacturing of a chemical liquid using the container with the lid according to claim 1, wherein the chemical liquid contains at least one of organic solvent selected from the group consisting of propylene glycol monomethyl ether, propylene glycol monoethyl ether, propylene glycol monopropyl ether, propylene glycol monomethyl ether acetate, ethyl lactate, methyl methoxypropionate, cyclopentanone, cyclohexanone, γ-butyrolactone, diisoamyl ether, butyl acetate, isoamyl acetate, isopropanol, 4-methyl-2-pentanol, dimethyl sulfoxide, n-methyl-2-pyrrolidone, diethylene glycol, ethylene glycol, dipropylene glycol, propylene glycol, ethylene carbonate, propylene carbonate, sulfolane, cycloheptanone, and 2-heptanone.

20. A chemical liquid storage body comprising:
the container with the lid according to claim 1; and
a chemical liquid stored in the container.

21. The chemical liquid storage body according to claim 20,
wherein the chemical liquid contains an organic solvent, and
the organic solvent is at least one of compound selected from the group consisting of propylene glycol monomethyl ether, propylene glycol monoethyl ether, propylene glycol monopropyl ether, propylene glycol monomethyl ether acetate, ethyl lactate, methyl methoxypropionate, cyclopentanone, cyclohexanone, γ-butyrolactone, diisoamyl ether, butyl acetate, isoamyl acetate, isopropanol, 4-methyl-2-pentanol, dimethyl sulfoxide, n-methyl-2-pyrrolidone, diethylene glycol, ethylene glycol, dipropylene glycol, propylene glycol, ethylene carbonate, propylene carbonate, sulfolane, cycloheptanone, and 2-heptanone.

22. The chemical liquid storage body according to claim 20, further comprising:
an O-ring that is disposed between the container body and the lid.

23. The chemical liquid storage body according to claim 22, wherein the O-ring contains a fluorine-containing polymer.

24. A chemical liquid purification device for obtaining a chemical liquid by purifying a substance to be purified, comprising:
a manufacturing tank that stores the substance to be purified;
a filter unit that purifies the substance to be purified; and
a pipe line that connects the manufacturing tank and the filter unit to each other,
wherein a liquid contact portion of at least one of unit selected from the group consisting of the manufacturing tank, the filter unit, and the pipe line is formed of the member according to claim 1.

25. A manufacturing tank formed of the member according to claim 1.

26. A method for storage, the method comprising:
storing of a chemical liquid for manufacturing semiconductors using the container with the lid according to claim 1.

27. A method for transport, the method comprising: transporting of a chemical liquid for manufacturing semiconductors using the container with the lid according to claim 1.

28. A method for transfer, the method comprising: transferring of a chemical liquid for manufacturing semiconductors using the container with the lid according to claim 1.

29. A method for storage, the method comprising: storing of a chemical liquid using the container with the lid according to claim 1, wherein the chemical liquid contains at least one of organic solvent selected from the group consisting of propylene glycol monomethyl ether, propylene glycol monoethyl ether, propylene glycol monopropyl ether, propylene glycol monomethyl ether acetate, ethyl lactate, methyl methoxypropionate, cyclopentanone, cyclohexanone, γ-butyrolactone, diisoamyl ether, butyl acetate, isoamyl acetate, isopropanol, 4-methyl-2-pentanol, dimethyl sulfoxide, n-methyl-2-pyrrolidone, diethylene glycol, ethylene glycol, dipropylene glycol, propylene glycol, ethylene carbonate, propylene carbonate, sulfolane, cycloheptanone, and 2-heptanone.

30. A method for transport, the method comprising: transporting of a chemical liquid using the container with the lid according to claim 1,
wherein the chemical liquid contains at least one of organic solvent selected from the group consisting of propylene glycol monomethyl ether, propylene glycol monoethyl ether, propylene glycol monopropyl ether, propylene glycol monomethyl ether acetate, ethyl lactate, methyl methoxypropionate, cyclopentanone, cyclohexanone, γ-butyrolactone, diisoamyl ether, butyl acetate, isoamyl acetate, isopropanol, 4-methyl-2-pentanol, dimethyl sulfoxide, n-methyl-2-pyrrolidone, diethylene glycol, ethylene glycol, dipropylene glycol, propylene glycol, ethylene carbonate, propylene carbonate, sulfolane, cycloheptanone, and 2-heptanone.

31. A method for transfer, the method comprising: transferring of a chemical liquid using the container with the lid according to claim 1,
wherein the chemical liquid contains at least one of organic solvent selected from the group consisting of propylene glycol monomethyl ether, propylene glycol monoethyl ether, propylene glycol monopropyl ether, propylene glycol monomethyl ether acetate, ethyl lactate, methyl methoxypropionate, cyclopentanone, cyclohexanone, γ-butyrolactone, diisoamyl ether, butyl acetate, isoamyl acetate, isopropanol, 4-methyl-2-pentanol, dimethyl sulfoxide, n-methyl-2-pyrrolidone, diethylene glycol, ethylene glycol, dipropylene glycol, propylene glycol, ethylene carbonate, propylene carbonate, sulfolane, cycloheptanone, and 2-heptanone.

32. The container with the lid according to claim 1, wherein the surfactant is a compound represented by formula (1), and an octanol/water partition coefficient of the surfactant represented by LogPow is equal to or smaller than 3.7, $$A\text{-}CH_2\text{—}OH \qquad \text{Formula (1)}$$

$$A\text{-}COO^-M^+ \qquad \text{Formula (2)}$$

in the formula, A represents a group represented by formula (A1):

$$Rf\text{—}[O]_p\text{—}[CXY]_m\text{—}[O\text{—}(CX'Y')_n]_r\text{—}* \qquad \text{Formula (A1):}$$

in the formula, * represents a binding position, Rf represents a fluorinated alkyl group which may have one or more oxygen atoms, p represents 1 or 0, m and n each independently represent an integer equal to or greater than 1, r represents 0 or an integer equal to or greater than 1, X, X', Y, and Y' each independently represent H, F, $CF_3$, or $C_2F_5$, a plurality of X's, X"s, Y's, and Y"s may be the same as or different from each other respectively, and X, X', Y, and Y' do not simultaneously represent H, alternatively, A represents a group represented by Formula (A2):

$$R\text{—}[CFX]_t\text{—}* \qquad \text{Formula (A2)}$$

in the formula, * represents a binding position, X represents a hydrogen atom, a halogen atom, or an alkyl group, an alkenyl group, a cycloalkyl group, or an aryl group which may contain one or more fluorine atoms and may contain one or more oxygen atoms, R represents a hydrogen atom or an alkyl group, an alkenyl group, a cycloalkyl group, or an aryl group which may contain a halogen atom except for a fluorine atom and may contain one or more oxygen atoms, and t represents an integer equal to or greater than 1.

33. A member comprising:
a fluorine-containing polymer;
a surfactant containing fluorine atoms, and,
a compound represented by formula (3),
wherein provided that, in at least a surface of a portion of the member, a mass-based content of the surfactant in the surface is $M_1$, and a mass-based content of the surfactant in a position 10 nm below the surface in a thickness direction of the member is $M_2$, $M_1/M_2$ is 0.50 to 0.90, and
an atom number ratio $X_1$ of the number of fluorine atoms contained in the surface to the number of carbon atoms contained in the surface is 0.5 to 3.0,
wherein the surfactant is a compound represented by formula (1), and
an octanol/water partition coefficient of the surfactant represented by LogPow is equal to or smaller than 3.7, $$A\text{-}CH_2\text{—}OH \qquad \text{Formula (1)}$$

in the formula, A represents a group represented by formula (A1):

$$Rf\text{—}[O]_p\text{—}[CXY]_m\text{—}[O\text{—}(CX'Y')_n]_r\text{—}* \qquad \text{Formula (A1)}$$

in the formula, * represents a binding position, Rf represents a fluorinated alkyl group which may have one or more oxygen atoms, p represents 1 or 0, m and n each independently represent an integer equal to or greater than 1, r represents 0 or an integer equal to or greater than 1, X, X', Y, and Y' each independently represent H, F, $CF_3$, or $C_2F_5$, a plurality of X's, X"s, Y's, and Y"s may be the same as or different from each other respectively, and X, X', Y, and Y' do not simultaneously represent H, alternatively, A represents a group represented by Formula (A2):

$$R\text{—}[CFX]_t\text{—}* \qquad \text{Formula (A2)}$$

in the formula, * represents a binding position, X represents a hydrogen atom, a halogen atom, or an alkyl group, an alkenyl group, a cycloalkyl group, or an aryl group which may contain one or more fluorine atoms and may contain one or more oxygen atoms, R represents a hydrogen atom or an alkyl group, an alkenyl group, a cycloalkyl group, or an aryl group which may contain a halogen atom except for a fluorine atom and may contain one or more oxygen atoms, and t represents an integer equal to or greater than 1, and
wherein a content of the compound represented by formula (3) with respect to the total mass of the member is 0.0001% by mass to 0.05% by mass, $$CH_2\text{=}CX^a(CF_2)_nY^a \qquad \text{Formula (3)}$$

$X^a$ and $Y^a$ each independently represent a hydrogen atom or a fluorine atom, and n represents an integer of 1 to 8.

34. The member according to claim 33, further comprising:
wherein provided that a mass-based content of the compound represented by formula (3) in the surface is $M_3$, and a mass-based content of the compound represented by formula (3) in a position 10 nm below the surface in the thickness direction of the member $M_4$, $M_3/M_4$ is 0.50 to 1.50.

35. The member according to claim 34, wherein $M_1/M_3$ is 0.01 to 100.

* * * * *